United States Patent
Takada et al.

(10) Patent No.: US 12,199,268 B2
(45) Date of Patent: Jan. 14, 2025

(54) NON-AQUEOUS LITHIUM POWER STORAGE ELEMENT

(71) Applicant: Asahi Kasei Kabushiki Kaisha, Tokyo (JP)

(72) Inventors: Kazuaki Takada, Tokyo (JP); Kazuteru Umetsu, Tokyo (JP); Fumiya Nakamura, Tokyo (JP); Yusuke Yamahata, Tokyo (JP); Yuima Kimura, Tokyo (JP); Tadashi Matsushita, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 476 days.

(21) Appl. No.: 17/760,802

(22) PCT Filed: Oct. 2, 2020

(86) PCT No.: PCT/JP2020/037639
§ 371 (c)(1),
(2) Date: Mar. 16, 2022

(87) PCT Pub. No.: WO2021/066174
PCT Pub. Date: Apr. 8, 2021

(65) Prior Publication Data
US 2022/0393147 A1   Dec. 8, 2022

(30) Foreign Application Priority Data

Oct. 4, 2019  (JP) ............................... 2019-183525
Oct. 4, 2019  (JP) ............................... 2019-183851
(Continued)

(51) Int. Cl.
*H01M 4/133* (2010.01)
*H01M 4/134* (2010.01)
(Continued)

(52) U.S. Cl.
CPC .......... *H01M 4/133* (2013.01); *H01M 4/134* (2013.01); *H01M 4/38* (2013.01); *H01M 4/505* (2013.01);
(Continued)

(58) Field of Classification Search
CPC ........ H01M 4/133; H01M 4/134; H01M 4/38; H01M 4/505; H01M 4/525; H01M 10/052;
(Continued)

(56) References Cited

U.S. PATENT DOCUMENTS

2008/0220329 A1   9/2008  Kojima et al.
2014/0154546 A1*  6/2014  Carter ................... H01M 8/188
                                                                429/101
(Continued)

FOREIGN PATENT DOCUMENTS

JP  2008-066053 A   3/2008
JP  2011-034893 A   2/2011
(Continued)

OTHER PUBLICATIONS

Barrett et al., "The Determination of Pore Volume and Area Distributions in Porous Substances. I. Computations form Nitrogen Isotherms," Journal of the American Chemical Society, 73, 373-380 (1951).
(Continued)

*Primary Examiner* — Abdullah A Riyami
*Assistant Examiner* — Nader J Alhawamdeh
(74) *Attorney, Agent, or Firm* — Morgan, Lewis & Bockius LLP

(57) ABSTRACT

A non-aqueous lithium power storage element that includes a positive electrode, a negative electrode, a separator, and a non-aqueous electrolyte, the positive electrode having a positive electrode collector and a positive electrode active (Continued)

material layer that includes active carbon, and the non-aqueous lithium power storage element having configuration (1) and/or (2). (1) The negative electrode includes a negative electrode collector and a negative electrode active material layer (2) The non-aqueous electrolyte contains (A) $LiPF_6$ and/or $LiBF_4$, (B) an imide lithium salt, and (C) an oxalate-complex lithium salt, the ratio of the mass of component (C) to the total mass of components (A) and (B) being 1.0-10.0 mass %.

19 Claims, 4 Drawing Sheets

(30) Foreign Application Priority Data

| Oct. 31, 2019 | (JP) | 2019-199191 |
|---|---|---|
| Oct. 31, 2019 | (JP) | 2019-199309 |
| Dec. 24, 2019 | (JP) | 2019-232393 |
| Dec. 25, 2019 | (JP) | 2019-234819 |
| Mar. 5, 2020 | (JP) | 2020-038263 |

(51) Int. Cl.

| H01M 4/38 | (2006.01) |
|---|---|
| H01M 4/505 | (2010.01) |
| H01M 4/525 | (2010.01) |
| H01M 10/052 | (2010.01) |

(52) U.S. Cl.
CPC ......... *H01M 4/525* (2013.01); *H01M 10/052* (2013.01)

(58) Field of Classification Search
CPC ......... H01M 2220/10; H01M 2220/20; H01M 2300/0025; H01M 4/5825; H01M 4/587; H01M 4/62; H01M 4/622; H01M 4/625; H01M 10/0525; H01M 10/0567; H01M 10/0568; H01M 10/0569; H01M 16/00; H01M 16/006; H01M 2220/30; H01M 4/36; H01M 4/58; H01M 4/583; H01G 11/46; H01G 11/64; H01G 11/50; H01G 11/62; H01G 11/36; H01G 11/24; H01G 11/06; Y02T 90/167; Y04S 30/12; Y02E 60/10; Y02E 60/13
See application file for complete search history.

(56) References Cited

U.S. PATENT DOCUMENTS

| 2014/0255796 | A1* | 9/2014 | Matsuoka | H01M 4/139 |
| | | | | 429/188 |
| 2015/0194702 | A1 | 7/2015 | Tokunaga et al. | |
| 2016/0028115 | A1 | 1/2016 | Kim et al. | |
| 2016/0314909 | A1 | 10/2016 | Matsuura et al. | |
| 2017/0207459 | A1* | 7/2017 | Okada | H01G 11/60 |
| 2018/0175370 | A1* | 6/2018 | Kim | H01M 4/1391 |
| 2018/0183051 | A1* | 6/2018 | Tiquet | C09D 7/62 |
| 2018/0237461 | A1* | 8/2018 | Sakaguchi | H01M 10/0568 |
| 2018/0287157 | A1* | 10/2018 | Hasegawa | H01G 11/26 |
| 2019/0280304 | A1 | 9/2019 | Cho et al. | |
| 2019/0393556 | A1 | 12/2019 | Matsuoka et al. | |
| 2022/0393147 | A1* | 12/2022 | Takada | H01M 16/00 |

FOREIGN PATENT DOCUMENTS

| JP | 2013-073526 A | 4/2013 |
| JP | 2015-156293 A | 8/2015 |
| JP | 2016-192377 A | 11/2016 |
| JP | 2017-017299 A | 1/2017 |
| JP | 2018-060689 A | 4/2018 |
| JP | 2018-534731 A | 11/2018 |
| JP | 2019-029110 A | 2/2019 |
| JP | 2019-525009 A | 9/2019 |
| JP | 2019-186222 A | 10/2019 |
| KR | 10-2019-0106135 A | 9/2019 |
| WO | 2014/002939 A1 | 1/2014 |
| WO | 2015/065093 A1 | 5/2015 |
| WO | 2018/013874 A1 | 1/2018 |
| WO | 2018/169028 A1 | 9/2018 |

OTHER PUBLICATIONS

Lippens et al., "Studies on Pore Systems in Catalysts V. The t Method," Journal of Catalysis, 4: 319-323 (1965).
Mikhail et al., "Investigations of a Complete Pore Structure Analysis, I. Analysis of Micropores," Journal of Colloid and Interface Science, 26: 45-53 (1968).
Hildebrand et al., "A new method for the model-independent assessment of thickness in three-dimensional images," Journal of Microscopy, 185: 67-75 (1996).
International Search Report issued in corresponding International Patent Application No. PCT/JP2020/037639 dated Dec. 15, 2020.
International Preliminary Report on Patentability and Written Opinion issued in corresponding International Patent Application No. PCT/JP2020/037639 dated Apr. 14, 2022.
Supplementary European Search Report issued in corresponding European Patent Application No. 20871803.1 dated Dec. 23, 2022.

* cited by examiner

NON-AQUEOUS LITHIUM POWER STORAGE ELEMENT

FIELD

The present invention relates to a non-aqueous lithium power storage element.

BACKGROUND

In recent years, with an aim toward effective utilization of energy for greater environmental conservation and reduced usage of resources, a great deal of attention is being directed to power smoothing systems for wind power generation or overnight charging electric power storage systems, household dispersive power storage systems based on solar power generation technology, and power storage systems for electric vehicles and the like.

The number one requirement for cells used in such power storage systems is high energy density. The development of lithium ion batteries is therefore advancing at a rapid pace, as an effective strategy for cells with high energy density that can meet this requirement.

The second requirement is a high output characteristic. A high power discharge characteristic is required for a power storage system during acceleration in, for example, a combination of a high efficiency engine and a power storage system (such as in a hybrid electric vehicle), or a combination of a fuel cell and a power storage system (such as in a fuel cell electric vehicle).

Electrical double layer capacitors and nickel-hydrogen cells are currently under development as high output power storage devices.

Electrical double layer capacitors that employ activated carbon in the electrodes have output characteristics of about 0.5 to 1 kW/L. Such electrical double layer capacitors have high durability (cycle characteristics and high-temperature storage characteristics) and have been considered optimal devices in fields where the high output mentioned above is required. However, their energy densities are no greater than about 1 to 5 Wh/L. A need therefore exists for even higher energy density.

Nickel-hydrogen batteries employed in existing hybrid electric vehicles exhibit high output equivalent to electrical double layer capacitors and have energy densities of about 160 Wh/L. Nevertheless, research is being actively pursued toward further increasing their energy density and output and increasing their durability (especially stability at high temperatures).

Research is also advancing toward increased outputs for lithium ion batteries as well. For example, lithium ion batteries are being developed that yield high output exceeding 3 kW/L at 50% depth of discharge (a value representing the state of the percentage of discharge of the service capacity of a power storage element). However, the energy density is 100 Wh/L or lower and the design is such that the high energy density, which is the major feature of a lithium ion battery, is reduced. The durability (especially cycle characteristic and high-temperature storage characteristic) is inferior to that of an electrical double layer capacitor. In order to provide practical durability, therefore, these are used with a depth of discharge in a narrower range than 0 to 100%. Because the usable capacity is even lower, research is actively being pursued toward further increasing durability.

There is a strong demand for implementation of power storage elements exhibiting high energy density, high output characteristics and durability, as mentioned above. Nevertheless, the existing power storage elements mentioned above have their advantages and disadvantages. New power storage elements are therefore desired that can meet these technical requirements. Promising candidates are power storage elements known as lithium ion capacitors, which are being actively developed in recent years.

A lithium ion capacitor is a type of power storage element using a non-aqueous electrolyte solution comprising a lithium salt (or, "non-aqueous lithium power storage element"), wherein charge-discharge is accomplished by: non-Faraday reaction by adsorption/desorption of anions similar to an electrical double layer capacitor at about 3 V or higher, at the positive electrode; and Faraday reaction by occlusion/release of lithium ions similar to a lithium ion battery, at the negative electrode.

To summarize these electrode materials and their characteristics: when charge-discharge is carried out using a material such as activated carbon as an electrode, by adsorption and desorption of ions on the activated carbon surface (non-Faraday reaction), it is possible to obtain high output and high durability, though with lower energy density (for example, 1×). When charge-discharge is carried out by Faraday reaction using an oxide or carbon material as the electrode, the energy density is higher (for example, 10 times that of non-Faraday reaction using activated carbon), but then durability and output characteristic become issues.

Electrical double layer capacitors that combine these electrode materials employ activated carbon as the positive electrode and negative electrode (energy density: 1×) and carry out charge-discharge by non-Faraday reaction at both the positive and negative electrodes and are characterized by having high output and high durability, but also low energy density (positive electrode: 1×× negative electrode: 1×=1).

Lithium ion secondary batteries use a lithium transition metal oxide (energy density: 10×) for the positive electrode and a carbon material (energy density: 10×) for the negative electrode, carrying out charge-discharge by Faraday reaction at both the positive and negative electrodes, but while their energy density is high (positive electrode: 10×× negative electrode: 10×=100), they have issues in terms of output characteristic and durability. The depth of discharge must be restricted in order to satisfy the high durability required for hybrid electric vehicles, and with lithium ion secondary batteries only 10 to 50% of the energy can be utilized.

Among the aforementioned batteries used in power storage systems (power storage elements), lithium ion capacitors are a new type of asymmetric capacitor that employs activated carbon (energy density: 1×) for the positive electrode and a carbon material (energy density: 10×) for the negative electrode, and they are characterized by carrying out charge-discharge by non-Faraday reaction at the positive electrode and Faraday reaction at the negative electrode and thus having the characteristics of both electrical double layer capacitors and lithium ion secondary batteries. They also exhibit high output and high durability, while also having high energy density (positive electrode: 1×× negative electrode: 10×=10) and requiring no restrictions on depth of discharge as with lithium ion secondary batteries.

Much research has been conducted toward achieving higher output and higher durability for such lithium ion capacitors (PTLs 1 to 10).

PTL 1 proposes a lithium ion secondary battery using lithium bis(oxalato)borate as the lithium salt and comprising acrylonitrile in the solvent, which exhibits a high output characteristic.

PTL 2 proposes a lithium ion secondary battery with excellent resistance against corrosion of the Al current collector and long-term stability, using $LiPF_6$, $LiBF_4$ and lithium difluorooxalatoborate as fluorine-containing lithium salts.

PTL 3 proposes a lithium ion secondary battery with satisfactory balance between input characteristic and storage durability, by adding a negative electrode active material with a particle diameter of 3 µm or smaller and using an oxalatoborate-type compound and a difluorophosphate compound in the electrolyte solution.

PTL 4 proposes a lithium ion capacitor employing a lithium salt electrolyte with an imide structure and a binder comprising a polymer with inhibited solubility for the electrolyte solution, that can maintain capacity and also exhibits low increase in internal resistance in a high-temperature environment of 85° C.

PTL 5 proposes a lithium ion secondary battery wherein increase in the thickness of the coating film is inhibited and increase in negative electrode resistance can be inhibited, by using a non-aqueous electrolyte containing an oxalatoborate-type compound.

PTL 6 proposes a non-aqueous electrolyte comprising a bismaleimide compound and a fluoroethylene carbonate in predetermined amounts, whereby capacity can be maintained in an environment of 60° C.

PTL 7 proposes a lithium ion secondary battery using a non-aqueous electrolyte comprising a lithium salt electrolyte with an imide structure and one or more additives selected from the group consisting of lithium difluorooxalate phosphate, trimethylsilylpropyl phosphate, 1,3-propenesultone and ethylene sulfate, wherein the capacity can be maintained in an environment of 60° C.

PTL 8 discloses a negative electrode having a coating film made of carbon nanotubes and carboxymethyl cellulose formed on the surface of a negative electrode active material, the mass ratio of their mixture being carboxymethyl cellulose/carbon nanotubes=1.5 to 7.0, in order to increase the output of a lithium ion capacitor.

PTL 9 proposes a positive electrode precursor with high capacity and high output, with accelerated decomposition of an alkali metal compound in the positive electrode precursor.

PTL 10 discloses a carbon complex comprising carbon particles as the core and filamentous carbon having a graphene structure formed on the surfaces of the carbon particles, in order to improve the energy density and increase the output.

For the purpose of the present specification, the mesopore volume is calculated by the BJH method and the micropore volume is calculated by the MP method.

The BJH method is described in NPL 1.

The MP method is a method in which a "t-plot" (NPL 2) is utilized to determine micropore volume, micropore area and micropore distribution, and it is described in NPL 3.

The BoneJ Thickness referred to herein is that described in NPL 4.

CITATION LIST

Patent Literature

[PTL 1] Japanese Unexamined Patent Publication No. 2016-192377
[PTL 2] Japanese Unexamined Patent Publication No. 2018-60689
[PTL 3] International Patent Publication No. WO2014/002939
[PTL 4] Japanese Unexamined Patent Publication No. 2017-17299
[PTL 5] Japanese Unexamined Patent Publication No. 2011-34893
[PTL 6] Japanese Unexamined Patent Publication No. 2019-186222
[PTL 7] International Patent Publication No. WO2015/065093
[PTL 8] Japanese Unexamined Patent Publication No. 2015-156293
[PTL 9] Japanese Unexamined Patent Publication No. 2013/73526
[PTL 10] Japanese Unexamined Patent Publication No. 2008-66053

Non Patent Literature

[NPL 1] E. P. Barrett, L. G. Joyner and P. Halenda, J. Am. Chem. Soc., 73, 373(1951)
[NPL 2] B. C. Lippens, J. H. de Boer, J. Catalysis, 4319(1965)
[NPL 3] R. S. Mikhail, S. Brunauer, E. E. Bodor, J. Colloid Interface Sci., 26, 45(1968)
[NPL 4] T. Hildebrand, P. Ruesgsegger, J. of Microscopy, 185(1996) 67-75.

SUMMARY

Technical Problem

In light of the current situation, the problem to be solved by the invention is to provide a non-aqueous lithium power storage element having excellent input/output and high durability for storage at high temperatures of 80° C. or higher.

Solution to Problem

The aforementioned problem is solved by the following technical means. Specifically, the present invention provides the following.
<Aspect 1>
A non-aqueous lithium power storage element comprising a positive electrode, a negative electrode, a separator and a lithium ion-containing non-aqueous electrolyte, wherein:
  the positive electrode has a positive electrode current collector and a positive electrode active material layer containing a positive electrode active material, formed on one or both sides of the positive electrode current collector,
  the positive electrode active material contains active carbon, and
  the element is provided with at least one of the following constructions (1) and (2):
  (1) the negative electrode includes a negative electrode current collector and a negative electrode active material layer on one or both sides of the negative electrode current collector,
    the negative electrode active material layer includes a negative electrode active material, carbon nanotubes and a dispersing agent,
    the negative electrode active material includes a carbon material, and
    for all of the pixels in the bright field regions in a binarized SEM image taken of the negative electrode active material layer surface, where a set of the maximum inscribed circles encompassing each of the pixels is represented as a frequency distribution for each diameter, the area ratio Z1 which is the ratio of the total area of maximum inscribed circles with diameters of less than 100 nm occupying the total area of the maximum inscribed circles is 3.5% to 25.5%;

(2) the non-aqueous electrolyte comprises:

(A) at least one lithium salt from among $LiPF_6$ and $LiBF_4$, (B) a lithium salt with an imide structure, and (C) a lithium salt with an oxalate complex as the anion, and the ratio of the mass of component (C) with respect to the sum of the mass of component (A) and the mass of component (B) in the non-aqueous electrolyte solution is 1.0 mass % to 10.0 mass %.

<Aspect 2>

The non-aqueous lithium power storage element according to aspect 1, wherein the non-aqueous electrolyte solution comprises (B) a lithium salt with an imide structure, and component (B) is a lithium salt with an imide structure represented by the following formula (a):

[Chemical Formula 1]

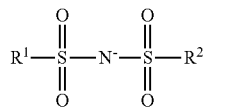

(a)

{where $R^1$ and $R^2$ are each independently a hydrogen atom, halogen atom, alkyl group or alkyl halide group and at least one of $R^1$ and $R^2$ is a halogen atom or alkyl halide group}.

<Aspect 3>

The non-aqueous lithium power storage element according to aspect 1, wherein the (B) lithium salt with an imide structure is a lithium salt selected from the group consisting of lithium bis(fluorosulfonyl)imide and lithium bis(trifluoromethane)sulfonimide.

<Aspect 4>

The non-aqueous lithium power storage element according to any one of aspects 1 to 3, wherein the non-aqueous electrolyte solution comprises (C) a lithium salt with an oxalate complex as the anion, and component (C) is at least one type of lithium salt selected from the group consisting of lithium bisoxalatoborate, lithium fluorooxalatoborate and lithium difluorooxalatoborate.

<Aspect 5>

The non-aqueous lithium power storage element according to any one of aspects 1 to 4, wherein the non-aqueous electrolyte solution comprises at least one type of nitrile compound in a range of 0.1 mol/L to 5 mol/L of the non-aqueous electrolyte solution.

<Aspect 6>

The non-aqueous lithium power storage element according to any one of aspects 1 to 5, wherein the non-aqueous electrolyte solution comprises at least one type of trinitrile compound selected from the group consisting of 2-amino-1,1,3-tricyano-1-propene, 1-butyl-3-methylimidazolium tricyanomethanide and lithium tricyanomethanide, in a range of 0.1 mol/L to 5 mol/L of the non-aqueous electrolyte solution.

<Aspect 7>

The non-aqueous lithium power storage element according to any one of aspects 1 to 6, wherein:

the negative electrode active material layer has a solid electrolyte interface (SEI) substance on the surface, and the solid electrolyte interface (SEI) substance contains lithium oxalate represented by the following formula (b):

[Chemical Formula 2]

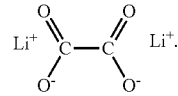

(b)

<Aspect 8>

The non-aqueous lithium power storage element according to any one of aspects 1 to 7, wherein in X-ray photoelectron spectroscopy (XPS) of the negative electrode active material layer, the ratio I1/I2, of the intensity I1 of peak P1 observed in the range of 289 eV to 290 eV and the intensity I2 of peak P2 observed in the range of 284 eV to 285 eV, is 0.1 or greater.

<Aspect 9>

The non-aqueous lithium power storage element according to any one of aspects 1 to 8, wherein the non-aqueous electrolyte solution comprises at least one type of ether compound selected from the group consisting of 1,2-dimethoxyethane, 1,2-diethoxyethane, tetrahydrofuran, 1,3-dioxane, 1,4-dioxane and 2-methyltetrahydrofuran, in the range of 1 mol/L to 10 mol/L in the non-aqueous electrolyte solution.

<Aspect 10>

The non-aqueous lithium power storage element according to any one of aspects 1 to 9, wherein in a binarized SEM image of the surface of the negative electrode active material layer, the area ratio Z2 of the total area of regions of 1,000 $nm^2$ to 5,000 $nm^2$ of the dark field regions among the total area of regions of 1,000 $nm^2$ to 20,000 $nm^2$, is 63.0% to 92.0%.

<Aspect 11>

The non-aqueous lithium power storage element according to any one of aspects 1 to 10, wherein the total concentration of Fe atoms and Ni atoms in the negative electrode active material layer is 1 ppm to 500 ppm.

<Aspect 12>

The non-aqueous lithium power storage element according to any one of aspects 1 to 11, wherein in the XRD (X-ray diffraction) spectrum measured for the negative electrode active material layer, there is a peak Y1 having a peak top with 2θ in the range of 26.2° to 26.5°, and the half-width of the peak Y1 is 0.1° to 0.5°.

<Aspect 13>

The non-aqueous lithium power storage element according to any one of aspects 1 to 12, wherein the dispersing agent in the negative electrode active material layer is of two or more types selected from the group consisting of carboxymethyl cellulose, polycarboxylic acid, polycarboxylic acid salts, polyvinylpyrrolidone, polyvinyl alcohol and surfactants.

<Aspect 14>

The non-aqueous lithium power storage element according to any one of aspects 1 to 13, wherein the mean fiber diameter of the carbon nanotubes is 2 nm or greater and less than 100 nm.

<Aspect 15>

The non-aqueous lithium power storage element according to any one of aspects 1 to 14, wherein:

the positive electrode active material layer further comprises carbon nanotubes and an alkali metal compound other than the positive electrode active material, the mass ratio of the alkali metal compound with respect to the total mass of the positive electrode active material layer in the positive electrode, represented as C2 (mass %), is $0.1 \leq C2 \leq 7.0$, and in a binarized SEM image of 1,280×890 pixels (1 pixel=9.96 nm) taken of the surface of the positive electrode active material layer of the positive electrode at a magnification of 10,000×, the area ratio Z'2 of the total area of maximum inscribed circles with diameters of less than 100 nm occupying the total area of the maximum inscribed circles is 7.5% to 35.0%, where a set of the maximum inscribed circles encompassing each of the pixels, for all of the pixels in the bright field regions, is represented as a frequency distribution for each diameter.

<Aspect 16>

The non-aqueous lithium power storage element according to aspect 15, wherein in the XRD (X-ray diffraction) spectrum measured for the positive electrode active material layer, there is a peak X2 with 2θ in the range of 25.7° to 27.0°, and the half-width of the peak X2 is 0.1° to 0.5°.

<Aspect 17>

The non-aqueous lithium power storage element according to aspect 15 or 16, wherein the total concentration of Fe atoms and Ni atoms in the positive electrode active material layer is 1 ppm to 500 ppm.

<Aspect 18>

The non-aqueous lithium power storage element according to any one of aspects 15 to 17, wherein:

the positive electrode active material layer further comprises a dispersing agent, and the dispersing agent is of two or more types selected from the group consisting of carboxymethyl cellulose, polycarboxylic acid, polycarboxylic acid salts, polyvinylpyrrolidone, polyvinyl alcohol and surfactants.

<Aspect 19>

The non-aqueous lithium power storage element according to any one of aspects 15 to 18, wherein the alkali metal compound is at least one type selected from the group consisting of lithium carbonate, sodium carbonate and potassium carbonate.

<Aspect 20>

The non-aqueous lithium power storage element according to any one of aspects 15 to 19, wherein the mean fiber diameter of the carbon nanotubes is 2 nm or greater and less than 100 nm.

<Aspect 21>

The non-aqueous lithium power storage element according to any one of aspects 15 to 20, wherein:

the positive electrode active material further comprises a lithium transition metal oxide, and the lithium transition metal oxide is at least one selected from the group consisting of $Li_xNi_aCo_bAl_{(1-a-b)}O_2$ (where a, b and x satisfy $0.02<a<0.97$, $0.02<b<0.97$ and $0 \leq x \leq 1$, respectively), $Li_xNi_cCo_dMn_{(1-c-d)}O_2$ (where c, d and x satisfy $0.02<c<0.97$, $0.02<d<0.97$ and $0 \leq x \leq 1$, respectively), $Li_xCoO_2$ (where x satisfies $0 \leq x \leq 1$), $Li_xMn_2O_4$ (where x satisfies $0 \leq x \leq 1$), $Li_xFePO_4$ (where x satisfies $0 \leq x \leq 1$), $Li_xMnPO_4$ (where x satisfies $0 \leq x \leq 1$) and $Li_zV_2(PO_4)_3$ (where z satisfies $0 \leq z \leq 3$).

<Aspect 22>

The non-aqueous lithium power storage element according to any one of aspects 15 to 21, wherein:

with $X_1$ as the mean particle size of the active carbon in the positive electrode active material layer, $3.0\ \mu m \leq X_1 \leq 7.0\ \mu m$, with $Y_1$ as the ratio I1/I2 of the maximum peak intensity I1 appearing near a Raman shift of 1,590 cm$^{-1}$ and the minimum peak intensity I2 appearing near a Raman shift of 1,470 cm$^{-1}$ in the Raman spectrum for the active carbon, $2.0 \leq Y_1 \leq 5.5$, the product $X_1Y_1$ of $X_1$ and $Y_1$ is $10 \leq X_1Y_1 \leq 28$, and the functional group content $Z_1$ of the active carbon is 0.80 mmol/g $\leq Z_1 \leq$ 2.5 mmol/g.

<Aspect 23>

The non-aqueous lithium power storage element according to aspect 22, wherein $X_1$ satisfies $4.0\ \mu m \leq X_1 \leq 6.0\ \mu m$.

<Aspect 24>

The non-aqueous lithium power storage element according to aspect 22 or 23, wherein the product $X_1Y_1$ of $X_1$ and $Y_1$ satisfies $13 \leq X_1Y_1 \leq 26$.

<Aspect 25>

A power storage module containing a non-aqueous lithium power storage element according to any one of aspects 1 to 24.

<Aspect 26>

The power storage module according to aspect 25, which is incorporated into a system selected from the group consisting of power regeneration assist systems, power load-leveling systems, uninterruptable power source systems, non-contact power supply systems, energy harvesting systems, power storage systems, solar power generation/storage systems, electric power steering systems, emergency power supply systems, in-wheel motor systems, idling stop systems, electric vehicles, plug-in hybrid vehicles, hybrid vehicles, electric motorcycles, quick charging systems and smart grid systems.

<Aspect 27>

A power storage system comprising power storage elements according to any one of aspects 1 to 24, lead batteries, nickel-hydrogen batteries, lithium ion secondary batteries or fuel cells, connected in series or in parallel.

Advantageous Effects of Invention

According to the present invention there is provided a non-aqueous lithium power storage element having both high temperature durability and input performance.

DESCRIPTION OF EMBODIMENTS

Figure 1:
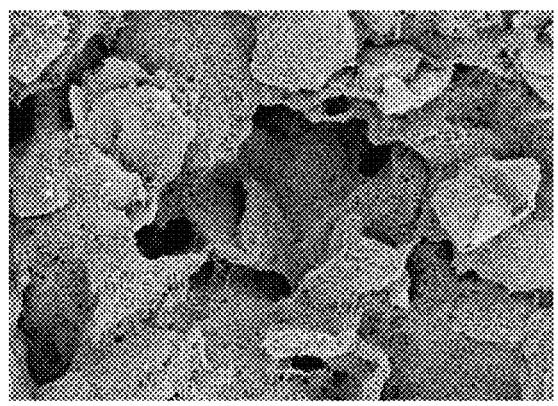
FIG. 1 is an SEM image of the negative electrode active material layer of the negative electrode 20 obtained in Example 13.

An embodiment of the invention (hereunder referred to as "the present embodiment") will now be explained in detail as an example, with the understanding that the invention is not limited to the present embodiment. The upper limits and lower limits for the numerical ranges throughout the present specification may be combined as desired.
<Non-Aqueous Lithium Power Storage Element>

A non-aqueous lithium power storage element generally comprises a positive electrode, a negative electrode, a separator and an electrolyte solution, as the major constituent elements. The electrolyte solution used is a non-aqueous electrolyte comprising an organic solvent and a lithium salt-containing electrolyte dissolved in the organic solvent.

The non-aqueous lithium power storage element of the invention is a non-aqueous lithium power storage element comprising a positive electrode, a negative electrode, a separator and a lithium ion-containing non-aqueous electrolyte, wherein:
- the positive electrode has a positive electrode current collector and a positive electrode active material layer containing a positive electrode active material, formed on one or both sides of the positive electrode current collector,
- the positive electrode active material contains active carbon, and
- the element is provided with at least one of the following constructions (1) and (2):
  (1) the negative electrode includes a negative electrode current collector and a negative electrode active material layer on one or both sides of the negative electrode current collector,
    the negative electrode active material layer includes a negative electrode active material, carbon nanotubes and a dispersing agent,
    the negative electrode active material includes a carbon material, and
    for all of the pixels in the bright field regions in a binarized SEM image taken of the negative electrode active material layer surface, where a set of the maximum inscribed circles encompassing each of the pixels is represented as a frequency distribution for each diameter, the area ratio Z1 which is the ratio of the total area of maximum inscribed circles with diameters of less than 100 nm occupying the total area of the maximum inscribed circles is 3.5% to 25.5%;
  (2) the non-aqueous electrolyte comprises:
    (A) at least one lithium salt from among $LiPF_6$ and $LiBF_4$,
    (B) a lithium salt with an imide structure, and
    (C) a lithium salt with an oxalate complex as the anion, and
    the ratio of the mass of component (C) with respect to the sum of the mass of component (A) and the mass of component (B) in the non-aqueous electrolyte solution is 1.0 mass % to 10.0 mass %.

The elements composing the non-aqueous lithium power storage element of the invention will now be explained in order.
<Positive Electrode>

As explained below, for this embodiment the negative electrode is preferably predoped with an alkali metal ion during the step of assembling the power storage element, and the predoping method is preferably application of a voltage between the positive electrode precursor and negative electrode, after the power storage element has been assembled using the positive electrode precursor containing the alkali metal compound, the negative electrode, the separator, the external body and the non-aqueous electrolyte solution. In this case, the alkali metal compound may be included in any form in the positive electrode precursor. For example, the alkali metal compound may be present between the positive electrode current collector and the positive electrode active material layer, or it may be present on the surface of the positive electrode active material layer, or it may be present in the positive electrode active material layer. The alkali metal compound is preferably contained in the positive electrode active material layer formed on the positive electrode current collector of the positive electrode precursor. According to this aspect, pores are formed in the positive electrode active material layer during predoping of the alkali metal ion in the negative electrode, thus increasing the effective area of the positive electrode active material layer.

Throughout the present specification, "positive electrode precursor" is defined as the positive electrode before the alkali metal doping step, and "positive electrode" is defined as the positive electrode after the alkali metal doping step.

The positive electrode of this embodiment has a positive electrode current collector and a positive electrode active material layer containing a positive electrode active material, formed on one or both sides thereof. The positive electrode active material layer of this embodiment contains a positive electrode active material and carbon nanotubes, and it may also contain an alkali metal compound other than the positive electrode active material.
[Positive Electrode Active Material Layer of Positive Electrode]

The positive electrode active material layer of the positive electrode contains a positive electrode active material and carbon nanotubes, and it may also contain an alkali metal compound other than the positive electrode active material. In the non-aqueous lithium power storage element of this embodiment, the positive electrode active material layer of the positive electrode precursor preferably contains an alkali metal compound other than a positive electrode active material. However, the alkali metal compound is consumed by predoping into the negative electrode, resulting in formation of pores in the positive electrode active material layer of the positive electrode. The alkali metal compound other than the positive electrode active material may remain or not remain in the resulting positive electrode active material layer of the positive electrode.

When an alkali metal compound other than a positive electrode active material remains in the positive electrode active material layer of the positive electrode, application of voltage between the positive electrode and negative electrode during charge, for example, causes decomposition of the alkali metal compound in the positive electrode and release of cations, the cations being reduced at the negative electrode and resulting in predoping of the negative electrode.

Decomposition of the alkali metal compound is an oxidative decomposition reaction. For proper reaction to take place it is necessary to appropriately control the reaction area between the positive electrode and non-aqueous electrolyte and the electron conductivity of the positive electrode body.

The positive electrode active material layer may also contain other optional components as necessary, in addition to the positive electrode active material, carbon nanotubes and alkali metal compound other than the positive electrode active material.

[Positive Electrode Active Material]

The positive electrode active material contains active carbon, and may also contain graphene, a conductive polymer and a lithium transition metal oxide in addition to the active carbon.

The positive electrode active material in the positive electrode active material layer of the positive electrode precursor of this embodiment preferably contains active carbon and a lithium transition metal oxide.

When active carbon is used as a positive electrode active material there are no particular restrictions on the type of active carbon or its starting material, but preferably the pores of the active carbon are optimally controlled to obtain both high input/output characteristics and high energy density. Specifically, if $V_1$ (cc/g) is the mesopore volume due to pores with diameters of 20 Å to 500 Å as calculated by the BJH method, and $V_2$ (cc/g) is the micropore volume due to pores with diameters of smaller than 20 Å as calculated by the MP method, then:

(1) in order to obtain a high input/output characteristic, active carbon satisfying $0.3<V_1\leq0.8$ and $0.5\leq V_2\leq1.0$ and exhibiting an area-to-weight ratio of 1,500 $m^2/g$ to 3,000 $m^2/g$ as measured by the BET method (hereunder also referred to as active carbon 1) is preferred, or (2) in order to obtain high energy density, active carbon satisfying $0.8<V_1\leq2.5$ and $0.8<V_2\leq3.0$ and exhibiting an area-to-weight ratio of 2,300 $m^2/g$ to 4,000 $m^2/g$ as measured by the BET method (hereunder also referred to as active carbon 2), is preferred.

The active carbon having such features can be obtained, for example, using the starting material and treatment method described below.

For this embodiment, the carbon source to be used as the starting material for the active carbon is not particularly restricted. Examples include plant-based starting materials such as wood, wood dust, coconut shell, by-products of pulp production, bagasse and molasses; fossil-based starting materials such as peat, lignite, brown coal, bituminous coal, anthracite, petroleum, distillation residue components, petroleum pitch, coke and coal tar; various synthetic resins such as phenol resin, vinyl chloride resin, vinyl acetate resin, melamine resin, urea resin, resorcinol resin, celluloid, epoxy resin, polyurethane resin, polyester resin and polyamide resin; synthetic rubbers such as polybutylene, polybutadiene and polychloroprene; as well as synthetic wood or synthetic pulp materials, and carbides of the foregoing. From the viewpoint of suitability for mass-production and of cost, the starting materials preferred among these are plant-based starting materials such as coconut shell and wood dust, and their carbides, with coconut shell carbides being particularly preferred.

The system used for carbonization and activation of these starting materials to obtain the active carbon may be a known system such as, for example, a fixed bed system, moving bed system, fluidized bed system, slurry system or rotary kiln system.

The carbonization method for these starting materials is a method in which an inert gas such as nitrogen, carbon dioxide, helium, argon, xenon, neon, carbon monoxide or exhaust gas, or a mixed gas composed mainly of such inert gases with other gases, is used for firing at 400 to 700° C. (preferably 450 to 600° C.), over a period of about 30 minutes to 10 hours.

The activation method for the carbide may be a gas activation method in which firing is accomplished using an activating gas such as water vapor, carbon dioxide or oxygen, or an alkali metal activation method in which heat treatment is carried out after mixture with an alkali metal compound.

In a method using activating gas, the activating gas is preferably supplied at a rate of 0.5 to 3.0 kg/h (preferably 0.7 to 2.0 kg/h) while heating the obtained carbide to 800 to 1,000° C. for 3 to 12 hours for activation.

However, using an activating gas for activation at high temperature causes activation of not only the amorphous portion but also the crystalline portion of the active carbon, and can also reduce the functional group content, potentially working disadvantageously against the durability of the power storage device. To obtain highly crystalline active carbon, therefore, activation may be carried out thoroughly by activation for a short period of about 3 to 5 hours at a low temperature of about 200 to 600° C., without impairing the crystallinity and functional group content of the active carbon.

In a method using an alkali metal compound, a carbide and an alkali metal compound such as KOH or NaOH are mixed so that the mass ratio of carbide:alkali metal compound is ≥1:1 (the amount of the alkali metal compound being equal to or greater than the amount of the carbide), after which heat treatment is carried out in a range of 600 to 900° C. for 0.5 to 5 hours under an inert gas atmosphere, and then the alkali metal compound is subjected to cleaning removal with an acid or water, and is dried.

Since alkali metal ions are intercalated between the crystalline layers of the carbon structure during activation in the case of alkali activation, this works disadvantageously against crystallinity. Gas activation is therefore thought to be effective to obtain highly crystalline active carbon.

In order to increase the micropore volume and not increase the mesopore volume, the amount of carbide may be increased during activation, and mixed with KOH. In order to increase both the micropore volume and mesopore volume, a large amount of KOH may be used. For increase in the mesopore volume primarily, steam-activation is preferably carried out after alkaline activation treatment.

The carbide may be subjected to a primary activation step before the activation treatment of the carbide described above. In the primary activation, it is usually preferred to employ a method of firing the carbon material at a temperature of below 900° C. using an activating gas such as water vapor, carbon dioxide or oxygen for gas activation.

By appropriate combinations for the firing temperature and firing time for the carbonization method described above, and the activating gas supply rate, temperature-elevating rate and maximum activation temperature in the activation method, it is possible to produce active carbon that can be used for this embodiment. The activation conditions for the active carbon are preferably steam-activation at 200 to 600° C. for 3 to 5 hours, more preferably steam-activation at 400 to 600° C. for 4 to 5 hours and even more preferably steam-activation at 500 to 550° C. for 4 to 5 hours.

The mean particle size $X_1$ of the active carbon is preferably 3.0 μm to 7.0 μm (i.e. 3.0 μm≤$X_1$≤7.0 μm). If the mean particle size $X_1$ is 3.0 μm or greater, the active material layer density will be high resulting in increased electron conductivity between the particles, and also a larger effective surface area during reaction, thereby promoting oxidation reaction of the alkali metal compound. A small mean particle size $X_1$ may lead to the disadvantage of low durability, but a mean particle size $X_1$ of at least 3.0 μm will help avoid this disadvantage. If the mean particle size $X_1$ is 7.0 μm or smaller, on the other hand, secondary reactions other than the alkali metal compound oxidation reaction can be inhibited. The mean particle size $X_1$ of the active carbon is more preferably 4.0 μm to 6.0 μm and even more preferably 4.2 μm to 6.3 μm.

The active carbon of this embodiment is characterized by a maximum peak intensity near a Raman shift of 1590 $cm^{-1}$ and a minimum peak intensity appearing near a Raman shift of 1470 $cm^{-1}$, in spectrophotometric measurement. The intensity $G_1$ of the G band and the intensity $D_1$ of the D band of the active carbon of this embodiment are the values calculated by the following methods. In peak separation of the spectrum found by Raman spectrophotometry at an excitation wavelength of 532 nm ("Raman spectrum"), the maximum peak intensity near 1600 nm is recorded as $G_1$ and the maximum peak intensity near 1300 nm is recorded as $D_1$. After baseline compensation in the peak separation, the only two peaks used were the G band and D band.

Throughout the present specification, "Raman spectrum" refers to the spectrum measured using an in Via Reflex by Renishaw Co. as the Raman scattering spectrometer.

The band near a Raman shift of 1590 $cm^{-1}$ for a carbon material is referred to as the "G band" and contributes to the graphite structure ($sp^2$ bonds), while the band near a Raman shift of 1360 $cm^{-1}$ is referred to as the "D band", and arises from the diamond structure ($sp^3$ bonds). The intensity ratio of the G band and D band generally correlates with the crystallinity (degree of $sp^2$) of a carbon material, but this is inadequate as a definition since it does not also take into account the half-width of the band representing the crystallinity. The half-width indicates the width of the Raman shift where the relative intensity is 50% with respect to the maximum intensity of the spectrum, and a smaller half-width of the G band may be considered to correspond to higher crystallinity. If the definition of crystallinity is the ratio $I_1/I_2$ ($Y_1$) of the intensity $I_1$ of the G band and the minimum peak intensity $I_2$ appearing near a Raman shift of 1470 $cm^{-1}$, then the half-width can also be considered in addition to the peak intensity. The values of $I_1$ and $I_2$ are the intensities after baseline compensation. The term "baseline compensation" refers to correcting the baseline slope by approximating the baseline of the spectrum with a straight line in a Raman shift range of 500 $cm^{-1}$ to 2200 $cm^{-1}$, and using the distance from the straight line as the peak intensity. The qualifier "near" is used because the extreme wavenumber of a Raman spectrum fluctuates to some extent due to differences in the microstructure of the active carbon.

The $Y_1$ value of the active carbon is 0.40 to 0.50 (i.e., 2.0≤$Y_1$≤5.5, 2.0≤$I_1/I_2$≤5.5). Since a $Y_1$ value of 2.0 or greater corresponds to high crystallinity and high electron conductivity of the active carbon, it is advantageous for decomposition reaction of the alkali metal compound in the positive electrode precursor or positive electrode. Moreover, because the degree of $sp^2$ of a carbon material falls as the positive electrode undergoes degradation, a material with a high degree of $sp^2$ may be used to obtain an electrode with high durability. A $Y_1$ value of 5.5 or lower, on the other hand, reduces secondary reactions resulting from excessively high electron conductivity, and is therefore advantageous for decomposition reaction of the alkali metal compound in the positive electrode precursor or positive electrode.

The value of $Y_1$ is more preferably 2.5 to 5.0 and even more preferably 2.8 to 4.5.

The product $X_1Y_1$ between $X_1$ and $Y_1$ is a parameter representing the reaction site size and electron conductivity, and it indicates the ease with which chemical reaction takes place. For this embodiment, $X_1Y_1$ is preferably 10 to 28 (i.e., 10≤$X_1Y_1$≤28, 10≤$X_1I_1/I_2$≤28). If $X_1Y_1$ is 10 or greater, decomposition reaction of the alkali metal compound will take place smoothly at the positive electrode precursor or positive electrode. With a $X_1Y_1$ value of 28 or lower, secondary reactions other than the alkali metal compound oxidation reaction can be inhibited. From the same viewpoint, $X_1Y_1$ is more preferably 13 to 27.

The active carbon for this embodiment is characterized by its functional group content. The functional group content $Z_1$ of the active carbon of this embodiment is the value determined by the following method. Specifically, the functional group content $Z_1$ is the quantity of surface functional groups determined by heating the sample at 50° C. to 1000° C. and identifying the components in the generated decomposition gas using a mass spectrometer, taking into account the temperature during gas generation.

Measurement of the functional group content throughout the present specification was carried out under the following conditions.

An FRONTIER LAB Py3030D is used as the thermal decomposition apparatus.

The heating temperature conditions are heating at 20° C./min after holding the sample at 50° C. for 20 minutes, and then further holding at 1000° C. for 30 minutes.

The heating furnace temperature is 250° C.

The heating atmosphere is He gas.

The gas chromatography/mass spectrometry (GC/MS) apparatus used is an Agilent MSD5975, the column used is an Agilent FS, Deactivated, the temperature at the injection port and GC oven is 250° C., the ion source consists of ions generated by electron ionization at a temperature of 230° C., and 3 mg of sample is used.

The functional group content $Z_1$ of the active carbon is preferably 0.80 mmol/g to 2.5 mmol/g (i.e., 0.80≤$Z_1$ (mmol/g)≤2.5). If the functional group content $Z_1$ is 0.80 mmol/g or greater, the wettability of the electrode will increase to result in sufficient impregnation of the electrolyte solution, which will act advantageously on the alkali metal compound decomposition reaction. A functional group content $Z_1$ of 2.5 mmol/g or lower will reduce secondary reactions due to the functional groups. The functional group content $Z_1$ of the active carbon is more preferably 0.90 mmol/g to 2.1 mmol/g.

The BET specific surface area, mesopore volume, micropore volume and mean pore size of the active material for this embodiment are the values determined by the following respective methods. A sample is vacuum dried at 200° C. for a day and a night, and the adsorption/desorption isotherm is measured using nitrogen as the adsorbate. Using the obtained isotherm on the adsorption side, the BET specific surface area is calculated by the multipoint BET method or single point BET method, the mesopore volume by the BJH method, and the micropore volume by the MP method.

The BJH method is a method of calculation commonly used for analysis of mesopores, and it was advocated by Barrett, Joyner, Halenda et al. (NPL 1).

The MP method is a method in which a "t-plot" (NPL 2) is utilized to determine micropore volume, micropore area and micropore distribution, and it is the method proposed by R. S. Mikhail, Brunauer and Bodor (NPL 3).

The "mean pore size" is the value determined by dividing the total pore volume per mass of a sample, as obtained by measuring the equilibrium adsorption volumes of nitrogen gas under different relative pressures at the temperature of liquid nitrogen, by the aforementioned BET specific surface area.

(Aspect Using Active Carbon)

The active carbon may be a single type of active carbon or a mixture of two or more different types of active carbon, such that the mixture as a whole exhibits the characteristic values described above.

The positive electrode active material may also contain a material other than active carbon (for example, active carbon not having the mesopore volume $V_1$ and/or micropore volume $V_2$ specified above, or a material other than active carbon (for example, a conductive polymer)).

According to a typical aspect, representing the mass ratio of the active carbon content in the positive electrode active material layer as $A_1$, or if the positive electrode active material of the positive electrode contains a conductive filler, a binder and a dispersion stabilizer, representing the total amount of the active carbon and these materials as $A_1$:

$A_1$ is preferably 15 mass % to 65 mass % and more preferably 20 mass % to 50 mass %.

If $A_1$ is 15 mass % or greater, this increases the contact area between the carbon material with high electric conductivity and the alkali metal compound, accelerating the oxidation reaction of the alkali metal compound during the predoping step and allowing predoping to be completed in a short period of time. If $A_1$ is 65 mass % or lower, the bulk density of the positive electrode active material layer increases, allowing higher capacitance to be achieved.

(Lithium Transition Metal Oxide)

The positive electrode active material preferably further contains a lithium transition metal compound. The capacitance of the non-aqueous lithium power storage element can be increased by including a lithium transition metal oxide. The lithium transition metal oxide includes a transition metal oxide capable of occlusion and release of lithium. There are no particular restrictions on the transition metal oxide to be used as the positive electrode active material. Examples of transition metal oxides include oxides containing one or more elements selected from the group consisting of cobalt, nickel, manganese, iron, vanadium and chromium. The transition metal oxide may be, specifically, a compound represented by the following formula:

$Li_xCoO_2$ {where x satisfies 0≤x≤1}, $Li_xNiO_2$ {where x satisfies 0≤x≤1}, $Li_xNi_yM_{(1-y)}O_2$ {where M is at least one element selected from the group consisting of Co, Mn, Al, Fe, Mg and Ti, x satisfies 0≤x≤1, and y satisfies 0.05<y<0.97}, $Li_xNi_{1/3}Co_{1/3}Mn_{1/3}O_2$ {where x satisfies 0≤x≤1}, $Li_xMnO_2$ {where x satisfies 0≤x≤1}, α-$Li_xFeO_2$ {where x satisfies 0≤x≤1}, $Li_xVO_2$ {where x satisfies 0≤x≤1}, $Li_xCrO_2$ {where x satisfies 0≤x≤1}, $Li_xFePO_4$ {where x satisfies 0≤x≤1}, $Li_xMnPO_4$ {where x satisfies 0≤x≤1}, $Li_zV_2(PO_4)_3$ {where z satisfies 0≤z≤3}, $Li_xMn_2O_4$ {where x satisfies 0≤x≤1}, $Li_xM_yMn_{(2-y)}O_4$ {where M is at least one element selected from the group consisting of Co, Mn, Al, Fe, Mg and Ti, x satisfies 0≤x≤1 and y satisfies 0.05<y<0.97}, $Li_xNi_aCo_bAl_{(1-a-b)}O_2$ {where x satisfies 0≤x≤1, and a and b satisfy 0.02<a<0.97 and 0.02<b<0.97}, and $Li_xNi_cCo_dMn_{(1-c-d)}O_2$ {where x satisfies 0≤x≤1, and c and d satisfy 0.02<c<0.97 and 0.02<d<0.97}.

Of these, one or more compounds selected from the group consisting of $Li_xNi_aCo_bAl_{(1-a-b)}O_2$ (where a, b and x satisfy 0.02<a<0.97, 0.02<b<0.97 and 0≤x≤1, respectively), $Li_xNi_cCo_dMn_{(1-c-d)}O_2$ (where c, d and x satisfy 0.02<c<0.97, 0.02<d<0.97 and 0≤x≤1, respectively), $Li_xCoO_2$ (where x satisfies 0≤x≤1), $Li_xMn_2O_4$ (where x satisfies 0≤x≤1), $Li_xFePO_4$ (where x satisfies 0≤x≤1), $Li_xMnPO_4$ (where x satisfies 0≤x≤1) and $Li_zV_2(PO_4)_3$ (where z satisfies 0≤z≤3) are preferred from the viewpoint of high capacitance, low resistance, cycle characteristics, alkali metal compound decomposition and preventing loss of the positive electrode active material during predoping.

For this embodiment, if an alkali metal compound different from the positive electrode active material is included in the positive electrode precursor, the alkali metal compound can serve as a dopant source for the alkali metal in predoping to allow predoping of the negative electrode, so that electrochemical charge-discharge as a non-aqueous lithium power storage element can be achieved even if a lithium ion is not already included in the transition metal compound (that is, even if x=0 or z=0).

The content of the lithium transition metal oxide in the positive electrode active material layer of the positive electrode is preferably 10.0 mass % to 50.0 mass %. If the content of the lithium transition metal oxide in the positive electrode active material layer of the positive electrode is 10.0 mass % or greater then a non-aqueous lithium power storage element with high capacitance can be obtained. A non-aqueous lithium power storage element with low resistance can be obtained if the value is 50.0 mass % or lower.

The content of the lithium transition metal oxide in the positive electrode active material layer of the positive electrode precursor is preferably 8.0 mass % to 30.0 mass %. If the content of the lithium transition metal oxide in the positive electrode active material layer of the positive electrode precursor is 8.0 mass % or greater then a non-aqueous lithium power storage element with high capacitance can be obtained. A non-aqueous lithium power storage element with low resistance can be obtained if the value is 30.0 mass % or lower.

(Carbon Nanotubes)

The positive electrode active material layer contains carbon nanotubes.

The carbon nanotubes used in the positive electrode active material layer are preferably multilayer carbon nanotubes. The mean fiber diameter of the carbon nanotubes is preferably 2 nm or greater and less than 100 nm and more preferably 3 nm to 80 nm. A mean fiber diameter of 2 nm or greater will improve the dispersibility of the carbon nanotubes. A mean fiber diameter of less than 100 nm allows high output to be obtained.

The carbon nanotubes of this embodiment can be synthesized by an appropriate method such as chemical vapor deposition, arc discharge or laser evaporation.

The content ratio of the carbon nanotubes in the positive electrode active material layer of the positive electrode is preferably 6.0 mass % to 33.0 mass % and more preferably 7.0 mass % to 30.0 mass %, where 100 mass % is the total mass of the positive electrode active material layer of the positive electrode. A value of 6.0 mass % or greater can yield a power storage element with high output. If the value is 33.0 mass % or lower, the energy density of the power storage element can be increased.

The content ratio of the carbon nanotubes in the positive electrode active material layer of the positive electrode precursor is preferably 5.0 mass % to 20.0 mass % and more preferably 6.0 mass % to 19.0 mass %, where 100 mass % is the total mass of the positive electrode active material layer of the positive electrode precursor. If the value is 5.0 mass % or greater, decomposition of the alkali metal compound can be accelerated and a power storage element with high output can be obtained. If the value is 20.0 mass % or lower, the energy density of the power storage element can be increased.

The total content ratio of the active carbon and carbon nanotubes in the positive electrode active material layer of the positive electrode may be 60.0 mass % to 90.0 mass %, where 100 mass % is the total mass of the positive electrode active material layer of the positive electrode.

The total content ratio of the active carbon and carbon nanotubes in the positive electrode active material layer of the positive electrode precursor may be 55.0 mass % to 85.0 mass %, where 100 mass % is the total mass of the positive electrode active material layer of the positive electrode precursor. A value of 55.0% or greater can increase the electron conductivity of the positive electrode precursor and accelerate decomposition of the alkali metal compound. If the value is 85.0% or lower, the porosity after decomposition of the alkali metal compound will increase, resulting in higher ion diffusibility and higher output of the obtained power storage element.

The carbon nanotubes are preferably homogeneously dispersed on the surface of the positive electrode active material.

By homogeneously dispersing the carbon nanotubes on the surface of the positive electrode active material it is possible to increase the electron conductivity and the binding between positive electrode active material particles, and to reduce the amount of binder that is mixed. Since decomposition of the binder gradually proceeds in high-temperature environments of 80° C. and higher, reducing the amount of binder that is mixed can impart durability for high-temperature environments of 80° C. and higher.

Quantitative evaluation of the dispersed state will be described below.

(Alkali Metal Compound)

The positive electrode active material layer of the positive electrode precursor of this embodiment contains an alkali metal compound. The alkali metal compound decomposes in the positive electrode precursor releasing cations, and is reduced at the negative electrode, allowing the negative electrode to be predoped.

The alkali metal compound in the positive electrode active material layer of the positive electrode precursor may remain or not remain in the positive electrode active material layer of the positive electrode. When the alkali metal compound remains in the positive electrode active material layer of the positive electrode, the preferred content is as specified below.

The alkali metal compound in the positive electrode active material layer of the positive electrode precursor will be described below.

(Other Components of Positive Electrode Active Material Layer)

The positive electrode active material layer of the positive electrode of the invention may also contain optional components such as dispersing agents, conductive fillers, binders, one or more atoms selected from among Fe atoms and Ni atoms, or pH adjustors, as necessary, in addition to the positive electrode active material, carbon nanotubes and alkali metal compound.

(Dispersing Agent)

The dispersing agent is not particularly restricted, and any one or more selected from among carboxymethyl cellulose, polycarboxylic acids, polycarboxylic acid salts, polyvinylpyrrolidone, polyvinyl alcohol, and surfactants may be used. Using two or more dispersing agents, in particular, can provide both dispersibility for the carbon nanotubes and stability for the coating solution. The dispersing agent is most preferably one including at least one type selected from among carboxymethyl cellulose, polyvinylpyrrolidone and polyvinyl alcohol, for example.

The total amount of dispersion stabilizer used is preferably 1.0 parts by mass to 7.0 parts by mass, with respect to 100 parts by solid mass of the positive electrode active material layer. If the amount of dispersion stabilizer is no greater than 7.0 parts by mass, on the other hand, a high input/output characteristic will be exhibited without inhibiting movement or diffusion of ions in and from the positive electrode active material.

(Conductive Filler)

The conductive filler preferably comprises a conductive carbonaceous material with higher conductivity than the positive electrode active material. Examples of such conductive fillers include one or more selected from among carbon black, graphite and graphene, as well as their mixtures. Carbon black includes Ketchen black and acetylene black, for example. Graphite includes flaky graphite, for example. Carbon black is particularly suitable for use as the conductive filler.

The amount of conductive filler mixed in the positive electrode active material layer of the positive electrode is preferably 0 to 20 parts by mass and more preferably in the range of 1 to 15 parts by mass, with respect to 100 parts by mass of the positive electrode active material. A larger amount of conductive filler is preferably added from the viewpoint of high input.

However, if the amount of addition is greater than 20 parts by mass, the energy density per volume of the positive electrode active material layer will be lower due to the reduced content ratio of the positive electrode active material in the positive electrode active material layer, and therefore it is not desirable.

(Binder)

The binder used may be, for example, polyvinylidene fluoride (PVdF), polytetrafluoroethylene (PTFE), fluorine rubber, or a polyimide, latex, styrene-butadiene copolymer or acrylic copolymer. The amount of binder used in the positive electrode active material layer is preferably 0 to 20 parts by mass and more preferably in the range of 0.1 to 15 parts by mass, with respect to 100 parts by mass of the positive electrode active material.

For this embodiment, the amount of binder used may be 0 parts by mass, since the carbon nanotubes cover the surface of the positive electrode active material and cross-link between the positive electrode active material particles. It is thus possible to improve the ion diffusibility in the positive electrode active material layer and obtain a power storage element with higher output. If the amount of binder is 20 parts by mass or lower, ion diffusion in the active material pores can be accelerated without excess binder on the surface of the positive electrode active material.

(One or More Atoms Selected from Among Fe Atoms and Ni Atoms)

One or more atoms selected from among Fe atoms and Ni atoms may be included in the positive electrode active material layer. In this case, the total concentration of Fe atoms and Ni atoms is preferably 1 ppm to 500 ppm, based on the total mass of the positive electrode active material layer. It is more preferably 2 ppm to 300 ppm and even more preferably 3 ppm to 200 ppm. If the concentration of Fe or Ni atoms is 1 ppm or greater, the Fe or Ni atoms will be able to catalytically accelerate decomposition of the alkali metal compound. If the concentration of Fe or Ni atoms is 500 ppm or lower, decomposition of the solvent will be inhibited, resulting in higher voltage for the non-aqueous lithium power storage element.

(pH Adjustor)

When water is used as the solvent for the coating solution to form the positive electrode active material layer, addition of an alkali metal compound may render the coating solution alkaline. A pH adjustor may therefore be added as necessary to the coating solution for formation of the positive electrode active material layer.

Examples of pH adjustors include, but are not particularly limited to, hydrogen halides such as hydrofluoric acid, hydrochloric acid and hydrobromic acid; halogen oxoacids such as hypochlorous acid, chlorous acid and chloric acid; carboxylic acids such as formic acid, acetic acid, citric acid, oxalic acid, lactic acid, maleic acid and fumaric acid; sulfonic acids such as methanesulfonic acid, benzenesulfonic acid and p-toluenesulfonic acid; and other acids such as nitric acid, sulfuric acid, phosphoric acid, boric acid and carbon dioxide.

(Preferred Aspect of Positive Electrode Active Material Layer of Positive Electrode)

In the non-aqueous lithium power storage element of this embodiment, it is intended for an alkali metal ion to be predoped in the negative electrode. The predoping method is preferably a method of applying a voltage between the positive electrode precursor and negative electrode, after the power storage element has been assembled using the positive electrode precursor containing an alkali metal compound, the negative electrode, the separators, the external body and the non-aqueous electrolyte. Voltage application results in decomposition of the alkali metal compound and release of cations in the positive electrode precursor, the cations being reduced at the negative electrode, thereby predoping the negative electrode.

Decomposition of the alkali metal compound is an oxidative decomposition reaction. For proper reaction to take place it is necessary to appropriately control the reaction area between the positive electrode precursor and non-aqueous electrolyte and the electron conductivity of the positive electrode precursor.

By carrying out the negative electrode alkali metal doping step, the positive electrode precursor of this embodiment is converted to a positive electrode.

Decomposition of the alkali metal compounds in the positive electrode active material layer of the positive electrode, which has been subjected to the negative electrode alkali metal doping step, causes formation of pores and increases the effective area of the positive electrode active material layer. However, alkali metal which has not been consumed in the negative electrode alkali metal doping step may remain in the positive electrode active material layer of the positive electrode.

The positive electrode of this embodiment is preferably a positive electrode comprising a positive electrode current collector, and a positive electrode active material layer on one or both sides of the positive electrode current collector, wherein:

the positive electrode active material layer comprises a positive electrode active material, carbon nanotubes and an alkali metal compound other than the positive electrode active material, the positive electrode active material comprises active carbon, the mass ratio of the alkali metal compound with respect to the total mass of the positive electrode active material layer in the positive electrode, represented as C2 (mass %), is $0.1 \leq C2 \leq 7.0$, and in a binarized SEM image of 1,280×890 pixels (1 pixel=9.96 nm) taken of the surface of the positive electrode active material layer of the positive electrode at a magnification of 10,000×, the area ratio Z'2 of the total area of maximum inscribed circles with diameters of less than 100 nm occupying the total area of the maximum inscribed circles is 7.5% to 35.0%, where a set of the maximum inscribed circles encompassing each of the pixels, for all of the pixels in the bright field regions, is represented as a frequency distribution for each diameter.

Since the alkali metal compound in the positive electrode active material layer of the positive electrode precursor is used as a doping source for the negative electrode in the alkali metal doping step, the alkali metal compound content in the positive electrode active material layer of the positive electrode that has been subjected to the alkali metal doping step is lower than the alkali metal compound content in the positive electrode active material layer of the positive electrode precursor.

The mass ratio C2 (mass %) of the alkali metal compound with respect to the total mass of the positive electrode active material layer of the positive electrode is $0.1 \leq C2 \leq 7.0$, preferably $0.5 \leq C2 \leq 6.0$, more preferably $1.0 \leq C2 \leq 5.0$ and even more preferably $1.5 \leq C2 \leq 4.5$.

Quantitation of the alkali metal element in the positive electrode active material layer of the positive electrode may be carried out by ICP-AES, atomic absorption spectroscopy, fluorescent X-ray analysis, neutron activation analysis, ICP-MS or the like.

With the positive electrode of this embodiment, in a binarized SEM image taken of the surface of the positive electrode active material layer, the area ratio Z'2 of maximum inscribed circles with diameters of less than 100 nm is 7.5% to 35.0%, where for all of the pixels in the bright field regions, the set of the maximum inscribed circles encompassing each of the pixels is expressed as a frequency distribution for each diameter. The area ratio Z'2 is 7.5% to 35.0%, preferably 7.7% to 33.0%, more preferably 8.0% to 30.0% and even more preferably 10.0% to 25.0%.

The area ratio Z'2 of the total area of maximum inscribed circles with diameters of less than 100 nm occupying the total area of the maximum inscribed circles can be calculated by the following method, using an SEM image of the surface of the positive electrode active material of the positive electrode.

The surface of the positive electrode active material layer is photographed as an SEM image at 1,280×960 pixel resolution under magnification of 10,000×. Next, the image is cut out to 1,280×890 pixels, removing the caption under the image, and processed under the following conditions using ImageJ (open source, public domain image processing software).

Median filter treatment is carried out with a setting of 1 nm=0.1004 pixels (with the radius at 2.0 pixels), and the SEM image is binarized based on a threshold determined by the Otsu method. The bright field regions are extracted from the obtained binarized image and used for analysis. Carbon nanotubes are expected to be abundantly covering the surface of the positive electrode active material layer in the bright field regions. The dark field regions, on the other hand, usually correspond to shadows of surface irregularities of the positive electrode active material layer and can be ignored.

Maximum inscribed circles encompassing each of the pixels are assumed for all of the pixels in the regions of bright field shading. A set of the assumed maximum inscribed circles is represented as a frequency distribution for each diameter.

When multiple overlapping maximum inscribed circles have overlapping sections, each of the overlapping maximum inscribed circles being considered to have the area described below, the value of that area divided by the area of the maximum inscribed circle as a complete circle is used in counting the number of maximum inscribed circles:

(1) if the diameters of the multiple overlapping maximum inscribed circles are equal, then the areas of the overlapping sections are proportionally divided with the other maximum inscribed circles, and (2) if the diameters of the multiple overlapping maximum inscribed circles differ to some degree, then each area of overlapping section is assigned to the maximum inscribed circle of maximum diameter, and the area of the maximum inscribed circle with the smaller diameter is set as the area of a section not overlapping with another maximum inscribed circle of larger diameter.

The total area of the maximum inscribed circles can be adjusted by this process to match the area of the bright field regions.

The procedure yields a frequency distribution for each maximum inscribed circle diameter. Based on this frequency distribution it is possible to determine the area ratio Z'2 of maximum inscribed circles with diameters of less than 100 nm.

During the actual procedure, "Thickness" was executed using the ImageJ plugin BoneJ for a region extracted from the binarized image, to obtain a frequency distribution for each diameter of the maximum inscribed circles among all of the pixels, and Z'2 was calculated using it. The procedure was carried out for 10 arbitrary visual fields in the SEM image of the positive electrode active material surface, and the average value for the 10 visual fields was used as Z'2.

(X-Ray Diffraction Measurement of Positive Electrode Active Material Layer of Positive Electrode)

With the positive electrode of this embodiment, in the XRD (X-ray diffraction) spectrum measured for the positive electrode active material layer, preferably there is a peak X1 having a peak top with 2θ in the range of 25.7° to 27.0°, and the half-width of the peak X1 is 0.1° to 0.5°. If 2θ of peak X1 is 25.7° or greater, then presumably pores are present between the positive electrode active material particles allowing easy diffusion of ions, increasing ion diffusion within the positive electrode active material layer and resulting in higher output. If 2θ of peak X1 is 27.0° or smaller, then presumably the positive electrode active material surface is covered with the carbon nanotubes in an evenly distributed manner, increasing the electron conductivity in the positive electrode active material and thus resulting in higher output.

[Positive Electrode Active Material Layer of Positive Electrode Precursor]

The positive electrode precursor of this embodiment has a positive electrode current collector and a positive electrode active material layer containing a positive electrode active material, formed on one or both sides thereof. The positive electrode active material layer of this embodiment contains a positive electrode active material, carbon nanotubes and an alkali metal compound other than the positive electrode active material, and it may also contain other optional components.

The positive electrode active material, carbon nanotubes and optional components in the positive electrode active material layer of the positive electrode precursor are the same as described above as the positive electrode active material, carbon nanotubes and optional components in the positive electrode active material layer of the positive electrode.

The alkali metal compound other than the positive electrode active material, which is an essential component for the positive electrode active material layer of the positive electrode precursor of this embodiment, will now be described.

(Alkali Metal Compound Other than Positive Electrode Active Material)

Examples for the alkali metal compound in the positive electrode active material layer of the positive electrode precursor of this embodiment include oxides such as $M_2O$; hydroxides such as MOH; and halides such as MF and MCl; and carboxylates represented by RCOOM (where R is H or an alkyl or aryl group), with M being one more selected from among Li, Na, K, Rb and Cs, and one or more of these may be used. Specific examples of alkali metal compounds include lithium carbonate, sodium carbonate, potassium carbonate, rubidium carbonate, cesium carbonate, lithium oxide and lithium hydroxide. An alkali metal compound is suitably one or more alkali metal carbonates selected from among lithium carbonate, sodium carbonate, potassium carbonate, rubidium carbonate and cesium carbonate, more suitably lithium carbonate, sodium carbonate or potassium carbonate, and from the viewpoint of high capacity per unit mass, most suitably lithium carbonate.

The positive electrode precursor of this embodiment may be any one containing at least one type of alkali metal compound, and the positive electrode precursor of this embodiment may also contain one or more selected from among carbonates, oxides, hydroxides, halides and carboxylates of alkaline earth metals selected from the group consisting of Be, Mg, Ca, Sr and Ba, either instead of the aforementioned alkali metal compound or together with the aforementioned alkali metal compound.

When an alkali metal compound is used, an alkaline earth metal compound is preferably in fine particulate form.

For this embodiment, the mean particle size of the alkali metal compound is preferably 0.1 μm to 10 μm. If the mean particle size is 0.1 μm or greater, its dispersibility in the positive electrode precursor will be excellent. If the mean particle size is 10 μm or smaller, the surface area of the alkali metal compound will increase, and decomposition reaction will proceed efficiently.

The mean particle size of the alkali metal compound is preferably smaller than the mean particle size of the active carbon mentioned above. If the mean particle size of the alkali metal compound is smaller than the mean particle size of the active carbon, then this can contribute to lower resistance of the electrode body or power storage element, in order to increase electron conduction of the positive electrode active material layer.

The method of measuring the mean particle size of the alkali metal compound in the positive electrode precursor is not particularly restricted, and calculation may be from an SEM image and SEM-EDX image of the positive electrode cross-section. The method of forming the positive electrode cross-section may employ BIB processing in which an Ar beam is irradiated from above the positive electrode, and a smooth cross-section is created along the edges of a masking shield set directly above the sample.

Various methods may be used for micronization of the alkali metal compound. For example, a pulverizer such as a ball mill, bead mill, ring mill, jet mill or rod mill may be used.

The content ratio of the alkali metal compound in the positive electrode active material layer of the positive electrode precursor is preferably 15.0 mass % to 45.0 mass %, where 100 mass % is the total mass of the positive electrode active material. If the value is 15.0 mass % or greater, it will be possible to predope the alkali metal ion in a sufficient amount in the negative electrode, thereby increasing the capacity of the non-aqueous lithium power storage element. If the value is 45.0 mass % or lower, electron conduction in the positive electrode precursor can be increased and decomposition of the alkali metal compound can efficiently take place.

When the positive electrode precursor contains the aforementioned two or more alkali metal compounds or alkaline earth metal compounds in addition to an alkali metal compound, the total amount of the alkali metal compounds and alkaline earth metal compounds is preferably in the range specified above.

Quantitation of the alkali metal element and alkaline earth metal element may be carried out by ICP-AES, atomic absorption spectroscopy, fluorescent X-ray analysis, neutron activation analysis, ICP-MS or the like.

[Positive Electrode Current Collector]

The material composing the positive electrode current collector of this embodiment is not particularly restricted so long as it is a material with high electron conductivity, and which does not undergo degradation by elution into the electrolyte solution or reaction with the electrolyte or ion, but a metal foil is preferred. An aluminum foil is preferred as the positive electrode current collector for the non-aqueous lithium power storage element of this embodiment.

The metal foil may be a common metal foil without irregularities or through-holes, or it may be a metal foil having irregularities formed by embossing, chemical etching, electrolytic deposition or blasting, or it may be a metal foil having through-holes, such as an expanded metal, punching metal or etching foil.

From the viewpoint of the predoping treatment described below, a nonporous aluminum foil is more preferred, and most preferably the aluminum foil has a roughened surface.

The thickness of the positive electrode current collector is not particularly restricted so long as it allows the shape and strength of the positive electrode to be maintained, but 1 to 100 μm, for example, is preferred.

The surface of the metal foil is preferably provided with an anchor layer containing a conducting material such as graphite, flaky graphite, carbon nanotubes, graphene, Ketchen black, acetylene black or vapor-deposited carbon fibers. Providing an anchor layer improves electrical conduction between the positive electrode current collector and positive electrode active material layer and can lower the resistance. The thickness of the anchor layer is preferably 0.1 μm to 5 μm for each side of the positive electrode current collector.

[Production of Positive Electrode Precursor]

According to this embodiment, the positive electrode precursor that is to be the positive electrode of the non-aqueous lithium power storage element can be produced by a known production technique for electrodes for lithium ion batteries or electrical double layer capacitors. For example, the positive electrode active material and alkali metal compound, as well as the other optional components that are used as necessary, may be dispersed and dissolved in water or an organic solvent to prepare a slurry-like coating solution, and the coating solution coated onto one or both sides of a positive electrode current collector to form a coating film, which is then dried to obtain a positive electrode precursor. The obtained positive electrode precursor may also be pressed to adjust the film thickness or bulk density of the positive electrode active material layer.

Preparation of the coating solution for formation of the positive electrode active material layer, application of the coating solution onto the positive electrode current collector, drying of the coated film and pressing may be carried out according to the respective methods described below for production of the negative electrode.

The thickness of the positive electrode active material layer of the positive electrode precursor of this embodiment is preferably 10 μm to 200 μm for each side of the positive electrode current collector. The thickness of the positive electrode active material layer per side is more preferably 20 μm to 100 μm, and even more preferably 30 μm to 80 μm, for each side. If the thickness is 10 μm or greater, sufficient charge-discharge capacity can be exhibited. If the thickness is 200 μm or smaller, on the other hand, the ion diffusion resistance in the electrode can be kept low. It will thus be possible to obtain an adequate output characteristic and to reduce the cell volume, thereby increasing the energy density.

The thickness of the positive electrode active material layer, when the positive electrode current collector has through-holes or irregularities, is the mean value of the thickness of the positive electrode active material layer for each side at the sections of the positive electrode current collector without through-holes or irregularities.

As mentioned above, the carbon nanotubes are preferably homogeneously dispersed on the surface of the positive electrode active material.

The method for homogeneously dispersing the carbon nanotubes on the surface of the positive electrode active material may be, for example, a method of preparing a dispersion of the carbon nanotubes beforehand and adding the positive electrode active material to and mixing it with the dispersion.

The dispersion preferably comprises a dispersing agent, together with the carbon nanotubes and solvent. The solvent may be water or NMP, for example. The dispersing agent used may be appropriately selected from among those mentioned above as dispersing agents for the positive electrode active material layer, and one or more selected from among carboxymethyl cellulose, polycarboxylic acid, polycarboxylic acid salts, polyvinylpyrrolidone, polyvinyl alcohol and surfactants may be suitably used. It is most preferred to use a dispersing agent that comprises at least one type selected from among carboxymethyl cellulose, polyvinylpyrrolidone and polyvinyl alcohol.

The carbon nanotube dispersion may be prepared by any method. An example is a method of dissolving the dispersing agent in a solvent, mixing the carbon nanotubes with the obtained solution and dispersing the carbon nanotubes with appropriate dispersion means. The dispersion means may be ultrasonic treatment, a ball mill or a bead mill, for example. A compound that provides one or more atoms selected from among Fe atoms and Ni atoms (such as iron(II) oxide or zinc oxide) may also be added to the carbon nanotube dispersion.

The positive electrode active material and alkali metal compound, and other optional components as necessary, are added to, mixed with and dispersed in the obtained carbon nanotube dispersion, to obtain a coating solution for formation of the positive electrode active material layer, containing the positive electrode active material with carbon nanotubes homogeneously dispersed on the surface.

By homogeneously dispersing the carbon nanotubes on the surface of the positive electrode active material it is possible to increase the electron conductivity and binding between the positive electrode active material particles, and to reduce the amount of binder that is mixed. Since decomposition of the binder gradually proceeds in high-temperature environments of 80° C. and higher, reducing the amount of binder that is mixed can impart durability for high-temperatures of 80° C. and higher.

The method of preparing the coating solution for formation of the positive electrode active material layer is not particularly restricted, and it may be carried out using a disperser such as a homodisperser or multiscrew disperser, planetary mixer, thin-film spinning high-speed mixer or the like. In order to obtain a coating solution in a satisfactorily dispersed state, it is preferred for the coating solution to be dispersed at a circumferential speed of 1 m/s to 50 m/s. It is preferred if the circumferential speed is 1 m/s or greater, because this will allow each material to satisfactorily dissolve or disperse. It is also preferred if the circumferential speed is no greater than 50 m/s, because breakdown of each material by heat or shear force during dispersion will be avoided, and reaggregation can be suppressed.

The degree of dispersion of the coating solution is preferably to a granularity of 0.1 µm to 100 µm, as measured with a fineness gauge. The upper limit for the degree of dispersion is more preferably 80 µm or lower and even more preferably 50 µm or lower, as the granularity measured with a fineness gauge. With a granularity in this range it will be possible to avoid crushing the material during preparation of the coating solution, and clogging of the nozzle or streaking of the coating film during application, thus allowing more stable application to be carried out.

The viscosity ($\eta b$) of the coating solution is preferably 1,000 mPa·s to 20,000 mPa·s, more preferably 1,500 mPa·s to 10,000 mPa·s and even more preferably 1,700 mPa·s to 5,000 mPa·s. If the viscosity ($\eta b$) is 1,000 mPa·s or higher, liquid dripping during formation of the coating film will be suppressed, and the coating film width and thickness can be satisfactorily controlled. If the viscosity is 20,000 mPa·s or lower there will be less pressure loss in the flow channel of the coating solution when a coating machine is used, allowing stable coating to be carried out, and allowing the coating film thickness to be easily controlled.

The TI value (thixotropy index value) of the coating solution is preferably 1.1 or greater, more preferably 1.2 or greater and even more preferably 1.5 or greater. If the TI value is 1.1 or greater, the coating film width and thickness can be satisfactorily controlled.

The method of forming a coating film of the positive electrode active material layer is not particularly restricted, and a coating machine such as a die coater, comma coater, knife coater or gravure coating machine may be suitably used. The coating film may be formed by monolayer coating or by multilayer coating. In the case of multilayer coating, the coating solution compositions may be adjusted so that the component contents differ within each layer of the coating film.

Application of the coating film onto the positive electrode current collector may be by multi-threaded coating, intermittent coating, or multi-threaded intermittent coating.

When the positive electrode active material layer is to be formed on both sides of the positive electrode current collector, sequential coating may be carried out with application and drying on one side of the positive electrode current collector followed by application and drying on the other side, or simultaneous coating may be carried out by simultaneously applying and drying the coating solution onto both sides of the positive electrode current collector. In this case, the difference in thickness of the positive electrode active material layer on the front side and back side of the positive electrode current collector is preferably no greater than 10% of the average thickness for both. If the mass ratio and film thickness ratio of the positive electrode active material layer on the front and back sides is nearer to 1.0, negative charge will not accumulate on either side during charge-discharge and the charge-discharge cycle characteristic under high load will be improved.

After the coated film of the positive electrode active material layer has been formed on the positive electrode current collector, it is dried.

Drying of the coated film of the positive electrode precursor is preferably carried out by an appropriate method such as hot air drying or infrared (IR) drying, and preferably using far-infrared rays, near infrared rays or hot air. Drying of the coated film may be drying at a single temperature, or it may be drying while varying the temperature in different stages. Several drying methods may also be used in combination for drying.

The drying temperature is preferably 25° C. to 200° C., more preferably 40° C. to 180° C. and even more preferably 50° C. to 160° C. If the drying temperature is 25° C. or higher, it will be possible to adequately volatilize off the solvent in the coating film. If it is no higher than 200° C., on the other hand, it will be possible to reduce cracking of the coated film by rapid volatilization of the solvent or maldistribution of the binder by migration, and oxidation of the positive electrode current collector or positive electrode active material layer.

The moisture content of the positive electrode active material layer after drying is preferably 0.1 mass % to 10 mass %, where 100 mass % is the total mass of the positive electrode active material layer. If the moisture content is 0.1 mass % or greater, it will be possible to inhibit degradation of the binder by excessive drying, and to lower the resistance. If the moisture content is 10 mass % or lower it will be possible to inhibit inactivation of the alkali metal ion and to obtain higher capacitance.

When N-methyl-2-pyrrolidone (NMP) is used for preparation of the coating solution, the content of NMP in the dried positive electrode active material layer is preferably 0.1 mass % to 10 mass %, where 100% is the total mass of the positive electrode active material layer.

The moisture content in the positive electrode active material layer can be measured by the Karl Fischer titration method (JIS 0068(2001), "Moisture measurement method for chemical products").

The amount of NMP in the positive electrode active material layer can be quantified by immersing the positive electrode active material layer for 24 hours in ethanol at a mass of 50 to 100 times the mass of the positive electrode active material layer, in an environment of 25° C. to extract the NMP, and then measuring it by GC/MS and comparing it against a previously prepared calibration curve.

Pressing of the positive electrode active material layer is preferably carried out using a suitable pressing machine such as a hydraulic press, vacuum pressing machine or roll press. The film thickness, bulk density and electrode strength of the positive electrode active material layer can be adjusted by the pressing pressure, the gap between the press rolls, and the surface temperature of the pressing section, as described below. The pressing pressure is preferably 0.5 kN/cm to 20 kN/cm, more preferably 1 kN/cm to 10 kN/cm and even more preferably 2 kN/cm to 7 kN/cm. If the pressing pressure is 0.5 kN/cm or greater, it will be possible to adequately increase the electrode strength. If the pressing pressure is 20 kN/cm or lower, there will be no distortion or wrinkling in the positive electrode precursor, and adjustment can be made to the desired film thickness and bulk density for the positive electrode active material layer.

When a roll press is used for pressing, the gap between the press rolls may be set to an appropriate value so that the positive electrode active material layer has the desired thickness and bulk density.

The pressing speed may be set to an appropriate speed, so as to avoid distortion and wrinkling in the positive electrode precursor.

The surface temperature of the pressing section may be room temperature, or it may be heated instead, if necessary. In the case of heating, the lower limit for the surface temperature of the pressing section is preferably at least the melting point of the binder −60° C., more preferably at least the melting point of the binder −45° C., and even more preferably at least the melting point of the binder −30° C. The upper limit for the surface temperature of the pressing section in the case of heating is also preferably no higher than the melting point of the binder used +50° C., more preferably no higher than the melting point of the binder +30° C., and even more preferably no higher than the melting point of the binder +20° C.

For example, when polyvinylidene fluoride (melting point: 150° C.) is used as the binder, the pressing section is preferably heated to 90° C. to 200° C., more preferably 105° C. to 180° C. and even more preferably 120° C. to 170° C. When styrene-butadiene copolymer (melting point: 100° C.) is used as the binder, the pressing section is preferably heated to 40° C. to 150° C., more preferably 55° C. to 130° C. and even more preferably 70° C. to 120° C.

The melting point of the binder can be determined by the endothermic peak position in DSC (Differential Scanning calorimetry). For example, using a "DSC7" differential scanning calorimeter by Perkin-Elmer, with 10 mg of sample resin set in the measuring cell and increasing the temperature from 30° C. to 250° C. at a temperature-elevating rate of 10° C./min in a nitrogen gas atmosphere, the melting point is the endothermic peak temperature during the temperature elevation.

Pressing may also be carried out multiple times while varying the conditions including the pressing pressure, gap, speed, and pressing section surface temperature.

In the case of multi-threaded coating of the positive electrode active material layer, it is preferred to form slits before pressing. If pressing of the positive electrode precursor is carried out without slitting the multi-threaded coated positive electrode active material layer, this may result in application of excessive stress onto the sections of the positive electrode current collector that have not been coated with the positive electrode active material layer, potentially forming wrinkles. The positive electrode active material layer may also be re-slitted after pressing.

(SEM Analysis of Positive Electrode Active Material Layer of Positive Electrode Precursor)

With the positive electrode precursor of this embodiment, in a binarized SEM image taken of the surface of the positive electrode active material layer, the area ratio Z'1 for the total area of maximum inscribed circles with diameters of less than 100 nm, occupying the total area of the maximum inscribed circles, is 5.9% to 28.0%, where for all of the pixels in the bright field regions, a set of the maximum inscribed circles encompassing each of the pixels is expressed as a frequency distribution for each diameter.

The carbon nanotubes in the positive electrode precursor of this embodiment are preferably present in an evenly distributed manner throughout the entire positive electrode active material layer. Specifically, it is preferred for the carbon nanotubes to at least cover the surface of the positive electrode active material in an evenly distributed manner, and preferably to cover between the particles of the positive electrode active material and alkali metal compound in an evenly distributed manner.

If the area ratio Z'1 of maximum inscribed circles with diameters of less than 100 nm is 5.9% or greater, in a binarized SEM image taken of the surface of the positive electrode active material layer, the carbon nanotubes may be evaluated to be distributed in an even manner throughout the entire positive electrode active material layer. In this case both the positive electrode active material surface and the areas between the particles of the positive electrode active material and alkali metal compound are considered to be covered in an evenly distributed manner by carbon nanotubes with fiber diameters of less than 100 nm. If the positive electrode active material layer is in this state, then decomposition of alkali metal compound will be accelerated and capacity reduction and resistance increase of the power storage element in high-temperature environments will be inhibited. If the area ratio Z'1 of maximum inscribed circles with diameters of less than 100 nm is 28.0% or lower, then the ion diffusion rate in the positive electrode active material layer will increase, resulting in lower resistance of the positive electrode.

By homogeneously dispersing the carbon nanotubes on the surface of the positive electrode active material it is possible to increase the electron conductivity and binding between the positive electrode active material particles, and to reduce the amount of binder that is mixed. Since decomposition of the binder gradually proceeds in high-temperature environments of 80° C. and higher or in environments with high voltage of 4.1 V or higher, reducing the amount of binder that is mixed can impart durability for high-temperatures of 80° C. and higher and durability against high voltage of 4.1 V and higher.

The area ratio Z'1 can be calculated from an SEM image of the positive electrode active material layer of the positive electrode precursor, by the same method as for calculation of the area ratio Z'2 of maximum inscribed circles with diameters of less than 100 nm from an SEM image of the positive electrode active material layer of the positive electrode.

In the positive electrode precursor of the invention, the value of Z'1 determined by this method is 5.9% to 28.0%. The value of Z'1 is preferably 6.0% to 26.0%, more preferably 8.0% to 24.0%, even more preferably 8.5% to 22.0% and most preferably 10.0% to 20.0%.

<Negative Electrode>

The negative electrode of the invention has a negative electrode current collector, and a negative electrode active material layer situated on one or both sides thereof

[Negative Electrode Active Material Layer]

The negative electrode active material layer contains a negative electrode active material, carbon nanotubes and a dispersing agent, but it may additionally contain optional components such as a conductive filler, binder and metal compound, as necessary.

(Negative Electrode Active Material)

The negative electrode active material used may be a substance capable of occluding and releasing alkali metal ions. Examples include, specifically, carbon materials, titanates, silicon, silicon oxides, silicon alloys, silicon compounds, tin and tin compounds.

The negative electrode active material of this embodiment contains a carbon material, the content of the carbon material with respect to the total amount of the negative electrode active material preferably being 50 mass % or greater, and more preferably 70 mass % or greater. The carbon material content may be 100 mass %, but from the viewpoint of obtaining a satisfactory effect by combined use with other materials, it is preferably, for example, 95 mass % or lower, and may even be 90 mass % or lower. The upper limit and lower limit ranges for the carbon material content may be combined as desired.

In a Raman spectrum of the carbon material in the negative electrode active material, the R value, represented by the ratio Id/Ig of the peak intensity Id of the peak Pd of the D band (near 1,360 cm$^{-1}$) and the peak intensity Id of the peak Pg of the G band (near 1,580 cm$^{-1}$) is 0.6 or lower.

The non-aqueous lithium power storage element of this embodiment exhibits an excellent high-temperature storage characteristic by using a negative electrode active material containing a carbon material with an R value of 0.6 or lower in the Raman spectrum. While the principle is not fully understood, it is conjectured that adjusting the R value to 0.6 or lower can inhibit decomposition reaction of the non-aqueous electrolyte solution on the negative electrode surface, thereby improving the high-temperature storage characteristic at high voltage. Notably, when a positive electrode precursor comprises a lithium compound, the lithium compound will generally decompose upon application of high voltage, destroying the protective coating film (SEI) on the negative electrode surface and tending to generate gas at high temperature. If a negative electrode active material comprising a carbon material exhibiting an R value of 0.6 or lower is used, however, it is thought that decomposition of the lithium compound on the negative electrode surface is inhibited, allowing an excellent high-voltage, high-temperature storage characteristic to be exhibited as a result.

The R value of the carbon material in the Raman spectrum is preferably 0.05 to 0.5, more preferably 0.1 to 0.45, even more preferably 0.15 to 0.4 and most preferably 0.2 to 0.35.

Measurement of the Raman spectrum of the carbon material is conducted by microscopic Raman spectroscopy using laser light with a wavelength of 532 nm, for example.

Examples of carbon materials for the negative electrode active material include non-graphitizable carbon materials; easily graphitizable carbon materials; carbon black; carbon nanoparticles; active carbon; artificial graphite; natural graphite; graphitized mesophase carbon microspheres; graphite whiskers; amorphous carbonaceous materials such as polyacene-based materials; carbonaceous materials obtained by heat treatment of carbonaceous material precursors; thermal decomposition products of furfuryl alcohol resins or novolac resins; fullerenes; carbon nanofibers; and carbon materials that are composites of the foregoing. Such carbonaceous material precursors are not particularly restricted so long as they form carbonaceous materials by heat treatment, and examples include petroleum pitch, coal pitch, mesocarbon microbeads, coke and synthetic resins (for example, phenol resins).

Preferred among these, from the viewpoint of lowering the resistance of the negative electrode, are composite carbon materials obtained by heat treating a combination of:

at least one type of graphite material selected from among artificial graphite, natural graphite, graphitized mesophase carbon microspheres, graphite whiskers and high area-to-weight ratio graphite, and at least one type of carbonaceous material precursor such as petroleum pitch, coal pitch, mesocarbon microbeads, coke or a synthetic resin (such as a phenol resin), to form a complex of the graphite material and the carbonaceous material derived from the carbonaceous material precursor.

The carbonaceous material precursor is not particularly restricted so long as it is converted to a carbonaceous material by heat treatment, but petroleum pitch or coal pitch is especially preferred.

Before the heat treatment, the graphite material and the carbonaceous material precursor may be mixed at a temperature higher than the melting point of the carbonaceous material precursor. The heat treatment temperature may be any temperature such that the components generated by volatilization or thermal decomposition of the carbonaceous material precursor that is used form a carbonaceous material, and it is preferably 400° C. to 2,500° C., more preferably 500° C. to 2,000° C., and even more preferably 550° C. to 1,500° C. The atmosphere for heat treatment is not particularly restricted, but it is preferably a non-oxidizing atmosphere.

The BET specific surface area of the composite carbon material is preferably 1 m$^2$/g to 50 m$^2$/g, more preferably 1.5 m$^2$/g to 40 m$^2$/g and even more preferably 2 m$^2$/g to 25 m$^2$/g. If the BET specific surface area of the composite carbon material is 1 m$^2$/g or greater, it will be possible to ensure an adequately large number of reaction sites with lithium ions in the non-aqueous electrolyte solution, thereby allowing a high input/output characteristic to be exhibited. If the BET specific surface area of the composite carbon material is no greater than 50 m$^2$/g, the lithium ion charge-discharge efficiency will be increased and reductive decomposition of the non-aqueous electrolyte solution during charge-discharge will be inhibited, thus allowing a high high-load charge-discharge cycle characteristic to be exhibited.

The mean pore size of the composite carbon material is preferably 1.5 nm to 25 nm, more preferably 2 nm to 22 nm, even more preferably 3 nm to 20 nm and most preferably 3.5 nm to 18 nm. If the mean pore size of the composite carbon material is 1.5 nm or greater, there will be more pores with sizes larger than lithium ion solvated in the non-aqueous electrolyte solution (approximately 0.9 nm to 1.2 nm), and therefore diffusion of the solvated lithium ion in the composite carbon material will be satisfactory, and a non-aqueous lithium power storage element using it can exhibit a high input/output characteristic. If the mean pore size of the composite carbon material is 25 nm or smaller, on the other hand, the bulk density of the negative electrode active material layer using it can be sufficiently increased, and therefore high energy density can be exhibited.

The composite carbon material may be in particulate form, with a mean particle size of preferably 1 μm to 10 μm, more preferably 2 μm to 8 μm and even more preferably 3 μm to 6 μm. If the mean particle size of the composite carbon material is 1 μm or larger it will be possible to increase the lithium ion charge-discharge efficiency, and to thus exhibit a high high-load charge-discharge cycle characteristic. If the mean particle size of the composite carbon material is 10 μm or smaller, the number of reaction sites with lithium ions in the non-aqueous electrolyte solution will increase, allowing a high input/output characteristic to be exhibited.

The mass ratio of the carbonaceous material with respect to the graphite material in the composite carbon material is preferably 1 mass % to 20 mass %, more preferably 1.2 mass % to 15 mass %, even more preferably 1.5 mass % to 10 mass % and yet more preferably 2 mass % to 5 mass %. If the mass ratio of the carbonaceous material is 1 mass % or greater, the number of reaction sites with lithium ion in the non-aqueous electrolyte solution can be adequately increased by the carbonaceous material, and desolvation of the lithium ion will be facilitated, thus allowing a high input/output characteristic to be exhibited. If the mass ratio of the carbonaceous material is no greater than 20 mass %, it will be possible to satisfactorily maintain solid diffusion of lithium ions between the carbonaceous material and graphite material, and therefore a high input/output characteristic can be exhibited. In addition, the lithium ion charge-discharge efficiency can be increased, and consequently a higher high-load charge-discharge cycle characteristic can be exhibited.

The lithium ion doping amount per unit mass of the composite carbon material is preferably 50 mAh/g to 700 mAh/g, more preferably 70 mAh/g to 650 mAh/g, even more preferably 90 mAh/g to 600 mAh/g and yet more preferably 100 mAh/g to 550 mAh/g.

Doping lithium ion lowers the potential of the negative electrode. Thus, when a negative electrode containing composite carbon material doped with lithium ion is combined with a positive electrode, the voltage of the non-aqueous lithium power storage element is increased and the utilizable capacity of the positive electrode is increased. Therefore, the capacitance and energy density of the obtained non-aqueous lithium power storage element increases.

If the lithium ion doping amount per unit mass of the composite carbon material is 50 mAh/g or greater, lithium ion will be satisfactorily doped even at irreversible sites where lithium ion in the composite carbon material cannot be desorbed after once being inserted, and therefore high energy density can be obtained. As the doping amount increases, the negative electrode potential decreases and the input/output characteristic, energy density and durability increase.

If the lithium ion doping amount per unit mass of the composite carbon material is 700 mAh/g or lower, side-effects of lithium metal deposition and the like will be less likely to occur.

The BET specific surface area of the graphite material used in the composite carbon material is preferably 0.5 m²/g to 80 m²/g, more preferably 1 m²/g to 70 m²/g and even more preferably 1.5 m²/g to 60 m²/g. If the BET specific surface area of the graphite material used in the composite carbon material is within this range, it will be possible to adjust the BET specific surface area of the composite carbon material to within the range specified above.

The graphite material used in the composite carbon material may be in particulate form, with a mean particle size of preferably 1 μm to 10 μm and more preferably 2 μm to 8 μm. If the mean particle size of the graphite material used in the composite carbon material is in the range of 1 μm to 10 μm, it will be possible to adjust the mean particle size of the composite carbon material to within the range specified above.

A carbonaceous material precursor to be used as a starting material for the composite carbon material is a solid, liquid or solvent-soluble organic material that allows the carbonaceous material to be composited with a graphite material by heat treatment. The carbonaceous material precursor may be, for example, pitch, mesocarbon microbeads, coke or a synthetic resin such as a phenol resin, for example. Among such carbonaceous material precursors, the use of inexpensive pitch is preferred in terms of production cost. Pitch is largely classified as petroleum pitch or coal pitch. Examples of petroleum pitch include crude oil distillation residue, fluid catalytic cracking residue (decant oil and the like), bottom oil from thermal crackers, and ethylene tar obtained during naphtha cracking.

The negative electrode active material is preferably in particulate form.

The content ratio of the negative electrode active material in the negative electrode active material layer of the negative electrode precursor is preferably 70 mass % or greater and more preferably 80 mass % or greater, based on the total mass of the negative electrode active material layer.

(Carbon Nanotubes)

The carbon nanotubes of this embodiment are preferably multilayer carbon nanotubes. The mean fiber diameter of the carbon nanotubes is preferably 2 nm or greater and less than 100 nm and more preferably 3 nm to 80 nm. A mean fiber diameter of 2 nm or greater will improve the dispersibility of the carbon nanotubes. A mean fiber diameter of less than 100 nm allows high output to be obtained.

The carbon nanotubes of this embodiment can be synthesized by an appropriate method such as chemical vapor deposition, arc discharge or laser evaporation.

The content ratio of the carbon nanotubes in the negative electrode active material layer is preferably 5.0 mass % to 30.0 mass % and more preferably 6.0 mass % to 25.0 mass %, where 100 mass % is the total mass of the negative electrode active material layer.

In the negative electrode active material layer, the total content ratio of the carbon material and carbon nanotubes is preferably 60.0 mass % or greater and less than 100.0 mass %, more preferably 70.0 mass % to 99.0 mass % and even more preferably 80.0 mass % to 98.0 mass %, with 100 mass % as the total mass of the negative electrode active material layer.

The carbon nanotubes are preferably homogeneously dispersed on the surface of the negative electrode active material.

By homogeneously dispersing the carbon nanotubes on the surface of the negative electrode active material it is possible to increase the electron conductivity and binding between the negative electrode active material particles, and to reduce the amount of binder that is mixed. Since decomposition of the binder gradually proceeds in high-temperature environments of 80° C. and higher, reducing the amount of binder that is mixed can impart durability for high-temperature environments of 80° C. and higher.

Quantitative evaluation of the dispersed state will be described below.

(Dispersing Agent)

The dispersing agent is not particularly restricted, and any one or more selected from among carboxymethyl cellulose, polycarboxylic acids, polycarboxylic acid salts, polyvinylpyrrolidone, polyvinyl alcohol, and surfactants may be used. Using two or more dispersing agents, in particular, can provide both dispersibility for the carbon nanotubes and stability for the coating solution. The dispersing agent is most preferably one including at least one type selected from among carboxymethyl cellulose, polyvinylpyrrolidone and polyvinyl alcohol, for example.

The total amount of dispersion stabilizer used is preferably 1.0 parts by mass to 7.0 parts by mass, with respect to 100 parts by solid mass of the negative electrode active material layer. If the amount of dispersion stabilizer is 7.0 parts by mass or less, on the other hand, a high input/output characteristic will be exhibited without inhibiting movement or diffusion of ions in and from the negative electrode active material.

(Other Components of Negative Electrode Active Material Layer)

The negative electrode active material layer of this embodiment may also contain optional components such as a conductive filler, binder and conductive filler, as necessary, in addition to the negative electrode active material.

The binder used may be, for example, polyvinylidene fluoride (PVdF), polytetrafluoroethylene (PTFE), fluorine rubber, or a polyimide, latex, styrene-butadiene copolymer or acrylic copolymer. The amount of binder used in the negative electrode active material layer is preferably 0 to 20 parts by mass and more preferably in the range of 0.1 to 15 parts by mass, with respect to 100 parts by mass of the negative electrode active material.

For this embodiment, the amount of binder used may be 0 parts by mass, since the carbon nanotubes cover the surface of the negative electrode active material and cross-link between the negative electrode active material particles. It is thus possible to improve the ion diffusibility in the negative electrode active material layer and obtain a power storage element with higher output. When the negative electrode active material layer contains essentially no carbon nanotubes, however, or when the carbon nanotubes are aggregated without being shredded, a binder amount of 0.1 parts by mass or greater can sufficiently increase adhesiveness between the negative electrode current collector and the negative electrode active material layer, and can lower interface resistance between the current collector and the active material layers. If the amount of binder is 20 parts by mass or lower, on the other hand, ion diffusion in the active material pores can be accelerated without excess binder on the surface of the negative electrode active material.

The conductive filler preferably comprises a conductive carbonaceous material with higher conductivity than the negative electrode active material. Examples of such conductive fillers include one or more selected from among carbon black, graphite and graphene, as well as their mixtures. Carbon black includes Ketchen black and acetylene black, for example. Graphite includes flaky graphite, for example. Carbon black is particularly suitable for use as the conductive filler.

The amount of conductive filler mixed in the negative electrode active material layer is preferably 25 parts by mass or less, and more preferably in the range of 5 mass % to 20 parts by mass, with respect to 100 parts by mass of the negative electrode active material. The conductive filler is preferably mixed with the negative electrode active material layer from the viewpoint of higher input, but limiting the mixing amount to no greater than 25 parts by mass is preferred from the viewpoint of maintaining energy density per volume of the power storage element.

A metal compound may also be included in the negative electrode active material layer to aid homogeneous dispersion of the carbon nanotubes.

The metal compound used may be a compound containing one or more atoms selected from among Fe atoms and Ni atoms. Examples of such compounds include oxides, hydroxides, hydrides, sulfides, halides, porphyrin derivatives and cyclopentadienyl derivatives containing one or more atoms selected from among Fe atoms and Ni atoms. Oxides containing one or more atoms selected from among Fe atoms and Ni atoms are preferred among these, with iron(II) oxide and nickel oxide being more preferred.

The content of the metal compound in the negative electrode active material layer is preferably 1 ppm to 500 ppm, as the content ratio (ppm by mass) of the metal atom with respect to the total mass of the negative electrode active material layer. It is more preferably 2 ppm to 300 ppm and even more preferably 3 ppm to 200 ppm.

[SEI Substance]

The negative electrode active material layer also has a solid electrolyte interface (SEI) on the surface. Preferred examples of SEI substances are those containing lithium oxalate represented by the following formula (b):

[Chemical Formula 3]

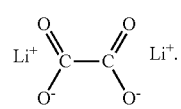

(b)

Lithium oxalate as an SEI substance in the negative electrode active material layer of this embodiment can be prepared from any constituent element of the negative electrode active material layer. It is preferably prepared as a decomposition product of the non-aqueous electrolyte solution. The lithium oxalate can be prepared, for example, by dissolving a compound such as a lithium salt with an oxalate complex as the anion in a non-aqueous electrolyte, and doping the lithium ion into the negative electrode.

(SEM Analysis of Negative Electrode Active Material Layer)

With the negative electrode of this embodiment, in a binarized SEM image taken of the negative electrode active material layer surface, the area ratio Z1 of the total area of maximum inscribed circles with diameters of less than 100 nm occupying the total area of the maximum inscribed circles is 3.5% to 25.5%, where for all of the pixels in the bright field regions, a set of the maximum inscribed circles encompassing each of the pixels is expressed as a frequency distribution for each diameter.

The carbon nanotubes in the negative electrode of this embodiment are preferably present in an evenly distributed manner through the entire negative electrode active material layer. Specifically, it is preferred for the carbon nanotubes to at least cover the surface of the negative electrode active material in an evenly distributed manner, and preferably to cover between the particles of the negative electrode active material and alkali metal compound in an evenly distributed manner.

If the area ratio Z1 of maximum inscribed circles with diameters of less than 100 nm is 3.5% or greater, in a binarized SEM image taken of the negative electrode active material layer surface, the carbon nanotubes may be evaluated to be distributed in an even manner throughout the entire negative electrode active material layer. In this case both the negative electrode active material surface and the areas between the particles of the negative electrode active material are considered to be covered in an evenly distributed manner by carbon nanotubes with fiber diameters of less than 100 nm. If the negative electrode active material layer is in this condition, then electron conductivity between the negative electrode active material particles will increase resulting in higher output, while decomposition of the electrolyte solution on the negative electrode active material surface will be inhibited, helping to prevent reduction in capacity and increase in resistance in high-temperature environments. If the area ratio Z1 of maximum inscribed circles with diameters of less than 100 nm is 25.5% or lower, then diffusion of lithium ions in the negative electrode active material layer will increase, helping to lower the resistance.

The area ratio Z1 of the total area of maximum inscribed circles with diameters of less than 100 nm occupying the total area of the maximum inscribed circles can be calculated by the following method, using an SEM image of the surface of the negative electrode active material.

The surface of the negative electrode active material layer is photographed as an SEM image at 1,280×960 pixel resolution under magnification of 10,000×. Next, the image is cut out to 1,280×890 pixels, removing the caption under the image, and processed under the following conditions using ImageJ (open source, public domain image processing software).

Median filter treatment is carried out with a setting of 1 nm=0.1004 pixels (with the radius at 2.0 pixels), and the SEM image is binarized based on a threshold determined by the Otsu method. The bright field regions are extracted from the obtained binarized image and used for analysis. Carbon nanotubes are expected to be abundantly present in the negative electrode active material layer in the bright field regions. The dark field regions, on the other hand, usually correspond to shadows of surface irregularities of the negative electrode active material layer and can be ignored.

Maximum inscribed circles encompassing each of the pixels are assumed for all of the pixels in the regions of bright field shading. The set of the assumed maximum inscribed circles is represented as a frequency distribution for each diameter.

When multiple overlapping maximum inscribed circles have overlapping sections, each of the overlapping maximum inscribed circles being considered to have the area described below, the value of that area divided by the area of the maximum inscribed circle as a complete circle is used in counting the number of maximum inscribed circles:

(1) if the diameters of the multiple overlapping maximum inscribed circles are equal, then the areas of the overlapping sections are proportionally divided with the other maximum inscribed circles, and (2) if the diameters of the multiple overlapping maximum inscribed circles differ to some degree, then each area of overlapping section is assigned to the maximum inscribed circle of maximum diameter, and the area of a maximum inscribed circle with the smaller diameter is set as the area of a section not overlapping with another maximum inscribed circle of larger diameter.

The total area of the maximum inscribed circles can be adjusted by this process to match the area of the bright field regions.

The procedure yields a frequency distribution for each maximum inscribed circle diameter. Based on this frequency distribution it is possible to determine the area ratio Z1 of maximum inscribed circles with diameters of less than 100 nm.

During the actual procedure, "Thickness" was executed using the ImageJ plugin BoneJ for a region extracted from the binarized image, to obtain a frequency distribution for each diameter of the maximum inscribed circles of all of the pixels, and Z1 was calculated using it. The procedure was carried out for 10 arbitrary visual fields in the SEM image of the negative electrode active material surface, and the average value for the 10 visual fields was used as Z1.

In the negative electrode of the invention, the value of Z1 determined by this method is 3.5% to 25.5%. The value of Z1 is preferably 4.0% to 23.0%, more preferably 4.5% to 20.0% and even more preferably 5.0% to 18.0%.

In the negative electrode of this embodiment, in a binarized SEM image of 1,280×890 pixels (1 pixel=9.96 nm) taken of the surface of the negative electrode active material layer of the negative electrode at a magnification of 10,000× in the same manner as described above, the area ratio Z2 of the total area of regions of 1,000 $nm^2$ to 5,000 $nm^2$ among the dark field regions, occupying the total area of regions of 1,000 $nm^2$ to 20,000 $nm^2$, is 63.0% to 92.0%. If the area ratio Z2 is 63.0% or greater, numerous fine voids will exist on the surface of the negative electrode active material that are capable of diffusing lithium ions (fine gaps will be present between adjacent carbon nanotubes), thus allowing the non-aqueous lithium power storage element to have higher output. If the area ratio Z2 is 92.0% or lower, the contact area between the negative electrode active material and the lithium ions will increase, allowing the power storage element to have higher output.

The method for determining the area ratio Z2 for ranges of 1,000 $nm^2$ to 5,000 $nm^2$ may be the same as for evaluating the area ratio Z1 of maximum inscribed circles of less than 100 nm, up to photographing and binarization of the SEM image of the negative electrode active material layer. After binarization, the dark field regions are extracted from the obtained binarized image and used for analysis. Many of the bright field regions are raised sections corresponding to carbon nanotubes dispersed on the surface of the negative electrode active material, which are unrelated to the fine voids on the negative electrode active material surface and can be ignored. Even among the dark field regions, regions with areas of 20,000 $nm^2$ or greater are highly likely to lack carbon nanotubes on the negative electrode active material surface, and can therefore be ignored.

Next, the regions of 1,000 $nm^2$ to 20,000 $nm^2$ among the extracted dark field regions are represented as frequency distributions for each area.

Based on the obtained frequency distributions for each area, it is possible to determine the area ratio Z2 of the total area of regions of 1,000 $nm^2$ to 5,000 $nm^2$ occupying the total area of regions of 1,000 $nm^2$ to 20,000 $nm^2$.

During the process, the ImageJ plugin "Analyze Particles" is used to calculate the areas and number of all of the dark field regions extracted from the binarized image and obtain an area distribution, to calculate Z2. The ranges contacting the outer frame of the image are excluded. The procedure was carried out for 10 arbitrary visual fields in the SEM image of the negative electrode active material surface, and the average value for the 10 visual fields was used as Z2.

In the negative electrode of the invention, the value of Z2 determined by this procedure is preferably 63.0% to 92.0%, more preferably 64.0% to 85.0% and even more preferably 65.5% to 80.0%.

(X-Ray Diffraction Measurement of Negative Electrode Active Material Layer)

With the negative electrode of this embodiment, in the XRD (X-ray diffraction) spectrum measured for the negative electrode active material layer, preferably there is a peak Y1 having a peak top with 2θ in the range of 26.2° to 26.5°, and the half-width of the peak Y1 is 0.1° to 0.5°. If 2θ of peak Y1 is 26.2° or greater, then presumably pores are present between the negative electrode active material particles allowing easy diffusion of ions, increasing ion diffusion within the negative electrode active material layer and resulting in higher output. If 2θ of peak Y1 is 26.5° or smaller, then presumably both the negative electrode active material surface and the areas between the negative electrode active material particles are covered with the carbon nanotubes in an evenly distributed manner, increasing the electron conductivity in the negative electrode active material and thus resulting in higher output.

[Negative Electrode Current Collector]

The material composing the negative electrode current collector of this embodiment is preferably a material with high electron conductivity, and one that does not degrade by elution into the electrolyte solution or reaction with the electrolyte or ion, such as a metal foil, for example. There are no particular restrictions on such metal foils, and examples include aluminum foils, copper foils, nickel foils and stainless steel foils. A copper foil is preferred as the negative electrode current collector for the non-aqueous lithium power storage element of this embodiment.

The metal foil used as the negative electrode current collector may be a common metal foil without irregularities or through-holes, or it may be a metal foil having irregularities formed by embossing, chemical etching, electrolytic deposition or blasting, or it may be a metal foil having through-holes, such as an expanded metal, punching metal or etching foil.

The thickness of the negative electrode current collector is not particularly restricted so long as it allows the shape and strength of the negative electrode to be maintained, and it may be 1 to 100 μm, for example.

[Production of Negative Electrode]

The negative electrode comprises a negative electrode active material layer on one or both sides of a negative electrode current collector. According to a typical aspect, the negative electrode active material layer is anchored to the negative electrode current collector.

The negative electrode can be produced by a known electrode production technique for lithium ion batteries or electrical double layer capacitors. For example, different materials containing a negative electrode active material may be dispersed and dissolved in water or an organic solvent to prepare a slurry-like coating solution, and the coating solution may be coated onto one or both sides of a negative electrode current collector to form a coated film, which is then dried to obtain a negative electrode. The obtained negative electrode may also be pressed to adjust the film thickness or bulk density of the negative electrode active material layer.

As mentioned above, the carbon nanotubes are preferably homogeneously dispersed on the surface of the negative electrode active material.

The method for homogeneously dispersing the carbon nanotubes on the surface of the negative electrode active material may be, for example, a method of preparing a dispersion of the carbon nanotubes beforehand and adding the negative electrode active material to and mixing it with the dispersion.

The dispersion preferably comprises a dispersing agent, together with the carbon nanotubes and solvent. The solvent may be water or NMP, for example. The dispersing agent used may be appropriately selected from among those mentioned above as dispersing agents for the negative electrode active material layer, and one or more selected from among carboxymethyl cellulose, polycarboxylic acid, polycarboxylic acid salts, polyvinylpyrrolidone, polyvinyl alcohol and surfactants may be suitably used. It is most preferred to use a dispersing agent that comprises at least one type selected from among carboxymethyl cellulose, polyvinylpyrrolidone and polyvinyl alcohol.

The carbon nanotube dispersion may be prepared by any method. An example is a method of dissolving the dispersing agent in a solvent, mixing the carbon nanotubes with the obtained solution and dispersing the carbon nanotubes with appropriate dispersion means. The dispersion means may be ultrasonic treatment, a ball mill or a bead mill, for example.

The coating solution for formation of the negative electrode active material layer may be prepared by addition of components other than the negative electrode active material to the carbon nanotube dispersion as necessary.

In a negative electrode active material layer formed using the coating solution, the carbon nanotubes are evenly dispersed between the surface of the negative electrode active material and the particles of the negative electrode active material, so that they are covered in an evenly distributed manner. This can increase the electron conductivity and binding between the negative electrode active material particles, making it possible to reduce the amount of binder that is mixed in with the negative electrode active material layer. Since decomposition of the binder gradually proceeds in high-temperature environments of 80° C. and higher, reducing the amount of binder that is mixed can impart durability for high-temperatures of 80° C. and higher.

The method of preparing the coating solution for formation of the negative electrode active material layer is not particularly restricted, and it may be carried out using a disperser such as a homodisperser or multiscrew disperser, planetary mixer, thin-film spinning high-speed mixer or the like. In order to obtain a coating solution in a satisfactorily dispersed state, it is preferred for the coating solution to be dispersed at a circumferential speed of 1 m/s to 50 m/s. It is preferred if the circumferential speed is 1 m/s or greater, because this will allow each material to satisfactorily dissolve or disperse. It is also preferred if the circumferential speed is no greater than 50 m/s, because breakdown of each material by heat or shear force during dispersion will be avoided, and reaggregation can be suppressed.

The degree of dispersion of the coating solution is preferably to a granularity of 0.1 μm to 100 as measured with a fineness gauge. The upper limit for the degree of dispersion is more preferably 80 μm or lower and even more preferably 50 μm or lower, as the granularity measured with a fineness gauge. With a granularity in this range it will be possible to avoid crushing the material during preparation of the coating solution, as well as clogging of the nozzle or streaking of the coated film during application, thus allowing more stable application to be carried out.

The viscosity (ηb) of the coating solution is preferably 1,000 mPa·s to 20,000 mPa·s, more preferably 1,500 mPa·s to 10,000 mPa·s and even more preferably 1,700 mPa·s to 5,000 mPa·s. If the viscosity (ηb) is 1,000 mPa·s or higher, liquid dripping during formation of the coated film will be suppressed, and the coated film width and thickness can be satisfactorily controlled. If the viscosity is 20,000 mPa·s or lower there will be less pressure loss in the flow channel of the coating solution when a coating machine is used, allowing stable coating to be carried out, and allowing the coated film thickness to be easily controlled.

The TI value (thixotropy index value) of the coating solution is preferably 1.1 or greater, more preferably 1.2 or greater and even more preferably 1.5 or greater. If the TI value is 1.1 or greater, the coated film width and thickness can be satisfactorily controlled.

The method of forming a coated film of the negative electrode active material layer is not particularly restricted, and a coating machine such as a die coater, comma coater, knife coater or gravure coating machine may be suitably used. The coated film may be formed by monolayer coating or by multilayer coating. In the case of multilayer coating, the coating solution compositions may be adjusted so that the component contents differ within each layer of the coated film.

Application of the coating film onto the negative electrode current collector may be by multi-threaded coating, intermittent coating, or multi-threaded intermittent coating.

When the negative electrode active material layer is to be formed on both sides of the negative electrode current collector, sequential coating may be carried out with application and drying on one side of the negative electrode current collector followed by application and drying on the other side, or simultaneous coating may be carried out by simultaneously applying and drying the coating solution onto both sides of the negative electrode current collector. In this case, the difference in thickness of the negative electrode active material layer on the front side and back side of the negative electrode current collector is preferably no greater than 10% of the average thickness for both. If the mass ratio and film thickness ratio of the negative electrode active material layer on the front and back sides is nearer to 1.0, negative charge will not accumulate on either side during charge-discharge and the charge-discharge cycle characteristic under high load will be improved.

After the coated film of the negative electrode active material layer has been formed on the negative electrode current collector, it is dried.

Drying of the coated film of the negative electrode precursor is preferably carried out by an appropriate method such as hot air drying or infrared (IR) drying, and preferably using far-infrared rays, near infrared rays or hot air. Drying of the coated film may be drying at a single temperature, or it may be drying while varying the temperature in different stages. Several drying methods may also be used in combination for drying.

The drying temperature is preferably 25° C. to 200° C., more preferably 40° C. to 180° C. and even more preferably 50° C. to 160° C. If the drying temperature is 25° C. or higher, it will be possible to adequately volatilize off the solvent in the coated film. If it is 200° C. or lower, on the other hand, it will be possible to reduce cracking of the coated film by rapid volatilization of the solvent or maldistribution of the binder by migration, and oxidation of the negative electrode current collector or negative electrode active material layer.

The moisture content of the negative electrode active material layer after drying is preferably 0.1 mass % to 10 mass %, where 100 mass % is the total mass of the negative electrode active material layer. If the moisture content is 0.1 mass % or greater, it will be possible to inhibit degradation of the binder by excessive drying, and to lower the resistance. If the moisture content is 10 mass % or lower it will be possible to inhibit inactivation of the alkali metal ion and to obtain higher capacitance.

When N-methyl-2-pyrrolidone (NMP) is used for preparation of the coating solution, the content of NMP in the dried negative electrode active material layer is preferably 0.1 mass % to 10 mass %, where 100% is the total mass of the negative electrode active material layer.

The moisture content in the negative electrode active material layer can be measured by the Karl Fischer titration method (JIS 0068(2001), "Moisture measurement method for chemical products").

The amount of NMP in the negative electrode active material layer can be quantified by immersing the negative electrode active material layer for 24 hours in ethanol at a mass of 50 to 100 times the mass of the negative electrode active material layer, in an environment of 25° C. to extract the NMP, and then measuring it by GC/MS and comparing it against a previously prepared calibration curve.

Pressing of the negative electrode active material layer is preferably carried out using a suitable pressing machine such as a hydraulic press, vacuum pressing machine or roll press. The film thickness, bulk density and electrode strength of the negative electrode active material layer can be adjusted by the pressing pressure, the gap between the press rolls, and the surface temperature of the pressing section, as described below. The pressing pressure is preferably 0.5 kN/cm to 20 kN/cm, more preferably 1 kN/cm to 10 kN/cm and even more preferably 2 kN/cm to 7 kN/cm. If the pressing pressure is 0.5 kN/cm or greater, it will be possible to adequately increase the electrode strength. If the pressing pressure is 20 kN/cm or lower, there will be no distortion or wrinkling in the negative electrode, and adjustment can be made to the desired film thickness and bulk density for the negative electrode active material layer.

When a roll press is used for pressing, the gap between the press rolls may be set to an appropriate value so that the negative electrode active material layer has the desired thickness and bulk density.

The pressing speed may be set to an appropriate speed, so as to avoid distortion and wrinkling in the negative electrode.

The surface temperature of the pressing section may be room temperature, or the section may be heated instead, if necessary. In the case of heating, the lower limit for the surface temperature of the pressing section is preferably at least the melting point of the binder −60° C., more preferably at least the melting point of the binder −45° C., and even more preferably at least the melting point of the binder −30° C. The upper limit for the surface temperature of the pressing section in the case of heating is also preferably no higher than the melting point of the binder used +50° C., more preferably no higher than the melting point of the binder +30° C., and even more preferably no higher than the melting point of the binder +20° C.

For example, when polyvinylidene fluoride (melting point: 150° C.) is used as the binder, the pressing section is preferably heated to 90° C. to 200° C., more preferably 105°

C. to 180° C. and even more preferably 120° C. to 170° C. When styrene-butadiene copolymer (melting point: 100° C.) is used as the binder, the pressing section is preferably heated to 40° C. to 150° C., more preferably 55° C. to 130° C. and even more preferably 70° C. to 120° C.

The melting point of the binder can be determined by the endothermic peak position in DSC (Differential Scanning calorimetry). For example, using a "DSC7" differential scanning calorimeter by Perkin-Elmer, with 10 mg of sample resin set in the measuring cell and increasing the temperature from 30° C. to 250° C. at a temperature-elevating rate of 10° C./min in a nitrogen gas atmosphere, the melting point is the endothermic peak temperature during the temperature elevation.

Pressing may also be carried out multiple times while varying the conditions including the pressing pressure, gap, speed, and pressing section surface temperature.

In the case of multi-threaded coating of the negative electrode active material layer, it is preferred to form slits before pressing. If pressing of the negative electrode is carried out without slitting the multi-threaded coated negative electrode active material layer, then excess stress may be applied to the sections of the negative electrode current collector that have not been coated with the negative electrode active material layer, potentially forming wrinkles. The negative electrode active material layer may also be re-slitted after pressing.

The thickness of the negative electrode active material layer per side is more preferably 10 to 70 and even more preferably 20 μm to 60 for each side. If the thickness is 10 or greater, satisfactory charge-discharge capacity can be exhibited. If the thickness is 70 μm or smaller, on the other hand, the energy density can be increased by reducing the cell volume.

When a negative electrode current collector has pores, the thickness of the negative electrode active material layer is the average value of the respective thickness per side at the sections of the negative electrode current collector without pores.

<Non-Aqueous Electrolyte>

The electrolyte solution in the non-aqueous lithium power storage element of this embodiment is a non-aqueous electrolyte. That is, the electrolyte solution contains an organic solvent (non-aqueous solvent), and contains substantially no water. The non-aqueous electrolyte solution comprises a lithium salt electrolyte. Specifically, the non-aqueous electrolyte solution includes lithium ion derived from the lithium salt electrolyte, as an electrolyte.

[Lithium Salt]

As the lithium salt electrolyte, the non-aqueous electrolyte solution comprises:

(A) at least one lithium salt from among $LiPF_6$ and $LiBF_4$,
(B) a lithium salt with an imide structure, and
(C) a lithium salt with an oxalate complex as the anion,
wherein the ratio of the mass of component (C) with respect to the total of the mass of component (A) and the mass of component (B) in the non-aqueous electrolyte solution is in the range of 1.0 mass % to 10.0 mass %. If the ratio is 1.0 mass % or greater, the ability to form a solid electrolyte interface (SEI) substance on the negative electrode surface will be effectively exhibited, so that a non-aqueous lithium power storage element with excellent high-temperature durability can be obtained. If the amount of the (C) lithium salt with an oxalate complex as the anion is too high, however, the electrolyte solution resistance will increase, impairing the input characteristics. If the ratio of the mass of component (C) with respect to the total of the mass of component (A) and the mass of component (B) is 10.0% or lower, a low resistance can be maintained for the electrolyte solution and the input characteristics will not be impaired.

The electrolyte solution of this embodiment comprises at least one lithium salt from among $LiPF_6$ and $LiBF_4$, as component (A).

The lithium salt with an imide structure of component (B) in the electrolyte solution of this embodiment is preferably a lithium salt with an imide structure represented by the following formula (a):

[Chemical Formula 4]

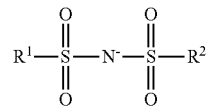

(a)

{where $R^1$ and $R^2$ are each independently a hydrogen atom, halogen atom, alkyl group or alkyl halide group and at least one of them is a halogen atom or alkyl halide group}.

The lithium salt with an imide structure is preferably a lithium salt selected from the group consisting of lithium bis(fluorosulfonyl)imide and lithium bis(trifluoromethane) sulfonimide, since this will allow an excellent input/output characteristic to be obtained.

The electrolyte solution of this embodiment comprises a lithium salt with an oxalate complex as the anion, as component (C). Examples for the lithium salt with an oxalate complex as the anion include lithium bisoxalatoborate, lithium fluorooxalatoborate and lithium difluorooxalatoborate, and one or more of them may be selected for use. An electrolyte coating film will thus be formed at the negative electrode interface, and the ability to form a protective coating film comprising a solid electrolyte interface (SEI) substance (SEI film) on the negative electrode surface will be effectively exhibited, thus allowing excellent high temperature durability to be obtained.

The total concentration of the lithium salt electrolyte in the non-aqueous electrolyte solution is preferably 0.5 mol/L or greater and more preferably in the range of 0.5 mol/L to 2.0 mol/L, based on the total amount of the non-aqueous electrolyte solution. If the lithium salt electrolyte concentration is 0.5 mol/L or greater, anions will be sufficiently present to allow sufficiently high power storage element capacitance. The lithium salt electrolyte concentration is preferably 2.0 mol/L or lower, because this can prevent precipitation of the undissolved lithium salt in the non-aqueous electrolyte solution and prevent the viscosity of the electrolyte solution from becoming too high, and will avoid lowering of the conductivity or reduction in the output characteristic as well.

Examples for the non-aqueous solvent in the non-aqueous electrolyte solution of this embodiment include cyclic carbonates and linear carbonates.

Examples of cyclic carbonates include alkylene carbonate compounds, representative of which are ethylene carbonate, propylene carbonate and butylene carbonate. An alkylene carbonate compound will typically be unsubstituted.

Examples of linear carbonates include dialkyl carbonate compounds, representative of which are dimethyl carbonate, diethyl carbonate, ethylmethyl carbonate, dipropyl carbonate and dibutyl carbonate. A dialkyl carbonate compound will typically be unsubstituted. From the viewpoint of durability with high temperature storage, it is preferred not to use dimethyl carbonate which has a low boiling point and poor heat resistance. Ethylene carbonate is preferred because it forms an SEI coating film on the negative electrode surface after its reductive decomposition, so that a non-aqueous lithium power storage element with excellent durability at high temperature and high voltage is obtained. Propylene carbonate is preferred because its melting point is low and it is unlikely to cause coagulation of the non-aqueous electrolyte solution or deposition of the non-aqueous solvent components in low temperature environments. When a mixture of ethylene carbonate and propylene carbonate is used, it is preferred to use more ethylene carbonate than propylene carbonate because the ability of ethylene carbonate to form an SEI coating film on the negative electrode surface will be effectively exhibited.

The non-aqueous solvent of this embodiment preferably comprises both a cyclic carbonate and linear carbonate. If the non-aqueous electrolyte solution comprises a cyclic carbonate and a linear carbonate, this is advantageous from the viewpoint of dissolving the lithium salt to the desired concentration and exhibiting high lithium ion conductivity.

The total content of the cyclic carbonate and linear carbonate is preferably 50 mass % or greater and more preferably 65 mass % or greater, and preferably 95 mass % or lower and more preferably 90 mass % or lower, based on the total mass of the non-aqueous electrolyte solution. If the total content of the cyclic carbonate and linear carbonate is 50 mass % or greater it will be easier to dissolve the desired concentration of lithium salt, allowing high lithium ion conductivity to be exhibited, and if it is 95 mass % or lower, the electrolyte solution will more easily comprise the additional additives mentioned below. The upper limit and lower limit ranges for the total concentration may be combined as desired.

[Additives]

The non-aqueous electrolyte solution of this embodiment may further comprise additives selected from among nitrile compounds and ether compounds.

The number of cyano groups in the nitrile compound is preferably 1 to 6, more preferably 1 to 4, even more preferably 1 to 3 and yet more preferably 3.

The nitrile compound may be a molecular compound or in the form of a salt.

Examples of molecular nitrile compounds having one cyano group include compounds represented by the following formula (Cy1):

[Chemical Formula 5]

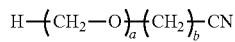
(Cy1)

{where a is 0 or 1 and b is an integer of 1 to 6}. b is preferably an integer of 1 to 4, and more preferably 1 or 2. Examples of specific compounds represented by formula (Cy1) include acetonitrile (a=0, b=1), methoxyacetonitrile (a=1, b=1), 3-methoxypropionitrile (a=1 and b=2).

Examples of molecular nitrile compounds having two cyano groups include compounds represented by the following formula (Cy2):

[Chemical Formula 6]

(Cy2)

{where c is an integer of 1 to 8}. c is preferably an integer of 1 to 6 and more preferably an integer of 2 to 4. Examples of specific compounds represented by formula (Cy2) include succinonitrile (c=2), glutaronitrile (c=3) and adiponitrile (c=4).

An example of a molecular nitrile compound having 3 cyano groups is 2-amino-1,1,3-tricyano-1-propene.

Examples of nitrile compounds in salt form include salts composed of tricyanomethanide anion and 4,5-dicyano-2-(perfluoroalkyl)imidazole anion, and their counter cations. The perfluoroalkyl group in 4,5-dicyano-2-(perfluoroalkyl)imidazole anion may be a perfluoroalkyl group of preferably 1 to 6 carbon atoms, more preferably 1 to 4 carbon atoms and even more preferably 1 to 3 carbon atoms, with examples including trifluoromethyl, pentafluoroethyl, hexafluoropropyl and hexafluoroisopropyl groups.

Examples of counter cations for a nitrile compound in salt form include lithium ions, and cations represented by the following formula (Im1):

Chemical Formula 7]

(Im1)

{where each R is independently a hydrogen atom or an alkyl group of 1 to 6 carbon atoms}. The alkyl group of R in formula (Im1) is preferably an alkyl group of 1 to 4 carbon atoms, with specific examples including methyl, ethyl, propyl, isopropyl, butyl, isobutyl and t-butyl groups. Preferred cations represented by formula (Im1) include 1-ethyl-3-methylimidazolium cation, 1-butyl-3-methylimidazolium cation, 1-ethyl-3,4,5-trimethylimidazolium cation and 1-butyl-3,4,5-trimethylimidazolium cation.

Specific examples of nitrile compounds in the form of salts include 1-ethyl-3-methylimidazolium tricyanomethanide, 1-butyl-3-methylimidazolium tricyanomethanide, 1-ethyl-3,4,5-trimethylimidazolium tricyanomethanide, 1-butyl-3,4,5-trimethylimidazolium tricyanomethanide and lithium tricyanomethanide.

A nitrile compound for the invention is preferably at least one type selected from the group consisting of acetonitrile, methoxyacetonitrile, 3-methoxypropionitrile, succinonitrile, glutaronitrile, adiponitrile, 2-amino-1,1,3-tricyano-1-propene, 1-butyl-3-methylimidazolium tricyanomethanide, lithium 4,5-dicyano-2-(trifluoromethyl)imidazole and lithium tricyanomethanide.

A trinitrile compound of the invention is preferably at least one type selected from the group consisting of 2-amino-1,1,3-tricyano-1-propene, 1-butyl-3-methylimidazolium tricyanomethanide and lithium tricyanomethanide.

If the non-aqueous electrolyte solution comprises such a nitrile compound it will be possible to obtain a power storage element with excellent storage characteristics. The nitrile compound content of the non-aqueous electrolyte solution is preferably 5 mol/L or lower and more preferably 0.1 mol/L to 5 mol/L.

Examples of ether compounds include 1,2-dimethoxyethane, 1,2-diethoxyethane, tetrahydrofuran, 1,3-dioxane, 1,4-dioxane and 2-methyltetrahydrofuran. If the non-aqueous electrolyte solution comprises an ether compound it will be possible to obtain a power storage element exhibiting an excellent input/output characteristic. The ether compound content of the non-aqueous electrolyte solution is preferably 1 mol/L to 10 mol/L.

(Water Content)

The non-aqueous electrolyte solution of this embodiment preferably contains essentially no water. That the non-aqueous electrolyte solution contains essentially no water means that the water content of the non-aqueous electrolyte solution is 200 ppm or lower. The water content of the non-aqueous electrolyte solution may be 100 ppm or lower, 50 ppm or lower or 10 ppm or lower, or it may contain absolutely no water.

<Separator>

The positive electrode precursor and negative electrode may be laminated, or laminated and wound, via a separator, to form an electrode laminate body or wound electrode comprising a positive electrode precursor, a separator and a negative electrode.

The separator used may be any separator used in a lithium ion secondary battery, electrical double layer capacitor or lithium ion capacitor.

[Constituent Material of Separator]

The separator of this embodiment is preferably a separator containing one or more selected from the group consisting of polyolefins, celluloses and aramid resins.

As one aspect of this embodiment, the separator preferably contains an aramid resin, or coating layer that includes inorganic fine particles. A separator containing these materials is preferred because it is resistant to shrinkage and can maintain the liquid retention of the non-aqueous electrolyte solution, while also keeping low resistance for the non-aqueous lithium power storage element, even when held at high temperature (such as 85° C. or higher).

Examples of preferred separators for this embodiment include separators containing a polyolefin microporous film, separators that are laminate bodies with a coating layer containing inorganic fine particles on at least one side of a polyolefin microporous film, separators that are laminate bodies with a coating layer containing an aramid resin on at least one side of a polyolefin microporous film, and separators containing a cellulose nonwoven sheet.

Examples of polyolefins include polyethylene and polypropylene. Aramid resins may be para-aramid resins or meta-aramid resins.

Polyolefin microporous films, coating layers containing inorganic fine particles, coating layers containing aramid resins and cellulose nonwoven sheets may be single layers, or laminate bodies composed of multilayers.

Organic or inorganic microparticles may also be included inside a separator.

[Thickness of Separator]

The thickness of the separator is preferably 5 µm to 35 µm. The thickness of the separator is preferably 5 µm or greater, as this will tend to reduce self-discharge due to internal microshorts. The thickness of the separator is also preferably no greater than 35 µm, as this will tend to result in a higher input/output characteristic for the non-aqueous lithium power storage element. The thickness of the separator is more preferably 10 µm to 30 µm and even more preferably 15 µm to 25 µm.

When the separator has a coating layer, the thickness of the separator is the thickness of the entire separator including the coating layer.

[External Body]

The external body used may be a metal can or laminate package material, for example. A metal can is preferably made of aluminum. The laminate package material is preferably a laminated film of a metal foil and a resin film, an example of which is a three-layer structure composed of the structure: outer layer resin film/metal foil/inner layer resin film. The outer layer resin film serves to prevent damage to the metal foil by contact, and a resin such as nylon or polyester may be suitably used. The metal foil serves to prevent penetration of moisture and gas, and a foil such as copper, aluminum or stainless steel may be suitably used. The inner layer resin film serves to protect the metal foil from the non-aqueous electrolyte solution housed inside while also providing a melt seal during heat sealing of the external body, and a polyolefin or acid-modified polyolefin may be suitably used.

<Method for Producing Non-Aqueous Lithium Power Storage Element>

The non-aqueous lithium power storage element of this embodiment can be produced, for example, by housing the electrode laminate body or wound electrode in an external body together with the non-aqueous electrolyte solution, and then carrying out lithium doping, aging and degassing, in that order. An example of a method for producing a non-aqueous lithium power storage element will now be described.

<Assembly>

[Electrode Laminate Body or Wound Electrode]

In the assembly step, typically a positive electrode precursor and negative electrode cut into the shape of a sheet are laminated via a separator to obtain an electrode laminate body, and a positive electrode terminal and negative electrode terminal are connected to the electrode laminate body. Alternatively, a positive electrode precursor and negative electrode are laminated via a separator and wound to obtain a wound electrode, and a positive electrode terminal and negative electrode terminal are connected to the wound electrode. The shape of the wound electrode may be cylindrical or flat.

The method of connecting the electrode laminate body or wound electrode with the positive electrode terminal and negative electrode terminal is not particularly restricted, and it may be carried out by a method such as resistance welding or ultrasonic welding.

[Housing in External Body]

The dried electrode laminate body or wound electrode is preferably stored in an external body, which is typically a metal can or laminate package material, and sealed, leaving only one of the openings. The method of sealing the external body is not particularly restricted, but when using a laminate package material, a method such as heat sealing or impulse sealing may be employed.

[Drying]

The electrode laminate body or wound electrode housed in the external body is preferably dried to remove the residual solvent. The drying method is not restricted, and drying may be carried out by vacuum drying or the like. The residual solvent is preferably no greater than 1.5 mass % per mass of the positive electrode active material layer or negative electrode active material layer. The residual solvent content is preferably 1.5 mass % or lower to inhibit reduction in the self-discharge property and cycle characteristic.

<Filling, Impregnation and Sealing>

The external body in which the dried electrode laminate body or wound electrode is housed is filled with a non-aqueous electrolyte solution. After filling, the positive electrode precursor, negative electrode and separator are preferably thoroughly impregnated with the non-aqueous electrolyte solution. If the non-aqueous electrolyte solution has not wetted at least a portion of the positive electrode precursor, negative electrode and separator, then in the lithium doping step described below, doping will proceed in a non-uniform manner and the obtained non-aqueous lithium power storage element may have increased resistance or lower durability, which is undesirable.

The method of impregnation is not particularly restricted, and for example, the method used may be setting the filled non-aqueous lithium power storage element in a pressure reduction chamber with the external body in an opened state, using a vacuum pump to bring the interior of the chamber to a reduced pressure state, and then restoring it to atmospheric pressure. After impregnation, the external body in the open state is closed by sealing while under reduced pressure.

[Lithium Doping Step]

In the lithium doping step, preferably a voltage is applied between the positive electrode precursor and the negative electrode, thereby decomposing the lithium compound in the positive electrode precursor and releasing lithium ions, and reducing the lithium ions at the negative electrode so that the negative electrode active material layer is predoped with lithium ions.

During the lithium doping step, gas such as $CO_2$ is generated with oxidative decomposition of the lithium compound in the positive electrode precursor. It is therefore preferable to provide means for releasing the generated gas out of the external body during application of the voltage. Examples of such means include a method of applying a voltage with a portion of the external body in an open state; and a method of applying voltage with appropriate outgassing means such as a degassing valve or gas permeable film set beforehand on a portion of the external body.

<Aging>

After lithium doping, the non-aqueous lithium power storage element is preferably subjected to aging. During aging, the organic solvent in the non-aqueous electrolyte solution is decomposed at the negative electrode, and a lithium ion-permeable solid electrolyte interface (SEI) substance coating film is formed on the negative electrode surface.

The method of aging to efficiently form a satisfactory SEI substance will be described below.

<Degassing>

After aging, preferably degassing is further carried out to reliably remove the gas remaining in the non-aqueous electrolyte solution, positive electrode and negative electrode. Any gas remaining in at least portions of the non-aqueous electrolyte solution, positive electrode and negative electrode will interfere with ion conduction, thus increasing the resistance of the obtained non-aqueous lithium power storage element.

The method of degassing is not particularly restricted, and for example, the method used may be setting the non-aqueous lithium power storage element in a pressure reduction chamber with the external body in an opened state, and using a vacuum pump to bring the interior of the chamber to a reduced pressure state.

<Evaluation of Non-Aqueous Lithium Power Storage Element Properties>

Methods for evaluating the properties of the non-aqueous lithium power storage element of this embodiment will now be described.

<C Rate>

The C rate of the current is a relative value with 1 C as the current value such that discharge is complete at 1 hour, upon constant-current discharge from maximum voltage to minimum voltage.

<Discharge Capacity>

For the purpose of the present specification, the discharge capacity Q is the value obtained by the following method.

First, in a thermostatic bath set to 25° C., a cell corresponding to the non-aqueous lithium power storage element is subjected to constant-current charge at a 20 C current value until Vmax is reached, and then constant-voltage charge is carried out for a total of 30 minutes with application of a constant voltage of Vmax. Next, constant-current discharge is carried out at a current value of 2 C to Vmin. The discharge capacity at this time is recorded as the discharge capacity Q (mAh) for the embodiment.

(Electrostatic Capacitance)

Throughout the present specification, the electrostatic capacitance F (F) is the value obtained by the following method.

First, in a thermostatic bath set to 25° C., a cell corresponding to the non-aqueous lithium power storage element is subjected to constant-current charge at a 2 C current value until Vmax is reached, and then constant-voltage charge is carried out for a total of 30 minutes with application of a constant voltage of Vmax. Next, the capacity after constant-current discharge at a current value of 2 C to Vmin is recorded as Q. The obtained value of Q is used to determine the value calculated by electrostatic capacitance F=Q/(Vmax−Vmin).

<Ordinary Temperature Discharge Internal Resistance>

Throughout the present specification, the ordinary temperature discharge internal resistance Ra (Ω) is the value obtained by the following method.

First, in a thermostatic bath set to 25° C., a cell corresponding to the non-aqueous lithium power storage element is subjected to constant-current charge at a 20 C current value until Vmax is reached, and then constant-voltage charge is carried out for a total of 30 minutes with application of a constant voltage of Vmax. Next, constant-current discharge is carried out to Vmin with a sampling interval of 0.05 seconds and a 20 C current value, to obtain a discharge curve (time-voltage). From the discharge curve, with a voltage of Eo at discharge time=0 seconds, obtained by extrapolating an approximate straight line from the voltage values at discharge time points of 1 second and 2 seconds, the value is calculated from voltage drop ΔE=Vmax−Eo, and Ra=ΔE/(20 C (current value A)).

Ra (Ω) is preferably 3.0 (mΩ) or lower from the viewpoint of exhibiting adequate charge capacity and discharge capacity with high current. If Ra (Ω) is below this upper limit, it will be possible to obtain an excellent output characteristic.

(Electrical energy)

Throughout the present specification, the electrical energy E (Wh) is the value obtained by the following method.

It is the value calculated by the following formula:

$$F \times (Vmax^2 - Vmin^2)/2/3{,}600$$

using the electrostatic capacitance F (F) calculated by the method described above.

(Volume)

The volume V (L) of a power storage element indicates the volume of the section of the external body where the electrode laminate body or wound electrode is housed.

For example, in the case of an electrode laminate body or wound electrode housed by a laminate film, typically the region of the electrode laminate body or wound electrode where the positive electrode active material layer and negative electrode active material layer are present is housed in a cup-shaped laminate film. The volume ($V_x$) of a power storage element is calculated by the following formula:

$$V_x = l_x \times w_x \times t_x$$

using the outer length ($l_x$) and outer width ($w_x$) of the cup-shaped section, and the thickness ($t_x$) of the power storage element including the laminate film.

In the case of an electrode laminate body or wound electrode housed in a rectilinear metal can, the volume of the outer dimensions of the metal can is simply used as the volume of the power storage element. That is, the volume ($V_y$) of a power storage element is calculated by the following formula:

$$V_y = l_y \times w_y \times t_y$$

based on the outer length ($l_y$) and outer width ($w_y$), and outer thickness ($t_y$), of the rectilinear metal can.

Even in the case of a wound electrode housed in a cylindrical metal can, the outer dimensional volume of the metal can is used as the volume of the power storage element. That is, the volume ($V_z$) of the power storage element is calculated by the following formula:

$$V_z = 3.14 \times r \times r \times l_z$$

using the outer radius (r) and outer length ($l_z$) of the bottom face or top face of the cylindrical metal can.

<High-Temperature Storage Test>

For the purpose of the present specification, the rate of increase in ordinary temperature discharge internal resistance after high-temperature storage testing was measured by the following method.

First, the ordinary temperature internal resistance Ra is measured at Vmax=3.8 V, Vmin=2.2 V, in a thermostatic bath with the cell corresponding to the non-aqueous lithium power storage element set to 25° C. The cell is then subjected to constant-current charge until reaching a voltage of 4.0 V at a current value of 100 C, and a constant voltage of 4.0 V is subsequently applied for 10 minutes of constant-voltage charge. The cell is then stored in an 85° C. environment, and every week it is removed out from the 85° C. environment, the cell voltage is charged to 4.0 V by the charging procedure described above, and the cell is again stored in an 85° C. environment. This procedure is repeated for a predetermined time for high-temperature storage testing.

The resistance value for the cell after the high-temperature storage test, obtained using the same method as for the ordinary temperature discharge internal resistance, is calculated by Rb/Ra, as the internal resistance increase rate after the high-temperature storage test with respect to the ordinary temperature discharge internal resistance Ra before start of the high-temperature storage test, where Rb is the ordinary temperature discharge internal resistance after the high-temperature storage test.

For the purpose of the present specification, the discharge capacity after high-temperature storage testing was measured by the following method.

First, the discharge capacity Qa is measured at Vmax=3.8 V, Vmin=2.2 V, in a thermostatic bath with the cell corresponding to the non-aqueous lithium power storage element set to 25° C. The cell is then subjected to constant-current charge until reaching a voltage of 4.0 V at a current value of 100 C, and a constant voltage of 4.0 V is subsequently applied for 10 minutes of constant-voltage charge. The cell is then stored in an 85° C. environment, and every week it is removed out from the 85° C. environment, the cell voltage is charged to 4.0 V by the charging procedure described above, and the cell is again stored in an 85° C. environment. This procedure is repeated for a predetermined time for high-temperature storage testing.

The capacity of the cell after the high-temperature storage test, obtained using the same method as for the discharge capacity, is calculated by Qb/Qa, as the discharge capacity residue rate after the high-temperature storage test with respect to the discharge capacity Qa before start of the high-temperature storage test, where Qb is the discharge capacity after the high-temperature storage test.

[X-Ray Photoelectron Spectroscopy (XPS)]

The electronic state can be analyzed by XPS to discriminate the bonded state of the lithium compound.

The measuring conditions may be the following, for example.

X-ray source: monochromatized AlKα
X-ray beam diameter: 100 μm φ (25 W, 15 kV)
Path energy: narrow scan, 58.70 eV
Charge neutralization: On
Sweep number: narrow scan, 10 sweeps (carbon, oxygen)
Energy step: narrow scan, 0.25 eV The surface of the measuring sample (such as the positive electrode) is preferably cleaned by sputtering before XPS measurement. As the sputtering conditions, cleaning of the sample surface may be carried out, for example, with an acceleration voltage of 1.0 kV, and 1 minute in a range of 2 mm×2 mm (1.25 nm/min as $SiO_2$).

The peaks of the obtained XPS spectrum may be assigned in the following manner, for example.

<Li1s Peaks>
Peaks with bond energy of 50 to 54 eV: $LiO_2$ or Li—C bonds
Peaks of 55 to 60 eV: LiF, $Li_2CO_3$, $Li_xPO_yF_z$ (where x, y and z are each an integer of 1 to 6);

<C1s Peaks>
Peaks with bond energy of 285 eV: C—C bonds
Peaks of 286 eV: C—O bonds
Peaks of 288 eV: COO
Peaks of 289.5 eV: COO—
Peaks of 290 to 292 eV: $CO_3^{2-}$, C—F bonds;

<O1s Peaks>
Peaks with bond energy of 527 to 530 eV: $O^{2-}$ ($Li_2O$)
Peaks of 531 to 532 eV: CO, $CO_3$, OH, $PO_x$ (where x is an integer of 1 to 4), $SiO_x$ (where x is an integer of 1 to 4)
Peaks of 533 eV: C—O, $SiO_x$ (where x is an integer of 1 to 4);

<F1s Peaks>
Peaks with bond energy of 685 eV: LiF
Peaks of 687 eV: C—F bonds, $Li_xPO_yF_z$ (where x, y and z are each an integer of 1 to 6), $PF_6^-$;

<P2p Peaks>
Peaks with bond energy of 133 eV: $PO_x$ (where x is an integer of 1 to 4)
Peaks of 134 to 136 eV: $PF_x$ (where x is an integer of 1 to 6);

<Si2p Peaks>
Peaks with bond energy of 99 eV: Si, silicide
Peaks of 101 to 107 eV: $Si_xO_y$ (where x and y are each arbitrary integers)

When peaks overlap in the obtained spectrum, the spectrum is preferably assigned upon separating the peaks with the assumption of a Gaussian function or Lorentz function. The lithium compound that is present can be identified based on the obtained results of measuring the electronic state, and the existing element ratio.

[Solid Electrolyte Interface (SEI) Substance]

For the purpose of the present specification, a solid electrolyte interface (SEI) substance comprising a decomposition product of the non-aqueous electrolyte solution is formed on the negative electrode surface in order to inhibit decomposition of the non-aqueous electrolyte solution and increase the high temperature durability. The SEI substance does not exhibit electrical (electron) conductivity, but has lithium ion conductivity, and its formation is known to inhibit decomposition of the electrolyte solution.

The solid electrolyte interface (SEI) substance can be formed on the surface of the negative electrode by aging treatment of the fabricated power storage element under predetermined conditions.

Aging treatment may be carried out, for example, by conducting constant-current discharge at 1.0 A in an environment of 25° C. to a voltage of 3.0 V, and then adjusting the voltage to 3.0 V by 1 hour of constant voltage discharge at 3.0 V, and storing the non-aqueous lithium power storage element in a thermostatic bath at 60° C. for 60 hours.

Examples of solid electrolyte interface (SEI) substances include lithium oxalate, lithium fluoride, lithium carbonate, lithium oxide, organic lithium compounds and organic polymers. Lithium oxalate is preferred among these from the viewpoint of inhibiting electrolyte solution decomposition.

Formation of a solid electrolyte interface (SEI) substance (such as lithium oxalate) on the surface of the negative electrode can be confirmed by a peak in the range of 289 eV to 290 eV in X-ray photoelectron spectroscopy (XPS).

<Iron Element Quantitation Method, ICP-MS>

The acid in the measuring sample is decomposed using a strong acid such as concentrated nitric acid, concentrated hydrochloric acid or aqua regalis, and the obtained solution is diluted with purified water to an acid concentration of about 2 mass % to 3 mass %. The sample may also be appropriately heated and pressed during the acid decomposition.

Analysis is performed by ICP-MS using the obtained diluent as the measuring sample. It is preferred to add a known amount of the element during the measurement as an internal standard. When the iron element to be measured exceeds the upper measurable limit, the diluted solution is preferably further diluted while maintaining the acid concentration of the diluted solution.

Iron element can be quantified from the obtained measurement results, based on a calibration curve predrawn using a standard solution for chemical analysis.

Throughout the present specification, the iron element content of the positive electrode precursor is measured using ICP-MS. A portion of the obtained positive electrode precursor is vacuum dried at 180° C. for 20 hours, and the positive electrode active material layer is taken from the positive electrode precursor in a dry air environment with a dew point of −40° C. or lower and weighed. The taken sample was used to measure the iron element content in the positive electrode active material layer of the positive electrode precursor by ICP-MS, and the measured value was divided by the mass of the positive electrode active material layer of the positive electrode precursor used for measurement, to calculate the iron element content per unit mass of the positive electrode active material layer of the positive electrode precursor.

[XRD (X-Ray Diffraction)]

With the negative electrode of this embodiment, in the XRD (X-ray diffraction) spectrum measured for the negative electrode active material layer, preferably there is a peak Y1 having a peak top with 2θ in the range of 26.2° to 26.5°, and the half-width of the peak Y1 is 0.1° to 0.5°. If the half-width of peak Y1 is 0.1° or greater, this can be evaluated as improved diffusibility of ions in the negative electrode active material layer, and the negative electrode may be considered to have lowered resistance. If the half-width of peak Y1 is 0.5° or smaller, it may be assumed that the carbon nanotubes are homogeneously dispersed on the negative electrode active material surface, and that capacity decrease and resistance increase in high-temperature environments can be inhibited.

The peak X1 in XRD (X-ray diffraction) measured for the positive electrode active material layer is as explained above.

[Raman Scattering Analysis of Negative Electrode Active Material Layer]

Raman scattering analysis was carried out using an "inVia Reflex" Raman microscope by Renishaw Co. The excitation light laser wavelength was 532 nm, and focusing was to a power of approximately 0.1 mW at the sample position, using a 100× objective lens.

A Raman spectrum was obtained for a measuring area of 40 μm×40 μm on the surface of the negative electrode active material layer.

The "Cosmic ray removal" function in the analysis software "WiRE" by Renishaw Co. was used for spike noise removal. The "Noise filter" function in the analysis software "WiRE" was used for principal component analysis for noise removal, and the spectrum was reconstructed up to 12 components with high scores.

In the obtained Raman spectrum, a linear baseline was drawn from 1,000 cm$^{-1}$ to 1,800 cm$^{-1}$, the peak intensity Id of peak Pd of the D band observed at 1,350±15 cm$^{-1}$ and the peak intensity Ig of peak Pg of the G band appearing at 1,585±15 cm$^{-1}$ were determined, and the intensity ratio Id/Ig was calculated. The R value is the average of 8 measurements.

Raman scattering analysis of the positive electrode active material layer was performed by the method described below in the Examples.

<BET Specific Surface Area and Mean Pore Size, Mesopore Volume and Micropore Volume>

The BET specific surface area, mean pore size, mesopore volume and micropore volume referred to herein are the values determined by the following respective methods. A sample is vacuum dried at 200° C. for a day and a night, and the adsorption/desorption isotherm is measured using nitrogen as the adsorbate. Using the obtained isotherm on the adsorption side, the BET specific surface area is calculated by the multipoint BET method or single point BET method, the mean pore size is calculated by dividing the total pore volume per mass by the BET specific surface area, the mesopore volume is calculated by the BJH method, and the micropore volume is calculated by the MP method.

The BJH method is a method of calculation commonly used for analysis of mesopores, and it was advocated by Barrett, Joyner, Halenda et al. (E. P. Barrett, L. G. Joyner and P. Halenda, J. Am. Chem. Soc., 73, 373(1951)) (NPL 1).

The MP method is a method in which a "t-plot" (B. C. Lippens, J. H. de Boer, J. Catalysis, 4319(1965) (NPL 2)) is utilized to determine micropore volume, micropore area and micropore distribution, and it is the method proposed by M. Mikhail, Brunauer and Bodor (R. S. Mikhail, S. Brunauer, E. E. Bodor, J. Colloid Interface Sci., 26, 45(1968) (NPL 3)).

<Mean Particle Size>

The term "mean particle size" as used herein refers to the particle size obtained upon determining a cumulative curve with the total volume at 100% with measurement of the particle size distribution using a particle size distribution analyzer, where the cumulative curve is 50% (that is, the 50% diameter (median diameter)). The mean particle size can be measured using a commercially available laser diffraction particle size distribution analyzer.

<Uses of Non-Aqueous Lithium Power Storage Element>

A plurality of non-aqueous lithium power storage elements of this embodiment may be connected together in series or in parallel to fabricate a power storage module. A non-aqueous lithium power storage element and power storage module of this embodiment is able to exhibit both high input/output characteristics and safety at high temperature. The non-aqueous lithium power storage element and power storage module of this embodiment can be incorporated into a system selected from the group consisting of power regeneration assist systems, power load-leveling systems, uninterruptable power source systems, non-contact power supply systems, energy harvesting systems, power storage systems, solar power generation/storage systems, electric power steering systems, emergency power supply systems, in-wheel motor systems, idling stop systems, quick charging systems and smart grid systems.

A power storage system can be suitably used for natural power generation such as solar power generation or wind power generation, a power load-leveling system can be suitably used as a power load-leveling system in a microgrid, and an uninterruptable power source system can be suitably used in factory production equipment. In a non-contact power supply system, the non-aqueous lithium power storage element can be suitably used for leveling of voltage fluctuation for microwave power transmission or electric field resonance, and for energy storage, or in an energy harvesting system, the non-aqueous lithium power storage element can be suitably used for electric power generated by oscillating generation.

In a power storage system, a plurality of non-aqueous lithium power storage elements are connected in series or parallel as a cell stack, or the non-aqueous lithium power storage element is connected with a lead battery, nickel-hydrogen battery, lithium ion secondary battery or fuel cell in series or parallel.

Since the non-aqueous lithium power storage element of this embodiment can exhibit both high input/output characteristics and safety at high temperature, it can be mounted in a vehicle such as an electric vehicle, plug-in hybrid vehicle, hybrid vehicle or electric motorcycle. A power regeneration assist system, electric power steering system, emergency power supply system, in-wheel motor system or idling stop system, or a combination thereof, can be suitably mounted in a vehicle.

EXAMPLES

Examples 1 to 13 and Comparative Examples 1 to 9

Embodiments of the invention will now be explained in detail using Examples and Comparative Examples. However, the invention is not limited in any way by these Examples and Comparative Examples.

Preparation of Carbon Nanotube Dispersion

A planetary ball mill was used to mix and disperse 8.0 mass % of commercially available multilayer carbon nanotubes (mean fiber diameter: 40 nm, mean fiber length: 12 µm), 1.0 mass % of carboxymethyl cellulose (CMC) as a dispersing agent 1, 91.0 mass % of distilled water, and 10 ppm iron atom equivalent of $Fe_2O_3$ as a metal compound, for 120 minutes at a speed of 100 rpm, to prepare a carbon nanotube dispersion (CNT dispersion).

Negative Electrode Production Example 1

There were mixed 84.0 parts by mass of artificial graphite with a mean particle size of 4.5 µm, 100 parts by mass of the aforementioned carbon nanotube dispersion (corresponding to 8.0 parts by mass of carbon nanotubes and 1.0 parts by mass of carboxymethyl cellulose), 3.0 parts by mass of acetylene black (AB), 1.0 parts by mass of PVP (polyvinylpyrrolidone) as a dispersing agent 2, 3.0 parts by mass of styrene-butadiene rubber (SBR) as a binder, 10 ppm iron atom equivalent of $Fe_2O_3$ as an additional metal compound, and distilled water, to obtain a mixture with a solid mass ratio of 36.5 mass %.

The mixture was dispersed for 20 minutes at a rotational speed of 2,000 rpm using an "Awatori Rentaro®" rotating/revolving mixer by Thinky, Inc., to obtain a negative electrode coating solution.

The viscosity (ηb) and TI value of the obtained negative electrode coating solution were measured using a TVE-35H E-type viscometer by Toki Sangyo Co., Ltd. As a result, the viscosity (ηb) was 1,970 mPa·s and the TI value was 3.3.

The negative electrode coating solution was applied onto one side of an electrolytic copper foil with a thickness of 8 µm using a doctor blade, and dried for 10 minutes on a hot plate heated to 50° C. A roll press was then used for pressing under conditions with a pressure of 5 kN/cm and a pressing section surface temperature of 25° C., to produce a negative electrode 1.

A "Linear Gauge Sensor GS-551" film thickness meter by Ono Sokki Co., Ltd. was used to measure the total thickness of the negative electrode 1 at 10 arbitrary locations, and upon calculating the film thickness of the negative electrode active material layer from the average value minus the thickness of the electrolytic copper foil, the film thickness of the negative electrode active material layer of negative electrode 1 was found to be 31 µm.

Negative Electrode Production Examples 2 to 17, 19 and 20

Carbon nanotube dispersions (CNT dispersions) were prepared in the same manner as <Negative electrode Production Example 1> above, except that the mean fiber diameters and mean fiber lengths of the multilayer carbon nanotubes (CNT), the amounts of CNT used to prepare the CNT dispersions, and the types of metal compounds and amounts in terms of metal atoms were changed as shown in Table 1.

The CNT dispersions were each used to produce negative electrodes 2 to 17, 19 and 20 in the same manner as <Negative electrode Production Example 1>, except that the types and amounts of the components were as listed in Table 2.

Negative Electrode Production Example 18

There were mixed 84.0 parts by mass of artificial graphite with a mean particle size of 4.5 µm, 8.0 parts by mass of commercially available multilayer carbon nanotubes (mean fiber diameter: 40 nm, mean fiber length: 12 µm), 3.0 parts by mass of acetylene black, 1.0 parts by mass of carboxymethyl cellulose, 1.0 parts by mass of PVP (polyvinylpyrrolidone), 3.0 parts by mass of styrene-butadiene rubber, 20 ppm iron atom equivalent of $Fe_2O_3$ and distilled water, to obtain a mixture with a solid mass ratio of 36.5 mass %.

The mixture was dispersed for 20 minutes at a rotational speed of 2,000 rpm using an "Awatori Rentaro®" rotating/revolving mixer by Thinky, Inc., to obtain a negative electrode coating solution. The viscosity (ηb) of the coating solution was 1,370 mPa·s and the TI value was 6.3, measured in the same manner as Negative electrode Production Example 1.

A negative electrode 18 with a negative electrode active material layer film thickness of 32 μm was obtained in the same manner as Negative electrode Production Example 1 except for using this mixture.

Negative Electrode Production Example 21

A negative electrode 21 was produced in the same manner as Negative electrode Production Example 18, except that the types and amounts of the components were as listed in Table 2.

TABLE 1

Table 1

| | CNT physical properties | | CNT dispersion | | | | |
|---|---|---|---|---|---|---|---|
| | | | CNT | Dispersing agent 1 | | Metal compound | Amount added |
| | Mean fiber diameter (nm) | Mean fiber length (μm) | Amount (parts by mass) | Type | Amount (parts by mass) | Type | Metal atom concentration (ppm) | to coating solution (parts by mass) |
| Negative electrode 1 | 40 | 5 | 8 | CMC | 1 | $Fe_2O_3$ | 10 | 100 |
| Negative electrode 2 | 10 | 4.5 | 5 | CMC | 1 | $Fe_2O_3$ | 5 | 200 |
| Negative electrode 3 | 2 | 3 | 3 | CMC | 1 | $Fe_2O_3$ | 3.3 | 300 |
| Negative electrode 4 | 95 | 6 | 11 | CMC | 1 | $Fe_2O_3$ | 10 | 100 |
| Negative electrode 5 | 40 | 5 | 8 | CMC | 1 | $Fe_2O_3$ | 10 | 200 |
| Negative electrode 6 | 40 | 5 | 8 | CMC | 1 | $Fe_2O_3$ | 10 | 300 |
| Negative electrode 7 | 40 | 5 | 8 | CMC | 1 | $Fe_2O_3$ | 1 | 100 |
| Negative electrode 8 | 40 | 5 | 8 | CMC | 1 | $Fe_2O_3$ | 237.5 | 100 |
| Negative electrode 9 | 40 | 5 | 8 | CMC | 1 | NiO | 10 | 100 |
| Negative electrode 10 | 40 | 5 | 8 | CMC | 1 | $Fe_2O_3$ | 10 | 100 |
| Negative electrode 11 | 40 | 5 | 8 | CMC | 1 | $Fe_2O_3$ | 8.1 | 81.25 |
| Negative electrode 12 | 40 | 5 | 8 | CMC | 1 | $Fe_2O_3$ | 2.5 | 400 |
| Negative electrode 13 | 40 | 5 | 8 | CMC | 1 | $Fe_2O_3$ | 2.2 | 450 |
| Negative electrode 14 | 40 | 5 | 8 | CMC | 1 | — | — | 400 |
| Negative electrode 15 | 40 | 5 | 8 | CMC | 1 | $Fe_2O_3$ | 66.3 | 400 |
| Negative electrode 16 | 1 | 3 | 8 | CMC | 1 | $Fe_2O_3$ | 10 | 100 |
| Negative electrode 17 | 120 | 6.5 | 8 | CMC | 1 | $Fe_2O_3$ | 10 | 100 |
| Negative electrode 18 | 40 | 5 | — | — | — | — | — | — |
| Negative electrode 19 | 40 | 5 | 8 | CMC | 1 | $Fe_2O_3$ | 10 | 100 |
| Negative electrode 19 | 40 | 5 | 8 | CMC | 1 | $Fe_2O_3$ | 10 | 100 |
| Negative electrode 20 | 10 | 4.5 | 5 | CMC | 1 | $Fe_2O_3$ | 5.5 | 182 |
| Negative electrode 21 | 10 | 4.5 | — | — | — | — | — | — |

TABLE 2

Table 2.

| | Composition of negative electrode active material layer | | | | | | | |
|---|---|---|---|---|---|---|---|---|
| | Negative electrode active material Artificial | | Conductive filler | Dispersing agent 1 | Dispersing agent 2 | Binder | Metal compound | |
| | graphite (parts by mass) | CNT (parts by mass) | AB (parts by mass) | CMC (parts by mass) | PVP (parts by mass) | SBR (parts by mass) | Type | Metal atom concentration (ppm) |
| Negative electrode 1 | 84 | 8 | 3 | 1 | 1 | 3 | $Fe_2O_3$ | 20 |
| Negative electrode 2 | 81.5 | 10 | 2.5 | 2 | 2 | 3 | $Fe_2O_3$ | 20 |
| Negative electrode 3 | 82 | 9 | 2 | 3 | 3 | 3 | $Fe_2O_3$ | 20 |
| Negative electrode 4 | 81.5 | 11 | 2.5 | 1 | 1 | 3 | $Fe_2O_3$ | 20 |
| Negative electrode 5 | 75 | 16 | 3 | 2 | 2 | 3 | $Fe_2O_3$ | 40 |
| Negative electrode 6 | 66 | 24 | 3 | 3 | 3 | 3 | $Fe_2O_3$ | 60 |
| Negative electrode 7 | 84 | 8 | 3 | 1 | 1 | 3 | $Fe_2O_3$ | 2 |
| Negative electrode 8 | 84 | 8 | 3 | 1 | 1 | 3 | $Fe_2O_3$ | 475 |
| Negative electrode 9 | 84 | 8 | 3 | 1 | 1 | 3 | NiO | 10 |
| Negative electrode 10 | 86 | 8 | 4 | 1 | 1 | 0 | $Fe_2O_3$ | 20 |
| Negative electrode 11 | 85.7 | 6.5 | 3 | 0.8 | 0.8 | 3 | $Fe_2O_3$ | 20 |

TABLE 2-continued

Composition of negative electrode active material layer

| | Negative electrode active material Artificial graphite (parts by mass) | Conductive filler CNT (parts by mass) | | Dispersing agent 1 CMC (parts by mass) | Dispersing agent 2 PVP (parts by mass) | Binder SBR (parts by mass) | Metal compound | |
|---|---|---|---|---|---|---|---|---|
| | | | AB (parts by mass) | | | | Type | Metal atom concentration (ppm) |
| Negative electrode 12 | 57 | 32 | 3 | 4 | 4 | 3 | Fe₂O₃ | 20 |
| Negative electrode 13 | 52.5 | 36 | 3 | 4.5 | 4.5 | 3 | Fe₂O₃ | 20 |
| Negative electrode 14 | 57 | 32 | 3 | 4 | 4 | 3 | — | — |
| Negative electrode 15 | 57 | 32 | 3 | 4 | 4 | 3 | Fe₂O₃ | 530 |
| Negative electrode 16 | 84 | 8 | 3 | 1 | 1 | 3 | Fe₂O₃ | 20 |
| Negative electrode 17 | 84 | 8 | 3 | 1 | 1 | 3 | Fe₂O₃ | 20 |
| Negative electrode 18 | 84 | 8 | 3 | 1 | 1 | 3 | Fe₂O₃ | 20 |
| Negative electrode 19 | 86 | 8 | 3 | 1 | 2 | 0 | Fe₂O₃ | 20 |
| Negative electrode 19 | 86 | 8 | 3 | 1 | 2 | 0 | Fe₂O₃ | 20 |
| Negative electrode 20 | 88.9 | 9.1 | 0 | 1 | 1 | 0 | Fe₂O₃ | 20 |
| Negative electrode 21 | 87.3 | 8.7 | 0 | 1 | 0 | 3 | Fe₂O₃ | 20 |

Preparation of Positive Electrode Active Material

Crushed coconut shell carbide was placed in a small carbonizing furnace and carbonized at 500° C. for 3 hours in a nitrogen atmosphere to obtain a carbide. The obtained carbide was placed in an activating furnace, water vapor in a heated state using a preheating furnace was introduced into the activating furnace at 1 kg/h, and the temperature was increased to 900° C. over 8 hours for activation. The activated carbide was removed and cooled in a nitrogen atmosphere to obtain activated carbon. The obtained activated carbon was flow-rinsed for 10 hours, drained, and dried for 10 hours in an electrodesiccator held at 115° C., and then it was pulverized for 1 hour with a ball mill to obtain active carbon 1.

A laser diffraction particle size distribution analyzer (SALD-2000J) by Shimadzu Corp. was used to measure the mean particle size of the active carbon 1, which was found to be 5.5 μm. Also, a pore distribution measuring apparatus (AUTOSORB-1 AS-1-MP) by Yuasa-Ionics, Inc. was used to measure the pore distribution of the active carbon 1. As a result, the BET specific surface area was 2360 m²/g, the mesopore volume ($V_1$) was 0.52 cc/g, the micropore volume ($V_2$) was 0.88 cc/g, and $V_1/V_2$=0.59.

Preparation of Carbon Nanotube Dispersion

A planetary ball mill was used to mix and disperse 8.0 parts by mass of commercially available multilayer carbon nanotubes (mean fiber diameter: 40 nm, mean fiber length: 50 μm), 1.0 parts by mass of carboxymethyl cellulose (CMC) as a dispersing agent 1, 91.0 parts by mass of distilled water, and 10 ppm iron atom equivalent of $Fe_2O_3$, for 120 minutes at a speed of 100 rpm, to prepare a carbon nanotube dispersion for formation of a positive electrode active material layer.

Positive Electrode Precursor Production Example 1

After mixing 56.0 parts by mass of active carbon 1, 1.5 parts by mass of carboxymethyl cellulose (CMC), 30.0 parts by mass of lithium carbonate, 3.0 parts by mass of acetylene black (AB), 4.5 parts by mass of acrylic latex (LTX), 5.0 parts by mass of PVP (polyvinylpyrrolidone) and distilled water to a solid mass ratio of 46.5 mass %, the mixture was dispersed for 30 minutes at a rotational speed of 2000 rpm using an "Awatori Rentaro®" rotating/revolving mixer by Thinky, Inc., to obtain a positive electrode coating solution.

The viscosity (ηb) and TI value of the obtained positive electrode coating solution were measured using a TVE-35H E-type viscometer by Toki Sangyo Co., Ltd. As a result, the viscosity (ηb) was 3,650 mPa·s and the TI value was 5.1. The degree of dispersion of the obtained positive electrode coating solution was measured using a fineness gauge by Yoshimitsu Seiki Co. As a result, the granularity was 33 μm.

A doctor blade was used to coat the positive electrode coating solution onto one side of a 15 μm-thick aluminum foil which was then dried for 10 minutes on a hot plate heated to 50° C., after which a roll press was used for pressing under conditions with a pressure of 6 kN/cm and a pressing section surface temperature of 25° C., to obtain a positive electrode precursor 1.

When the overall thickness of the obtained positive electrode precursor 1 was measured at 10 arbitrary locations using a Linear Gauge Sensor GS-551 by Ono Sokki Co., Ltd., and the film thickness of the positive electrode active material layer was determined by subtracting the thickness of the aluminum foil from the average thickness, the film thickness of the positive electrode active material layer of the positive electrode precursor 1 was found to be 61 µm.

Positive Electrode Precursor Production Example 2

A positive electrode coating solution was prepared in the same manner as Positive electrode precursor Production Example 1, except for using 53.0 parts by mass of active carbon 1, 100 parts by mass of the carbon nanotube dispersion for formation of the positive electrode active material layer (corresponding to 8.0 parts by mass of carbon nanotubes and 1.0 parts by mass of carboxymethyl cellulose), 30.0 parts by mass of lithium carbonate, 3.0 parts by mass of acetylene black (AB), 1.5 parts by mass of PVP (polyvinylpyrrolidone) and 3.5 parts by mass of acrylic latex (LTX), and this was used to produce a positive electrode precursor 2.

Electrolyte Solution Preparation Example 1

A non-aqueous electrolyte solution 1 was obtained using a mixed solvent of ethylene carbonate (EC):ethylmethyl carbonate (EMC)=33:67 (volume ratio) as the organic solvent, and dissolving an electrolyte salt so that the concentration ratio of $LiPF_6$ and LiFSI was 1:1 and the total concentration was 1.2 mol/L.

Electrolyte Solution Preparation Example 2

A non-aqueous electrolyte solution 2 was obtained using a mixed solvent of ethylene carbonate (EC):ethylmethyl carbonate (EMC)=33:67 (volume ratio) as the organic solvent, and dissolving an electrolyte salt so that the concentration ratio of $LiPF_6$, LiFSI and LiBOB was 5:6:1 and the total concentration was 1.2 mol/L.

Example 1

<Production of Non-Aqueous Lithium Power Storage Element>

One obtained positive electrode precursor 1 was cut out, with the positive electrode active material layer at a size of 4.4 cm×9.4 cm. One negative electrode 1 was then cut out, with the negative electrode active material layer at a size of 4.5 cm×9.5 cm. One 4.7 cm×9.8 cm polyethylene separator (by Asahi Kasei Corp., thickness: 15 µm) was also prepared. These were laminated in the order: positive electrode precursor 1, separator, negative electrode 1, with the positive electrode active material layer and negative electrode active material layer facing each other across the separator, to obtain an electrode laminate body. A positive electrode terminal and negative electrode terminal were ultrasonically welded to the obtained electrode body and the stack was placed in an external body formed of an aluminum laminate package material, after which 3 sides including the electrode terminal section were sealed by heat sealing.

Approximately 2.5 g of the non-aqueous electrolyte solution 1 was injected into the external body housing the electrode laminate body, in a dry air environment at atmospheric pressure, a temperature of 25° C. and a dew point of no higher than −40° C. Next, the external body housing the electrode laminate body and non-aqueous electrolyte solution was placed in a pressure reduction chamber and the pressure was reduced from atmospheric pressure to −87 kPa, after which it was restored to atmospheric pressure and allowed to stand for 5 minutes. The step of reducing the pressure of the external body in the chamber from atmospheric pressure to −87 kPa and then restoring to atmospheric pressure was subsequently repeated 4 times, and then it was allowed to stand for 15 minutes at atmospheric pressure. The electrode laminate body was impregnated with the non-aqueous electrolyte solution 1 by this procedure.

Next, the electrode laminate body impregnated with the non-aqueous electrolyte solution 1 was placed in a pressure-reducing sealing machine, and with the pressure reduced to −95 kPa, the external body was sealed for 10 seconds at 180° C. at a pressure of 0.1 MPa to seal the aluminum laminate package material.

[Alkali Metal Doping Step]

The sealed electrode laminate body was subjected to initial charging by constant-current charge at a temperature of 40° C. and with a current value of 50 mA until reaching a voltage of 4.5 V, followed by constant-voltage charge at 4.5 V continued for 2 hours, for alkali metal doping of the negative electrode.

[Aging Step]

The alkali metal-doped electrode laminate body was removed from the dry box and subjected to constant-current discharge in an environment of 25° C. at 50 mA until reaching a voltage of 4.0 V, and then to constant-current discharge at 4.0 V for 1 hour, to adjust the voltage to 4.0 V. The electrode body was then stored for 12 hours in a thermostatic bath at 60° C.

[Degassing Step]

After aging, a portion of the external body was unsealed in a dry air environment with a temperature of 25° C. and a dew point of −40° C., and the electrode laminate body was removed. The removed electrode laminate body was then placed in a pressure reduction chamber, and a step of using a diaphragm pump for pressure reduction over a period of 3 minutes from atmospheric pressure to −80 kPa, followed by restoration to atmospheric pressure over a period of 3 minutes, was repeated a total of 3 times. Next, the electrode laminate body was returned to the external body, and after pressure reduction to −90 kPa using a pressure-reducing sealing machine, it was sealed at 200° C. for 10 seconds at a pressure of 0.1 MPa to seal the external body, to produce a non-aqueous lithium power storage element.

Several non-aqueous lithium power storage elements with the same construction were produced by this method.

<Evaluation of Non-Aqueous Lithium Power Storage Elements>

[Measurement of Electrostatic Capacitance Qa and Internal Resistance Ra]

When one of the obtained non-aqueous lithium power storage elements was used to measure the electrostatic capacitance Qa and internal resistance Ra as described above using a charge-discharge apparatus (5 V, 10 A) by Aska Electronic Co., Ltd. in a thermostatic bath set to 25° C., Qa was found to be 9.04 mAh and Ra was found to be 88.3 mΩ. These values are listed in Table 3 as the initial electrostatic capacitance Qa and initial internal resistance Ra.

[High Voltage, High-Temperature Storage Test]

Another of the obtained non-aqueous lithium power storage elements was subjected to a high voltage, high-temperature storage test by the method described above. The electrostatic capacitance Qb and internal resistance Rb were measured after the test, giving values of Qb=8.14 mAh, Rb=97.3 mΩ. These values are listed in Table 3, as electrostatic capacitance Qb after high voltage, high temperature storage and internal resistance Rb after high voltage, high temperature storage.

<Analysis of Negative Electrode>
[SEM Image]

Using another of the obtained non-aqueous lithium power storage elements, a portion of the external body was unsealed in a dry air environment with a temperature of 25° C. and a dew point of −40° C., and the electrode laminate body was removed as a sample of the negative electrode.

The negative electrode active material layer of the negative electrode was subjected to gold sputtering in a vacuum of 10 Pa, to coat a gold film with a thickness of several nm onto the surface. An SEM image was then taken of the negative electrode active material layer surface with atmospheric exposure, under the conditions described below.

(SEM Measuring Conditions)
Measuring apparatus: S-4700 Field Emission Scanning Electron Microscope by Hitachi High-Technologies Corp.
Acceleration voltage: 1 kV
Emission current: 10 μA
Measurement magnification: 10,000×
Detector: Secondary electron detector
Electron beam incident angle: 90°

During the measurement, the luminance and contrast were adjusted so that no pixel in the SEM image reached the maximum luminance value in the mapping image and the average value of brightness was in the range of 40% to 60% of the maximum luminance value.

When the SEM image was used to determine the area ratio Z1 of maximum inscribed circles with diameters of less than 100 nm in the bright field regions, and the area ratio Z2 of the total area of regions of 1,000 $nm^2$ to 5,000 $nm^2$ occupying the total area of regions of 1,000 $nm^2$ to 20,000 $nm^2$ of the dark field regions, using the method described above, Z1 was found to be 4.1% and Z2 was found to be 64.1%.

[XRD (X-Ray Diffraction) Measurement]

The negative electrode removed from the non-aqueous lithium power storage element was cut to a size of 1 $cm^2$ (1 cm×1 cm) to prepare a sample for XRD.

The XRD sample was measured by XRD under the following conditions.
Device: Rigaku Ultima IV
Detector: D/teX Ultra
Tube: CuKα
Tube voltage: 40 kV
Tube current: 40 mA
Sampling interval: 0.01°/point
Scanning rate: 5°/min
Measuring angle range: 5 to 90°
Divergence slit (DS): 1°
Divergence length: 10 mm
Scattering slit (SS): Open
Receiving slit (RS): Open In the obtained XRD spectrum, the peak top position and half-width of peak Y1 having a peak top in the range of $2\theta=26.2°$ to 26.5° were examined, resulting in a peak top position of 26.47° and a half-width of 0.12°.

Examples 2 to 13 and Comparative Examples 1 to 9

Non-aqueous lithium power storage elements were produced and evaluated in the same manner as Example 1, except for using the negative electrodes, positive electrode precursors and non-aqueous electrolyte solutions listed in Table 3.

The evaluation results are shown in Table 3.

FIG. 1 to FIG. 6 show the SEM analysis results for the negative electrode active material layers of the negative electrode 20 of Example 13 and the negative electrode 21 of Comparative Example 9.

Figure 2:
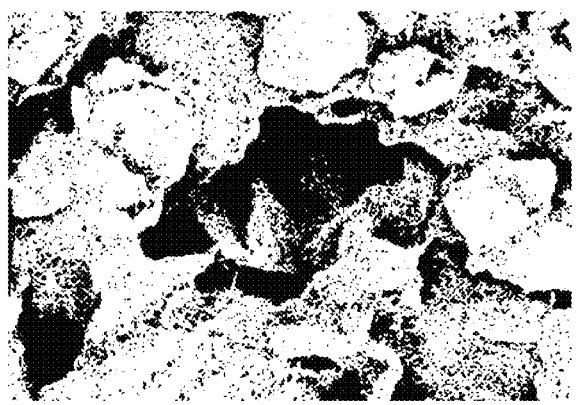
FIG. 2 is a binarized SEM image of FIG. 1.
Figure 3:
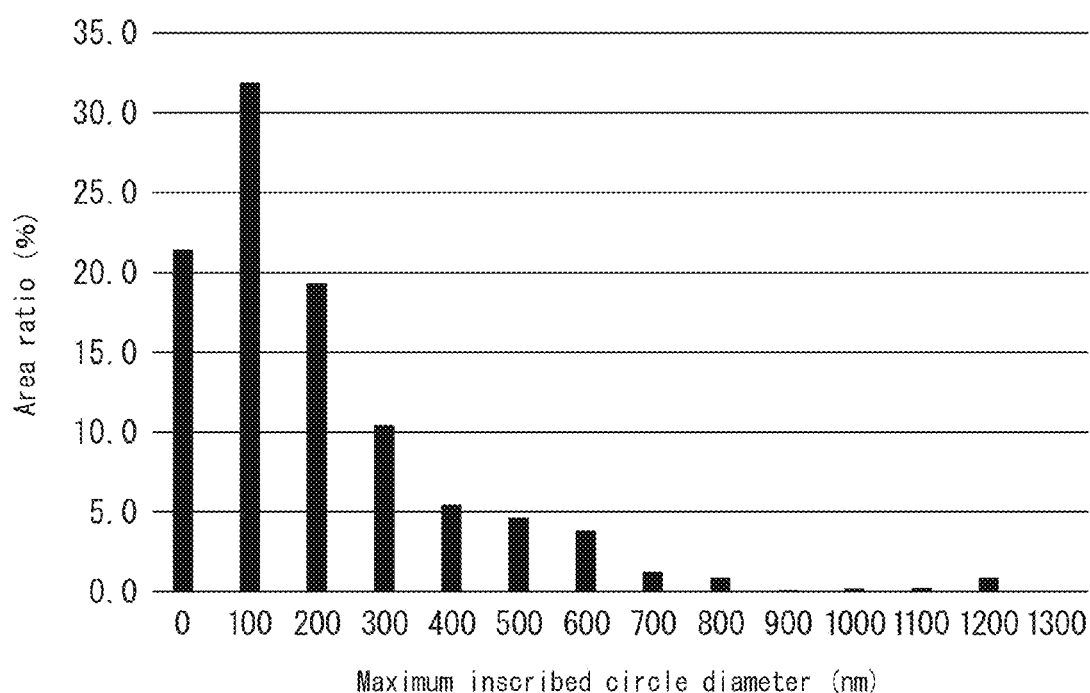
FIG. 3 is a frequency distribution graph for different diameters of maximum inscribed circles obtained from the binarized image of FIG. 2.

FIG. 1 is an SEM image of the negative electrode active material layer of the negative electrode 20 obtained in Example 13; FIG. 2 is a binarized SEM image of FIG. 1; and FIG. 3 is a frequency distribution graph for the maximum inscribed circle diameters obtained from the binarized image of FIG. 2.

Figure 4:
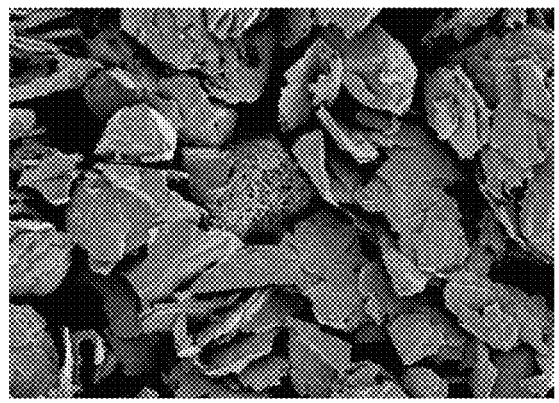
FIG. 4 is an SEM image of the negative electrode active material layer of the negative electrode 21 obtained in Comparative Example 9.
Figure 5:
FIG. 5 is a binarized SEM image of FIG. 4.
Figure 6:
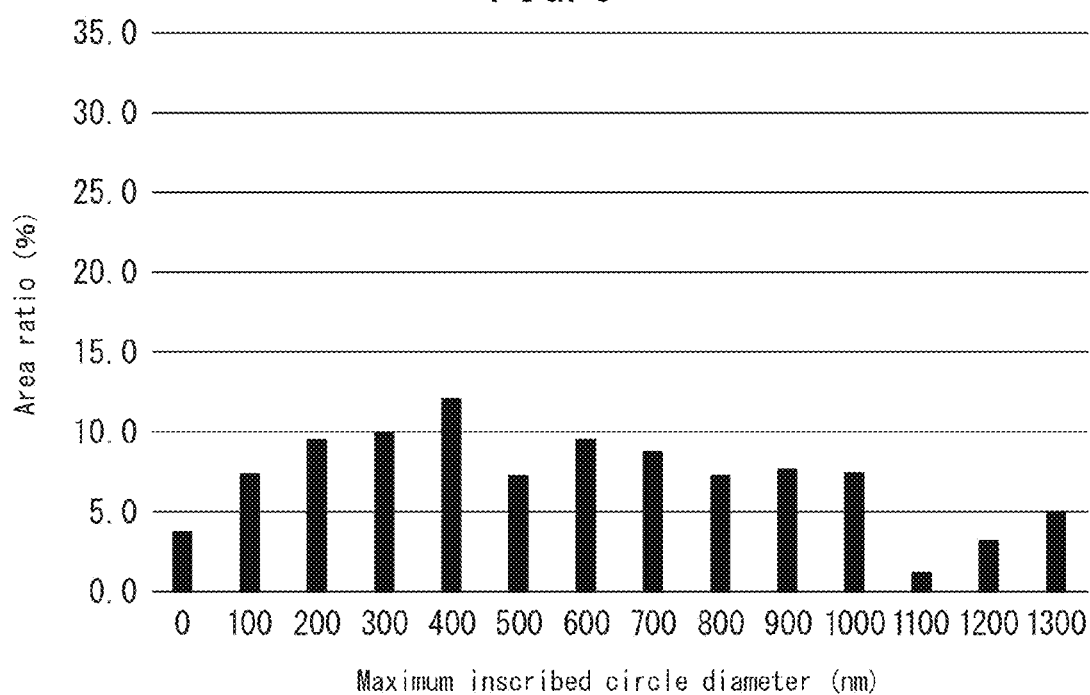
FIG. 6 is a frequency distribution graph for different diameters of maximum inscribed circles obtained from the binarized image of FIG. 5.

FIG. 4 is an SEM image of the negative electrode active material layer of the negative electrode 21 obtained in Comparative Example 9; FIG. 5 is a binarized SEM image of FIG. 4; and FIG. 6 is a frequency distribution graph for the maximum inscribed circle diameters obtained from the binarized image of FIG. 5.

TABLE 3

Table 3.

| | Construction of non-aqueous lithium power storage element | | | Evaluation of non-aqueous lithium power storage element | | | | | |
|---|---|---|---|---|---|---|---|---|---|
| | | | | Initial | | After high voltage, high temperature storage | | | |
| | Negative electrode type | Positive electrode precursor type | Non-aqueous electrolyte solution type | Electrostatic capacitance Qa (mAh) | Internal resistance Ra (mΩ) | Electrostatic capacitance Qa (mAh) | Internal resistance Ra (mΩ) | Change in capacity Qb/Qa | Change in resistance Rb/Ra |
| Example 1 | Negative electrode 1 | Positive electrode precursor 1 | Non-aqueous electrolyte solution 1 | 9.04 | 88.3 | 8.14 | 97.3 | 0.90 | 1.10 |
| Example 2 | Negative electrode 2 | Positive electrode precursor 1 | Non-aqueous electrolyte solution 1 | 8.75 | 84.3 | 8.2 | 97.8 | 0.94 | 1.16 |
| Example 3 | Negative electrode 3 | Positive electrode precursor 1 | Non-aqueous electrolyte solution 1 | 8.8 | 86.5 | 7.92 | 96 | 0.90 | 1.11 |
| Example 4 | Negative electrode 4 | Positive electrode precursor 1 | Non-aqueous electrolyte solution 1 | 8.93 | 87.3 | 8.01 | 102.1 | 0.90 | 1.17 |
| Example 5 | Negative electrode 5 | Positive electrode precursor 1 | Non-aqueous electrolyte solution 1 | 8.63 | 82.9 | 7.96 | 96.9 | 0.92 | 1.17 |
| Example 6 | Negative electrode 6 | Positive electrode precursor 1 | Non-aqueous electrolyte solution 1 | 8.32 | 84.7 | 7.59 | 98.4 | 0.91 | 1.16 |

TABLE 3-continued

Table 3.

| | Negative electrode type | Positive electrode precursor type | Non-aqueous electrolyte solution type | | | | | | |
|---|---|---|---|---|---|---|---|---|---|
| Example 7 | Negative electrode 7 | Positive electrode precursor 1 | Non-aqueous electrolyte solution 1 | 8.9 | 84.8 | 8.28 | 99.5 | 0.93 | 1.17 |
| Example 8 | Negative electrode 8 | Positive electrode precursor 1 | Non-aqueous electrolyte solution 1 | 9.18 | 87.6 | 7.77 | 100.3 | 0.85 | 1.14 |
| Example 9 | Negative electrode 9 | Positive electrode precursor 1 | Non-aqueous electrolyte solution 1 | 8.58 | 83 | 7.94 | 97.9 | 0.93 | 1.18 |
| Example 10 | Negative electrode 10 | Positive electrode precursor 1 | Non-aqueous electrolyte solution 1 | 9.06 | 77.8 | 8.2 | 90 | 0.91 | 1.16 |
| Comparative Example 1 | Negative electrode 11 | Positive electrode precursor 1 | Non-aqueous electrolyte solution 1 | 7.67 | 94.4 | 5.87 | 132.1 | 0.77 | 1.40 |
| Comparative Example 2 | Negative electrode 12 | Positive electrode precursor 1 | Non-aqueous electrolyte solution 1 | 6.43 | 87.6 | 5.14 | 123.8 | 0.80 | 1.41 |
| Comparative Example 3 | Negative electrode 13 | Positive electrode precursor 1 | Non-aqueous electrolyte solution 1 | 5.44 | 86.8 | 4.33 | 121.2 | 0.80 | 1.40 |
| Comparative Example 4 | Negative electrode 14 | Positive electrode precursor 1 | Non-aqueous electrolyte solution 1 | 4.83 | 89.9 | 2.99 | 120.3 | 0.62 | 1.34 |
| Comparative Example 5 | Negative electrode 15 | Positive electrode precursor 1 | Non-aqueous electrolyte solution 1 | 5.47 | 88.4 | 2.49 | 125 | 0.46 | 1.41 |
| Comparative Example 6 | Negative electrode 16 | Positive electrode precursor 1 | Non-aqueous electrolyte solution 1 | 7.88 | 100.6 | 4.37 | 134 | 0.55 | 1.33 |
| Comparative Example 7 | Negative electrode 17 | Positive electrode precursor 1 | Non-aqueous electrolyte solution 1 | 7.77 | 95.8 | 4.77 | 147.5 | 0.61 | 1.54 |
| Comparative Example 8 | Negative electrode 18 | Positive electrode precursor 1 | Non-aqueous electrolyte solution 1 | 7.73 | 108 | 3.1 | 160.2 | 0.40 | 1.48 |
| Example 11 | Negative electrode 19 | Positive electrode precursor 2 | Non-aqueous electrolyte solution 1 | 8.86 | 68.8 | 8.47 | 74.5 | 0.96 | 1.08 |
| Example 12 | Negative electrode 19 | Positive electrode precursor 2 | Non-aqueous electrolyte solution 1 | 8.62 | 72.3 | 8.39 | 75.6 | 0.97 | 1.05 |
| Example 13 | Negative electrode 20 | Positive electrode precursor 1 | Non-aqueous electrolyte solution 1 | 9.12 | 80.2 | 8.4 | 93 | 0.92 | 1.16 |
| Comparative Example 9 | Negative electrode 21 | Positive electrode precursor 1 | Non-aqueous electrolyte solution 1 | 7.62 | 105.7 | 3.01 | 163 | 0.40 | 1.54 |

| | Construction of non-aqueous lithium power storage element | | | Area ratio of maximum inscribed circles with diameters of less than 100 nm Z1 (%) | Area ratio regions of 1000 $nm^2$ to 5000 $nm^2$ Z2 (%) | Peak position of peak Y1 2θ (°) | Half-width of peak Y1 (°) |
|---|---|---|---|---|---|---|---|
| | Negative electrode type | Positive electrode precursor type | Non-aqueous electrolyte solution type | | | | |
| Example 1 | Negative electrode 1 | Positive electrode precursor 1 | Non-aqueous electrolyte solution 1 | 4.1 | 64.1 | 26.47 | 0.12 |
| Example 2 | Negative electrode 2 | Positive electrode precursor 1 | Non-aqueous electrolyte solution 1 | 5.6 | 72.1 | 26.44 | 0.22 |
| Example 3 | Negative electrode 3 | Positive electrode precursor 1 | Non-aqueous electrolyte solution 1 | 5 | 69.5 | 26.45 | 0.15 |
| Example 4 | Negative electrode 4 | Positive electrode precursor 1 | Non-aqueous electrolyte solution 1 | 7.7 | 77 | 26.4 | 0.27 |
| Example 5 | Negative electrode 5 | Positive electrode precursor 1 | Non-aqueous electrolyte solution 1 | 13.8 | 83.5 | 26.35 | 0.3 |
| Example 6 | Negative electrode 6 | Positive electrode precursor 1 | Non-aqueous electrolyte solution 1 | 24.1 | 91.3 | 26.21 | 0.48 |

TABLE 3-continued

Table 3.

| | | | | | | | |
|---|---|---|---|---|---|---|---|
| Example 7 | Negative electrode 7 | Positive electrode precursor 1 | Non-aqueous electrolyte solution 1 | 4.2 | 65.9 | 26.46 | 0.13 |
| Example 8 | Negative electrode 8 | Positive electrode precursor 1 | Non-aqueous electrolyte solution 1 | 4 | 63.5 | 26.49 | 0.11 |
| Example 9 | Negative electrode 9 | Positive electrode precursor 1 | Non-aqueous electrolyte solution 1 | 4.1 | 65.7 | 26.47 | 0.12 |
| Example 10 | Negative electrode 10 | Positive electrode precursor 1 | Non-aqueous electrolyte solution 1 | 4.2 | 66.2 | 26.48 | 0.13 |
| Comparative Example 1 | Negative electrode 11 | Positive electrode precursor 1 | Non-aqueous electrolyte solution 1 | 3.4 | 62 | 26.53 | 0.09 |
| Comparative Example 2 | Negative electrode 12 | Positive electrode precursor 1 | Non-aqueous electrolyte solution 1 | 26.6 | 93.5 | 26.17 | 0.53 |
| Comparative Example 3 | Negative electrode 13 | Positive electrode precursor 1 | Non-aqueous electrolyte solution 1 | 29.6 | 94.8 | 26.1 | 0.56 |
| Comparative Example 4 | Negative electrode 14 | Positive electrode precursor 1 | Non-aqueous electrolyte solution 1 | 25.9 | 93.2 | 26.18 | 0.52 |
| Comparative Example 5 | Negative electrode 15 | Positive electrode precursor 1 | Non-aqueous electrolyte solution 1 | 26.3 | 94.1 | 26.16 | 0.52 |
| Comparative Example 6 | Negative electrode 16 | Positive electrode precursor 1 | Non-aqueous electrolyte solution 1 | 3.2 | 61.3 | 26.57 | 0.08 |
| Comparative Example 7 | Negative electrode 17 | Positive electrode precursor 1 | Non-aqueous electrolyte solution 1 | 3.4 | 62.2 | 26.55 | 0.09 |
| Comparative Example 8 | Negative electrode 18 | Positive electrode precursor 1 | Non-aqueous electrolyte solution 1 | 2.4 | 52.3 | 26.62 | 0.08 |
| Example 11 | Negative electrode 19 | Positive electrode precursor 1 | Non-aqueous electrolyte solution 1 | 4.3 | 63.6 | 26.45 | 0.13 |
| Example 12 | Negative electrode 19 | Positive electrode precursor 1 | Non-aqueous electrolyte solution 1 | 4.3 | 63.6 | 26.45 | 0.13 |
| Example 13 | Negative electrode 20 | Positive electrode precursor 1 | Non-aqueous electrolyte solution 1 | 21.4 | 62 | 26.45 | 0.15 |
| Comparative Example 9 | Negative electrode 21 | Positive electrode precursor 1 | Non-aqueous electrolyte solution 1 | 3.7 | 80 | 26.12 | 0.08 |

Examples 14 to 47 and Comparative Examples 10 to 18

<Pulverization of Lithium Carbonate>

Lithium carbonate was pulverized by brittle fracture while preventing heat denaturation, at a temperature of −196° C.

After loading 200 g of lithium carbonate with a mean particle size of 53 μm into a pulverizer (LNM liquid nitrogen bead mill) by Aimex Corp. and cooling to −196° C. with liquid nitrogen, it was pulverized for 9 minutes at a circumferential speed of 10.0 m/s, using dry ice beads. The mean particle size of the obtained lithium carbonate was 2.26 μm.

Preparation of Positive Electrode Active Material

Preparation of Active Carbon 2

Crushed coconut shell carbide was carbonized for 3 hours at 500° C. in a small carbonizing furnace in a nitrogen atmosphere, to obtain a carbide. The obtained carbide was placed in an activating furnace, water vapor in a heated state using a preheating furnace was introduced into the activating furnace at 1 kg/h, and the temperature was increased to 900° C. over 8 hours for activation. The activated carbide was removed and cooled in a nitrogen atmosphere. The obtained active carbon was flow-rinsed for 10 hours and then drained. The rinsed and drained active carbon was dried for 10 hours in an electrodesiccator held at 115° C., and then pulverized for 1 hour with a ball mill to obtain active carbon 2.

A laser diffraction particle size distribution analyzer (SALD-2000J) by Shimadzu Corp. was used to measure the mean particle size of the active carbon 2, which was found to be 4.2 μm. Also, as a result of measuring the pore distribution of active carbon 1 using a pore distribution measuring device by Yuasa-Ionics, Inc. (AUTOSORB-1 AS-1-MP), the BET specific surface area was 2,360 m$^2$/g, the mesopore volume ($V_1$) was 0.52 cc/g, the micropore volume ($V_2$) was 0.88 cc/g and $V_1/V_2$=0.59.

Preparation of Active Carbon 3

For the phenol resin, after carbonization for 2 hours in a firing furnace at 600° C. under a nitrogen atmosphere, it was pulverized with a ball mill and sorted, to obtain a carbide having a mean particle size of 7.0 μm. The carbide and KOH were mixed at a mass ratio of 1:5, and heated for 1 hour in a firing furnace at 800° C. under a nitrogen atmosphere, for activation. The mixture was subsequently stirred and rinsed for 1 hour in dilute hydrochloric acid adjusted to a concentration of 2 mol/L, and then boiled and rinsed with distilled water until the pH stabilized to between 5 and 6, after which it was dried to produce active carbon 3.

For active carbon 3, the mean particle size measured in the same manner as active carbon 1 was 7.1 μm, the BET specific surface area was 3,627 m$^2$/g, the mesopore volume ($V_1$) was 1.50 cc/g and the micropore volume ($V_2$) was 2.28 cc/g, and $V_1/V_2$=0.66.

<Positive Electrode Precursor 3>

Preparation of Iron Element-Containing Lithium Compound

There were added 100 parts by mass of lithium carbonate as a lithium compound and 2.3 parts by mass of ferric chloride ($FeCl_3 \cdot 6H_2O$) to distilled water, to prepare an aqueous solution with a lithium carbonate concentration of 0.5 mass %. The obtained solution was stirred for 1 hour with a HomoDisperser while being heated at 60° C. in an oil bath. The liquid temperature was then raised to 100° C. to evaporate off the water, depositing an iron element-containing lithium carbonate powder. After placing the obtained iron element-containing lithium carbonate powder in an alumina vessel, and setting this in a muffle furnace, it was heated at 300° C. for 10 hours while flowing a nitrogen/hydrogen mixed gas for dechlorination treatment, after which it was pulverized with a jet mill to obtain iron element-containing lithium carbonate powder 1 having a predetermined particle size. The mean particle size of the iron element-containing lithium carbonate powder 1 was measured using a Laser diffraction particle size distribution analyzer by Shimadzu Corp., and found to be 0.8 μm.

[Production of Positive Electrode Precursor 3]

The active carbon 2 obtained in [Preparation of active carbon 2] above was used at 58.5 parts by mass as a positive electrode active material, and mixed with a lithium compound other than a positive electrode active material, of the type and amount listed in Table 4, and with a conductive filler. After mixing 1.5 parts by mass of PVP (polyvinylpyrrolidone), 8.0 parts by mass of PVDF (polyvinylidene fluoride) and NMP (N-methylpyrrolidone) with the obtained mixture, it was dispersed using a FILMIX® thin-film spinning high-speed mixer by Primix Corp., under conditions with a circumferential speed of 17 m/s, to obtain a coating solution. The coating solution was coated onto one or both sides of an aluminum foil with a thickness of 15 μm and lacking through-holes, as a positive electrode current collector, using a die coater by Toray Engineering Co., Ltd. under conditions with a coating speed of 1 m/s, and dried at a drying temperature of 100° C. to obtain a positive electrode precursor. The obtained positive electrode precursor was pressed using a roll press under conditions with a pressure of 4 kN/cm and a pressing section surface temperature of 25° C.

The positive electrode precursor obtained by coating only one side of the positive electrode current collector will hereunder be referred to as "single-sided positive electrode precursor", and the positive electrode precursor obtained by coating both sides of the positive electrode current collector will be referred to as "double-sided positive electrode precursor".

A portion of the obtained positive electrode precursor was vacuum dried at 180° C. for 20 hours, and then a portion of the positive electrode active material layer was taken in a dry air environment with a dew point of −40° C. or lower for use as a measuring sample which was weighed. The taken sample was analyzed by ICP-MS to quantify the iron element content in the sample, and the measured value was divided by the mass of the sample (positive electrode active material layer of the positive electrode precursor) used for measurement, to calculate the iron element content per unit mass of the positive electrode active material layer of the positive electrode precursor. The results are shown in Table 4.

[Production of Positive Electrode Precursors 4 to 9]

Iron element-containing lithium carbonate powders were prepared by the same method as positive electrode precursor 3, except that the amount of ferric chloride ($FeCl_3 \cdot 6H_2O$) used in [Preparation of iron element-containing lithium compound] and the types and amounts of conductive fillers used were as listed in Table 4, and these were used to produce positive electrode precursors.

TABLE 4

| Positive electrode precursor type | Positive electrode active material | | Lithium compounds other than positive electrode active material | | Fe element content per unit mass of positive electrode active material layer (ppm) | Conductive filler | |
|---|---|---|---|---|---|---|---|
| | Carbon material | | | Amount of ferric chloride used during synthesis (parts by mass) | | | Amount (parts by mass) |
| | Type | Amount (parts by mass) | Type | | Amount (parts by mass) | | Type |
| Positive electrode precursor 3 | Active carbon 2 | 58.5 | Fe—Li carbonate 1 | 2.3 | 28.0 | 140.1 | KB | 3.0 |
| Positive electrode precursor 4 | Active carbon 2 | 58.5 | Fe—Li carbonate 2 | 2.0 | 28.0 | 119.0 | KB | 3.0 |
| Positive electrode precursor 5 | Active carbon 3 | 58.5 | Fe—Li carbonate 3 | 0.75 | 28.0 | 44.9 | KB | 3.0 |
| Positive electrode precursor 6 | Active carbon 2 | 58.5 | Fe—Li carbonate 4 | 0.52 | 28.0 | 31.6 | KB | 3.0 |
| Positive electrode precursor 7 | Active carbon 2 | 76.8 | Fe—Li carbonate 1 | 2.3 | 10.2 | 50.7 | KB | 3.0 |
| Positive electrode precursor 8 | Active carbon 2 | 57.5 | Fe—Li carbonate 1 | 2.3 | 32 | 159.0 | KB | 3.0 |
| Positive electrode precursor 9 | Active carbon 2 | 41.8 | Fe—Li carbonate 1 | 2.3 | 49.6 | 246.4 | KB | 3.0 |

The abbreviations of the components in Table 4 stand for the following.

[Lithium Compounds Other than Positive Electrode Active Material]

Fe—Li carbonate 1: Iron element-containing lithium carbonate powder 1 with a mean particle size of 0.8 μm, obtained by <Preparation of iron element-containing lithium compound> above Fe—Li carbonates 2 to 4: Iron element-containing lithium carbonate powders 2 to 4 with mean particle sizes of 0.8 μm, produced in the same manner as the iron element-containing lithium carbonate powder 1, except for changing the amount of ferric chloride used.

KB: Ketchen black

Preparation of Carbon Nanotube Dispersion

A planetary ball mill was used to mix and disperse 8.0 mass % of commercially available multilayer carbon nanotubes (mean fiber diameter: 40 nm, mean fiber length: 12 μm), 1.0 mass % of carboxymethyl cellulose (CMC) as a dispersing agent 1, 91.0 mass % of distilled water, and 10 ppm iron atom equivalent of $Fe_2O_3$ as a metal compound, for 120 minutes at a speed of 100 rpm, to prepare a carbon nanotube dispersion (CNT dispersion).

<Production of Negative Electrodes>

Negative Electrode Production Example 22

After mixing 84.0 mass % of artificial graphite with a mean particle size of 4.5 μm, 10.0 mass % of acetylene black, 3.0 mass % of carboxymethyl cellulose and 3.0 mass % of styrene-butadiene rubber, with distilled water to a solid mass ratio of 36.5%, the mixture was dispersed for 10 minutes at a rotational speed of 2,000 rpm using an "Awatori Rentaro®" rotating/revolving mixer by Thinky, Inc., to obtain a negative electrode coating solution.

The viscosity (ηb) and TI value of the obtained negative electrode coating solution were measured using a TVE-35H E-type viscometer by Toki Sangyo Co., Ltd. As a result, the viscosity (ηb) was 1,840 mPa·s and the TI value was 3.1.

The negative electrode coating solution was applied onto both sides of an electrolytic copper foil with a thickness of 8 μm, as a negative electrode current collector, using a doctor blade, and dried for 10 minutes on a hot plate heated to 50° C. to obtain a negative electrode. This was pressed using a roll press under conditions with a pressure of 5 kN/cm and a pressing section surface temperature of 25° C. The total thickness of the pressed negative electrode was measured at 10 randomly set locations on the negative electrode surface using a Linear Gauge Sensor GS-551 film thickness meter by Ono Sokki Co., Ltd., the thickness of the negative electrode current collector was subtracted from the average value, and the resulting value further divided by 2 was used as the film thickness per side of the negative electrode active material layer. As a result of the measurement, the film thickness of the negative electrode active material layer of the negative electrode was found to be 30 μm per side.

Negative Electrode Production Example 23

There were mixed 84.0 parts by mass of artificial graphite with a mean particle size of 4.5 μm, 100 parts by mass of the aforementioned carbon nanotube dispersion (corresponding to 8.0 parts by mass of carbon nanotubes and 1.0 parts by mass of carboxymethyl cellulose), 3.0 parts by mass of acetylene black (AB), 1.0 parts by mass of PVP (polyvinylpyrrolidone) as a dispersing agent 2, 3.0 parts by mass of styrene-butadiene rubber (SBR) as a binder, 10 ppm iron atom equivalent of $Fe_2O_3$ as an additional metal compound, and distilled water, to obtain a mixture with a solid mass ratio of 36.5 mass %.

The mixture was dispersed for 20 minutes at a rotational speed of 2,000 rpm using an "Awatori Rentaro®" rotating/revolving mixer by Thinky, Inc., to obtain a negative electrode coating solution.

The viscosity (ηb) and TI value of the obtained negative electrode coating solution were measured using a TVE-35H E-type viscometer by Toki Sangyo Co., Ltd. As a result, the viscosity (ηb) was 1,970 mPa·s and the TI value was 3.3.

The negative electrode coating solution was applied onto one side of an electrolytic copper foil with a thickness of 8 μm using a doctor blade, and dried for 10 minutes on a hot plate heated to 50° C. A roll press was then used for pressing under conditions with a pressure of 5 kN/cm and a pressing section surface temperature of 25° C., to produce a negative electrode 23.

A "Linear Gauge Sensor GS-551" film thickness meter by Ono Sokki Co., Ltd. was used to measure the total thickness of the negative electrode 23 at 10 arbitrary locations, and upon calculating the film thickness of the negative electrode active material layer from the average value minus the thickness of the electrolytic copper foil, the film thickness of the negative electrode active material layer of negative electrode 23 was found to be 31 μm.

Preparation of Non-Aqueous Electrolyte Solutions 3 to 18

Non-aqueous electrolyte solutions 3 to 18 were obtained using a mixed solvent of ethylene carbonate (EC):ethylmethyl carbonate (EMC)=33:67 (volume ratio) as the organic solvent, and dissolving electrolyte salts of the types and concentrations listed in Table 5 in the organic solvent.

Preparation of Non-Aqueous Electrolyte Solutions 19 to 34

Non-aqueous electrolyte solutions 19 to 34 were obtained using a mixed solvent of ethylene carbonate (EC):ethylmethyl carbonate (EMC)=33:67 (volume ratio) as the organic solvent, dissolving electrolyte salts of the types and concentrations listed in Table 6 in the organic solvent, and mixing in nitrile compounds and/or ether compounds of the types and concentrations listed in Table 6.

TABLE 5

| | Lithium salt electrolyte | | | | | | |
|---|---|---|---|---|---|---|---|
| | Component (A) | | Component (B) | | Component (C) | | (C)/ |
| Non-aqueous electrolyte solution type | Type | Concentration (mol/L) | Type | Concentration (mol/L) | Type | Concentration (mol/L) | {(A) + (B)} ratio (%) |
| Non-aqueous electrolyte solution 3 | LiBF4 | 0.8 | LiN(SO$_2$F)$_2$ | 0.3 | LiBOB | 0.05 | 4.5 |
| Non-aqueous electrolyte solution 4 | LiBF4 | 0.8 | LiN(SO$_2$F)$_2$ | 0.3 | LiBOB | 0.1 | 9.1 |
| Non-aqueous electrolyte solution 5 | LiBF4 | 0.8 | LiN(SO$_2$F)$_2$ | 0.3 | LiBOB | 0.015 | 1.4 |
| Non-aqueous electrolyte solution 6 | LiBF4 | 0.8 | LiN(SO$_2$F)$_2$ | 0.5 | LiBOB | 0.05 | 3.8 |
| Non-aqueous electrolyte solution 7 | LiBF4 | 0.7 | LiN(SO$_2$F)$_2$ | 0.5 | LiBOB | 0.05 | 4.2 |

TABLE 5-continued

| | Lithium salt electrolyte | | | | | | |
|---|---|---|---|---|---|---|---|
| | Component (A) | | Component (B) | | Component (C) | | (C)/ |
| Non-aqueous electrolyte solution type | Type | Concentration (mol/L) | Type | Concentration (mol/L) | Type | Concentration (mol/L) | {(A) + (B)} ratio (%) |
| Non-aqueous electrolyte solution 8 | LiPF6 | 0.8 | LiN(SO2F)2 | 0.3 | LiBOB | 0.05 | 4.5 |
| Non-aqueous electrolyte solution 9 | LiPF6 | 0.8 | LiN(SO2F)2 | 0.3 | LiBOB | 0.1 | 9.1 |
| Non-aqueous electrolyte solution 10 | LiBF4 | 0.8 | LiN(CF3SO2)2 | 0.3 | LiBOB | 0.1 | 9.1 |
| Non-aqueous electrolyte solution 11 | LiBF4 | 0.8 | LiN(CF3CF2SO2)2 | 0.3 | LiBOB | 0.1 | 9.1 |
| Non-aqueous electrolyte solution 12 | LiPF6 | 0.8 | LiN(SO2F)2 | 0.3 | LiDFOB | 0.1 | 9.1 |
| Non-aqueous electrolyte solution 13 | LiPF6 | 0.8 | LiN(SO2F)2 | 0.3 | LiFOB | 0.1 | 9.1 |
| Non-aqueous electrolyte solution 14 | LiBF4 | 0.8 | LiN(SO2F)2 | 0.3 | LiBOB | 0.12 | 10.9 |
| Non-aqueous electrolyte solution 15 | LiBF4 | 0.8 | LiN(SO2F)2 | 0.3 | LiBOB | 0.01 | 0.9 |
| Non-aqueous electrolyte solution 16 | — | | LiN(SO2F)2 | 1 | LiBOB | 0.05 | 5.0 |
| Non-aqueous electrolyte solution 17 | LiBF4 | 1 | — | — | LiBOB | 0.05 | 5.0 |
| Non-aqueous electrolyte solution 18 | LiBF4 | 0.8 | LiN(SO2F)2 | 0.3 | — | — | — |

TABLE 6

| | Lithium salt electrolyte | | | | | | | | | |
|---|---|---|---|---|---|---|---|---|---|---|
| | Component (A) | | Component (B) | | Component (C) | | (C)/ {(A) + (B)} ratio (%) | Nitrile compound | | Ether compound | |
| Non-aqueous electrolyte solution type | Type | Concentration (mol/L) | Type | Concentration (mol/L) | Type | Concentration (mol/L) | | Type | Concentration (mol/L) | Type | Concentration (mol/L) |
| Non-aqueous electrolyte solution 19 | LiBF4 | 0.8 | LiN(SO2F)2 | 0.3 | LiBOB | 0.1 | 9.1 | AcCN | 0.10 | — | — |
| Non-aqueous electrolyte solution 20 | LiBF4 | 0.8 | LiN(SO2F)2 | 0.3 | LiBOB | 0.1 | 9.1 | AcCN | 5.00 | — | — |
| Non-aqueous electrolyte solution 21 | LiBF4 | 0.8 | LiN(SO2F)2 | 0.3 | LiBOB | 0.1 | 9.1 | ScCN | 2.00 | — | — |
| Non-aqueous electrolyte solution 22 | LiBF4 | 0.8 | LiN(SO2F)2 | 0.3 | LiBOB | 0.1 | 9.1 | MeOAcCN | 2.00 | — | — |
| Non-aqueous electrolyte solution 23 | LiBF4 | 0.8 | LiN(SO2F)2 | 0.3 | LiBOB | 0.1 | 9.1 | ATCNP | 0.10 | — | — |
| Non-aqueous electrolyte solution 24 | LiBF4 | 0.8 | LiN(SO2F)2 | 0.3 | LiBOB | 0.1 | 9.1 | IM-TCNM | 0.10 | — | — |
| Non-aqueous electrolyte solution 25 | LiBF4 | 0.8 | LiN(SO2F)2 | 0.3 | LiBOB | 0.1 | 9.1 | Li-DCNIM | 0.10 | — | — |
| Non-aqueous electrolyte solution 26 | LiBF4 | 0.8 | LiN(SO2F)2 | 0.3 | LiBOB | 0.1 | 9.1 | Li-LTCM | 0.10 | — | — |
| Non-aqueous electrolyte solution 27 | LiBF4 | 0.8 | LiN(SO2F)2 | 0.3 | LiBOB | 0.1 | 9.1 | — | — | DMEt | 1.00 |
| Non-aqueous electrolyte solution 28 | LiBF4 | 0.8 | LiN(SO2F)2 | 0.3 | LiBOB | 0.1 | 9.1 | — | — | DMEt | 10.00 |
| Non-aqueous electrolyte solution 29 | LiBF4 | 0.8 | LiN(SO2F)2 | 0.3 | LiBOB | 0.1 | 9.1 | — | — | DIOX | 5.00 |

TABLE 6-continued

| | Lithium salt electrolyte | | | | | | | Nitrile compound | | Ether compound | |
| | Component (A) | | Component (B) | | Component (C) | | (C)/ | | | | |
| Non-aqueous electrolyte solution type | Type | Concentration (mol/L) | Type | Concentration (mol/L) | Type | Concentration (mol/L) | {(A) + (B)} ratio (%) | Type | Concentration (mol/L) | Type | Concentration (mol/L) |
|---|---|---|---|---|---|---|---|---|---|---|---|
| Non-aqueous electrolyte solution 30 | LiBF$_4$ | 0.8 | LiN(SO$_2$F)$_2$ | 0.3 | LiBOB | 0.1 | 9.1 | AcCN | 5.00 | DMEt | 5.00 |
| Non-aqueous electrolyte solution 31 | LiBF$_4$ | 0.8 | LiN(SO$_2$F)$_2$ | 0.3 | LiBOB | 0.1 | 9.1 | AcCN | 0.05 | — | — |
| Non-aqueous electrolyte solution 32 | LiBF$_4$ | 0.8 | LiN(SO$_2$F)$_2$ | 0.3 | LiBOB | 0.1 | 9.1 | AcCN | 7.00 | — | — |
| Non-aqueous electrolyte solution 33 | LiBF$_4$ | 0.8 | LiN(SO$_2$F)$_2$ | 0.3 | LiBOB | 0.1 | 9.1 | — | — | DMEt | 0.50 |
| Non-aqueous electrolyte solution 34 | LiBF$_4$ | 0.8 | LiN(SO$_2$F)$_2$ | 0.3 | LiBOB | 0.1 | 9.1 | — | — | DMEt | 12.00 |

The abbreviations of the components in Table 5 and Table 6 stand for the following.
[Component (A)] at Least One Lithium Salt from Among LiPF$_6$ and LiBF$_4$
  LiBF$_4$: Lithium tetrafluoroborate
  LiPF$_6$: Lithium hexafluorophosphate
[Component (B)] Lithium Salt with an Imide Structure
  LiN(SO$_2$F)$_2$: Lithium bis(fluorosulfonyl)imide
  LiN(CF$_3$SO$_2$)$_2$: Lithium bis(trifluoromethanesulfonyl)imide
  LiN(CF$_3$CF$_2$SO$_2$)$_2$: Lithium bis(pentafluoroethanesulfonyl)imide
[Component (C)] Lithium Salt with an Oxalate Complex as the Anion
  LiBOB: Lithium bisoxalatoborate
  LiFOB: Lithium fluorooxalatoborate
  LiDFOB: Lithium difluoro(oxalato)borate
[Nitrile Compound]
  AcCN: Acetonitrile
  ScCN: Succinonitrile
  MeOAcCN: Methoxyacetonitrile
  ATCNP: 2-Amino-1,1,3-tricyano-1-propene
  IM-TCNM: 1-Butyl-3-methylimidazolium tricyanomethanide
  Li-DCNIM: Lithium4,5-dicyano-2-(trifluoromethyl)imidazole
  Li-TCNM: 1-Butyl-3-methylimidazolium tricyanomethanide
[Ether Compound]
  DMEt: 1,2-Dimethoxyethane
  DIOX: 1,3-Dioxane
The "—" symbols in Table 5 and Table 6 indicate that the component in the column was not used.

Example 14

<Production of Non-Aqueous Lithium Power Storage Element>
[Assembly]

In Example 14, a two-layer structure separator was used, having a 5 μm-thick coating layer containing boehmite (AlOOH) microparticles formed on one side of a polyethylene (PE) microporous film with a thickness of 15 μm.

Twenty-one double-sided negative electrodes, 20 double-sided positive electrode precursors 3 and two single-sided positive electrode precursors 3 were each cut to 10 cm×10 cm (100 cm$^2$). Using a single-sided positive electrode precursor 3 on each of the uppermost side and lowermost side with the positive electrode active material layers facing inward, the twenty-one double-sided negative electrodes 22 and 20 double-sided positive electrode precursors 3 were alternately placed, with microporous film separators inserted between adjacent negative electrodes and positive electrode precursors in the stacking direction. After further connecting the negative electrodes and positive electrode precursors by ultrasonic welding of negative electrode terminals and positive electrode terminals, the stack was vacuum dried under conditions with a temperature of 80° C., a pressure of 50 Pa and a drying time of 60 hr, to obtain an electrode laminate body.

The dried electrode laminate body was housed in an external body composed of an aluminum laminate package material in a dry environment with a dew point of −45° C., and three sides of the external body at the terminal sections of the positive and negative electrodes and the bottom section were heat sealed under conditions with a temperature of 180° C., a seal time of 20 sec and a seal pressure of 1.0 MPa.

[Filling, Impregnation and Sealing]

Approximately 80 g of the non-aqueous electrolyte solution 1 was injected into the electrode laminate body housed in the aluminum laminate package material under atmospheric pressure, in a dry air environment with a temperature of 25° C. and a dew point of no higher than −40° C., to form a non-aqueous lithium power storage element before lithium doping treatment. Next, the non-aqueous lithium power storage element was placed in a pressure reduction chamber and the pressure was reduced from ordinary pressure to −87 kPa, after which it was restored to ordinary pressure and allowed to stand for 5 minutes. The procedure of reducing the pressure from ordinary pressure to −87 kPa and then restoring to ordinary pressure was subsequently repeated 4 times, and the element was then allowed to stand at ordinary pressure for 15 minutes. The pressure was again reduced from ordinary pressure to −91 kPa, and then restored to ordinary pressure. The procedure of pressure reduction and restoration to ordinary pressure in the same manner was repeated a total of 7 times (pressure reduction from ordinary pressure to −95, −96, −97, −81, −97, −97 and −97 kPa, respectively). The non-aqueous electrolyte solution 1 was impregnated into the electrode laminate body of the non-aqueous lithium power storage element by this procedure.

Next, the external body housing the electrode laminate body impregnated with the non-aqueous electrolyte solution 3 was placed in a pressure-reducing sealing machine, and with pressure reduction to −95 kPa, it was sealed for 10 seconds at 180° C. at a pressure of 0.1 MPa to seal the aluminum laminate package material and obtain a non-aqueous lithium power storage element (lithium ion capacitor).

[Lithium Doping]

The obtained non-aqueous lithium power storage element was subjected to initial charging by constant-current charge using a charge-discharge apparatus (TOSCAT-3100U) by Toyo System Co., Ltd., in an environment of 25° C. with a current value of 50 mA until reaching a voltage of 4.5 V, followed by constant-voltage charge at 4.5 V continued for 72 hours, for lithium doping of the negative electrode.

[Aging]

The lithium-doped non-aqueous lithium power storage element was subjected to constant-current discharge in an environment of 25° C. at 1.0 A until reaching a voltage of 3.0 V, and then constant-voltage discharge at 3.0 V for 1 hour, to adjust the voltage to 3.0 V. The non-aqueous lithium power storage element was then stored for 60 hours in a thermostatic bath at 60° C. for aging.

[Degassing]

A portion of the aluminum laminate package material of the aged non-aqueous lithium power storage element was unsealed in a dry air environment with a temperature of 25° C. and a dew point of −40° C. Next, the non-aqueous lithium power storage element of which a portion of the aluminum laminate package material had been opened was placed in a pressure reduction chamber, and a procedure of using a diaphragm pump by KNF Co. (N816.3KT.45.18) for pressure reduction over a period of 3 minutes from ordinary pressure to −80 kPa, followed by restoration to ordinary pressure over a period of 3 minutes, was repeated a total of 3 times. The non-aqueous lithium power storage element was placed in a pressure-reducing sealing machine, and after pressure reduction to −90 kPa, it was sealed at a temperature of 200° C. for 10 seconds at a pressure of 0.1 MPa to seal (reseal) the aluminum laminate package material.

The non-aqueous lithium power storage element was evaluated by the methods described above.

[Measurement of Discharge Capacity Q at Vmax=3.8 V, Vmin=2.2 V]

The discharge capacity Q of the power storage element was measured with Vmax=3.8 V, Vmin=2.2 V. The obtained non-aqueous lithium power storage element was subjected to constant-current charge using a charge-discharge apparatus (5 V, 360 A) by Fujitsu Telecom Networks, Ltd. in a thermostatic bath set to 25° C., at a 20 C current value until reaching 3.8 V, and then constant-voltage charge was carried out with application of a constant voltage of 3.8 V for a total of 30 minutes. Next, constant-current discharge was carried out to 2.2 V at a current value of 2 C, to measure the discharge capacity Q.

The non-aqueous lithium power storage element of Example 14 had Vmax=3.8 V, and the discharge capacity Q at Vmin=2.2 V was 952.3 mAh.

[Calculation of Ordinary Temperature Discharge Internal Resistance Ra at Vmax=3.8 V, Vmin=2.2 V]

The initial ordinary temperature discharge internal resistance Ra of the power storage element was measured with Vmax=3.8 V, Vmin=2.2 V. The obtained non-aqueous lithium power storage element was subjected to initial charge-discharge by the following procedure using a charge-discharge apparatus (5 V, 360 A) by Fujitsu Telecom Networks, Ltd., in a thermostatic bath set to 25° C.

First, constant-current charge was carried out at a current value of 20 C to 3.8 V, and then constant-voltage charge was carried out for 30 minutes in total with application of a constant voltage of 3.8 V. Constant-current discharge was then carried out to 2.2 V at a current value of 20 C, completing the initial charge-discharge procedure. From the discharge curve (time-voltage) obtained during constant-current discharge, with a voltage of $E_0$ at discharge time=0 seconds, obtained by extrapolating an approximate straight line from the voltage values at discharge time points of 1 second and 2 seconds, the ordinary temperature discharge internal resistance Ra was calculated from voltage drop $\Delta E=\Delta E=3.8-E_0$, and R=$\Delta E$/(20 C (current value A)).

The ordinary temperature discharge internal resistance Ra after initial charge-discharge of the non-aqueous lithium power storage element of Example 14 was 1.01 mΩ.

[Calculation of Rb, and Calculation of Rb/Ra, after High-Temperature Storage Test]

The obtained non-aqueous lithium power storage element was subjected to a high-temperature storage test.

The obtained non-aqueous lithium power storage element was subjected to constant-current charge using a charge-discharge apparatus (5 V, 360 A) by Fujitsu Telecom Networks, Ltd. in a thermostatic bath set to 25° C., at a current value of 100 C until reaching 4.0 V, and then constant-voltage charge was carried out with application of a constant voltage of 4.0 V for a total of 10 minutes. The power storage element was then stored in an 85° C. environment, and every week it was removed out from the 85° C. environment, the cell voltage was charged to 4.0 V by the same charging procedure, and the cell was returned back to the 85° C. environment for continued storage. This procedure was repeated for 500 hours, as a high-temperature storage test for the non-aqueous power storage element. The ordinary temperature discharge internal resistance Rb after the high-temperature storage test was calculated in the same manner as [Calculation of ordinary temperature discharge internal resistance Ra at Vmax=3.8 V, Vmin=2.2 V], for the power storage element after the high-temperature storage test. The Rb (Ω) was divided by the ordinary temperature discharge internal resistance Ra (Ω) at Vmax=3.8 V, Vmin=2.2 V before the high-temperature storage test, and when the Rb/Ra ratio was calculated, it was found to be 4.19.

[Calculation of Qb after High-Temperature Storage Test, and Calculation of Qb/Qa]

The obtained non-aqueous lithium power storage element was subjected to a high-temperature storage test.

The obtained non-aqueous lithium power storage element was subjected to constant-current charge using a charge-discharge apparatus (5 V, 360 A) by Fujitsu Telecom Networks, Ltd. in a thermostatic bath set to 25° C., at a current value of 100 C until reaching 4.0 V, and then constant-voltage charge was carried out with application of a constant voltage of 4.0 V for a total of 10 minutes. The power storage element was then stored in an 85° C. environment, and every week it was removed out from the 85° C. environment, the cell voltage was charged to 4.0 V by the same charging procedure, and the cell was returned back to the 85° C. environment for continued storage. This procedure was repeated for 500 hours, as a high-temperature storage test for the non-aqueous power storage element. The discharge capacity Qb after the high-temperature storage test was calculated in the same manner as [Calculation of discharge capacity Qa at Vmax=3.8 V, Vmin=2.2 V], for the power storage element after the high-temperature storage test. The Qb (mAh) was divided by the discharge capacity Qa (mAh) at Vmax=3.8 V, Vmin=2.2 V before the high-temperature storage test, and when the Qb/Qa ratio was calculated, it was found to be 0.70.

[Confirmation of SEI (Lithium Oxalate) Formation]

The non-aqueous lithium power storage element was disassembled in an argon (Ar) box set in a room at 23° C. and controlled to a dew point of no higher than −90° C. and an oxygen concentration of no greater than 1 ppm, and the negative electrode was removed. The negative electrode was rinsed with a dimethyl carbonate (DMC) solution. The negative electrode active material layer surface of the negative electrode was subjected to surface analysis without atmospheric exposure, using an X-ray photoelectron spectroscopy (XPS) (Versa Probe II by Ulvac-Phi, Inc.), under the following conditions.

Excitation source: monochromatized AlKα
X-ray beam diameter: 100 µm φ (25 W, 15 kV)
Path energy: narrow scan, 46.95 eV
Charge neutralization: On
Number of sweeps: 10 narrow scans
Energy step: narrow scan, 0.25 eV
Lithium oxalate formation was confirmed by a peak in the range of 289 eV to 290 eV (carbon peak).

[Confirmation of Al Corrosion]

The obtained non-aqueous lithium power storage element was subjected to a high-temperature storage test.

The obtained non-aqueous lithium power storage element was subjected to constant-current charge using a charge-discharge apparatus (5 V, 360 A) by Fujitsu Telecom Networks, Ltd. in a thermostatic bath set to 25° C., at a current value of 100 C until reaching 4.0 V, and then constant-voltage charge was carried out with application of a constant voltage of 4.0 V for a total of 10 minutes. The power storage element was then stored in an 85° C. environment, and every week it was removed out from the 85° C. environment, the cell voltage was charged to 4.0 V by the same charging procedure, and the cell was returned back to the 85° C. environment for continued storage. This procedure was repeated for 500 hours, as a high-temperature storage test for the non-aqueous power storage element. The power storage element after the high-temperature storage test was disassembled in an Ar box set in a room at 23° C. and controlled to a dew point of no higher than −90° C. and an oxygen concentration of no greater than 1 ppm, and the surface of the positive electrode current collector was visually confirmed. As a result, the characteristic blackening of Al corrosion was not found on the positive electrode current collector surface, and it was judged to have no Al corrosion.

Examples 15 to 47 and Comparative Examples 10 to 18

Non-aqueous lithium power storage elements were produced and evaluated in the same manner as Example 14, except for using the positive electrode precursors, negative electrodes and non-aqueous electrolyte solutions listed in Tables 7 to 9.

The evaluation results for the obtained non-aqueous lithium power storage elements are shown in Tables 7 to 9.

TABLE 7

| | Positive electrode precursor type | Negative electrode type | Non-aqueous electrolyte solution type | SEI XPS of negative electrode Presence of peak at 289 to 290 eV | After initial charge-discharge Discharge capacity Qa (mAh) | After initial charge-discharge Internal resistance Ra (mΩ) | After high voltage, high-temperature storage test Discharge capacity Qb (mAh) | After high voltage, high-temperature storage test Internal resistance Rb (mΩ) | Qb/Qa | Rb/Ra | Al corrosion |
|---|---|---|---|---|---|---|---|---|---|---|---|
| Example 14 | Positive electrode precursor 3 | Negative electrode 22 | Non-aqueous electrolyte solution 3 | Yes | 952.3 | 1.01 | 664.1 | 4.23 | 0.70 | 4.19 | No |
| Example 15 | Positive electrode precursor 4 | Negative electrode 22 | Non-aqueous electrolyte solution 3 | Yes | 945.2 | 1.10 | 700.3 | 4.64 | 0.74 | 4.22 | No |
| Example 16 | Positive electrode precursor 5 | Negative electrode 22 | Non-aqueous electrolyte solution 3 | Yes | 941.5 | 1.27 | 701.9 | 4.94 | 0.75 | 3.89 | No |
| Example 17 | Positive electrode precursor 6 | Negative electrode 22 | Non-aqueous electrolyte solution 3 | Yes | 961.7 | 1.25 | 810.0 | 6.07 | 0.84 | 4.86 | No |
| Example 18 | Positive electrode precursor 7 | Negative electrode 22 | Non-aqueous electrolyte solution 3 | Yes | 829.8 | 1.97 | 828.6 | 4.72 | 1.00 | 2.40 | No |
| Example 19 | Positive electrode precursor 8 | Negative electrode 22 | Non-aqueous electrolyte solution 3 | Yes | 962.6 | 1.99 | 837.7 | 4.64 | 0.87 | 2.33 | No |
| Example 20 | Positive electrode precursor 9 | Negative electrode 22 | Non-aqueous electrolyte solution 3 | Yes | 953.6 | 2.52 | 676.4 | 4.33 | 0.71 | 1.72 | No |
| Example 21 | Positive electrode precursor 7 | Negative electrode 22 | Non-aqueous electrolyte solution 4 | Yes | 838.1 | 1.76 | 744.5 | 3.02 | 0.89 | 1.72 | No |

TABLE 7-continued

| | Positive electrode precursor type | Negative electrode type | Non-aqueous electrolyte solution type | SEI XPS of negative electrode Presence of peak at 289 to 290 eV | Discharge capacity Qa (mAh) | Internal resistance Ra (mΩ) | Discharge capacity Qb (mAh) | Internal resistance Rb (mΩ) | Qb/Qa | Rb/Ra | Al corrosion |
|---|---|---|---|---|---|---|---|---|---|---|---|
| Example 22 | Positive electrode precursor 8 | Negative electrode 22 | Non-aqueous electrolyte solution 4 | Yes | 976.0 | 1.78 | 854.8 | 4.31 | 0.88 | 2.42 | No |
| Example 23 | Positive electrode precursor 9 | Negative electrode 22 | Non-aqueous electrolyte solution 4 | Yes | 984.2 | 2.18 | 657.5 | 3.37 | 0.67 | 1.55 | No |
| Example 24 | Positive electrode precursor 3 | Negative electrode 22 | Non-aqueous electrolyte solution 5 | Yes | 982.6 | 2.28 | 701.4 | 3.26 | 0.71 | 1.43 | No |
| Example 25 | Positive electrode precursor 3 | Negative electrode 22 | Non-aqueous electrolyte solution 6 | Yes | 959.6 | 1.07 | 809.4 | 3.85 | 0.84 | 3.60 | No |
| Example 26 | Positive electrode precursor 3 | Negative electrode 22 | Non-aqueous electrolyte solution 7 | Yes | 960.7 | 1.98 | 894.5 | 4.21 | 0.93 | 2.13 | No |
| Example 27 | Positive electrode precursor 3 | Negative electrode 22 | Non-aqueous electrolyte solution 8 | Yes | 946.0 | 2.18 | 807.0 | 3.57 | 0.85 | 1.64 | No |
| Example 28 | Positive electrode precursor 3 | Negative electrode 22 | Non-aqueous electrolyte solution 9 | Yes | 947.4 | 2.03 | 878.0 | 4.68 | 0.93 | 2.31 | No |
| Example 29 | Positive electrode precursor 3 | Negative electrode 22 | Non-aqueous electrolyte solution 10 | Yes | 975.5 | 2.42 | 794.8 | 3.15 | 0.81 | 1.30 | No |
| Example 30 | Positive electrode precursor 3 | Negative electrode 22 | Non-aqueous electrolyte solution 11 | Yes | 968.3 | 2.45 | 858.5 | 3.15 | 0.89 | 1.29 | No |
| Example 31 | Positive electrode precursor 3 | Negative electrode 22 | Non-aqueous electrolyte solution 12 | Yes | 962.3 | 1.02 | 825.2 | 4.88 | 0.86 | 4.78 | No |
| Example 32 | Positive electrode precursor 3 | Negative electrode 22 | Non-aqueous electrolyte solution 13 | Yes | 966.0 | 1.01 | 729.2 | 4.20 | 0.75 | 4.16 | No |
| Comp. Example 10 | Positive electrode precursor 3 | Negative electrode 22 | Non-aqueous electrolyte solution 14 | Yes | 948.8 | 4.74 | 867.3 | 6.28 | 0.91 | 1.32 | No |
| Comp. Example 11 | Positive electrode precursor 3 | Negative electrode 22 | Non-aqueous electrolyte solution 15 | No | 955.3 | 1.46 | 390.1 | 7.8 | 0.41 | 5.34 | No |
| Comp. Example 12 | Positive electrode precursor 3 | Negative electrode 22 | Non-aqueous electrolyte solution 16 | Yes | 953.9 | 1.29 | 385.6 | 7.95 | 0.40 | 6.16 | Yes |
| Comp. Example 13 | Positive electrode precursor 3 | Negative electrode 22 | Non-aqueous electrolyte solution 17 | Yes | 951.2 | 5.32 | 719.2 | 7.97 | 0.76 | 1.50 | No |
| Comp. Example 14 | Positive electrode precursor 3 | Negative electrode 22 | Non-aqueous electrolyte solution 18 | No | 956.6 | 1.35 | 249.1 | 4.46 | 0.26 | 3.30 | No |

TABLE 8

| | Positive electrode precursor type | Negative electrode type | Non-aqueous electrolyte solution type | SEI XPS of negative electrode Presence of peak at 289 to 290 eV | Discharge capacity Qa (mAh) | Internal resistance Ra (mΩ) | Discharge capacity Qb (mAh) | Internal resistance Rb (mΩ) | Qb/Qa | Rb/Ra | Al corrosion |
|---|---|---|---|---|---|---|---|---|---|---|---|
| Example 33 | Positive electrode precursor 3 | Negative electrode 22 | Non-aqueous electrolyte solution 19 | Yes | 987.7 | 1.97 | 785.6 | 3.08 | 0.80 | 1.56 | No |

TABLE 8-continued

| | Positive electrode precursor type | Negative electrode type | Non-aqueous electrolyte solution type | SEI XPS of negative electrode Presence of peak at 289 to 290 eV | Discharge capacity and internal resistance | | | | Qb/Qa | Rb/Ra | Al corrosion |
|---|---|---|---|---|---|---|---|---|---|---|---|
| | | | | | After initial charge-discharge | | After high voltage, high-temperature storage test | | | | |
| | | | | | Discharge capacity Qa (mAh) | Internal resistance Ra (mΩ) | Discharge capacity Qb (mAh) | Internal resistance Rb (mΩ) | | | |
| Example 34 | Positive electrode precursor 3 | Negative electrode 22 | Non-aqueous electrolyte solution 20 | Yes | 947.1 | 1.76 | 758.2 | 2.07 | 0.80 | 1.18 | No |
| Example 35 | Positive electrode precursor 3 | Negative electrode 22 | Non-aqueous electrolyte solution 21 | Yes | 978.4 | 1.49 | 744.7 | 1.88 | 0.76 | 1.26 | No |
| Example 36 | Positive electrode precursor 3 | Negative electrode 22 | Non-aqueous electrolyte solution 22 | Yes | 959.1 | 1.83 | 818.4 | 2.99 | 0.85 | 1.63 | No |
| Example 37 | Positive electrode precursor 3 | Negative electrode 22 | Non-aqueous electrolyte solution 23 | Yes | 977.3 | 0.91 | 670.2 | 3.36 | 0.69 | 3.69 | No |
| Example 38 | Positive electrode precursor 3 | Negative electrode 22 | Non-aqueous electrolyte solution 24 | Yes | 986.1 | 0.94 | 690.2 | 3.66 | 0.70 | 3.89 | No |
| Example 39 | Positive electrode precursor 3 | Negative electrode 22 | Non-aqueous electrolyte solution 25 | Yes | 967.3 | 0.75 | 732.9 | 3.07 | 0.76 | 4.09 | No |
| Example 40 | Positive electrode precursor 3 | Negative electrode 22 | Non-aqueous electrolyte solution 26 | Yes | 990.3 | 0.85 | 862.1 | 1.21 | 0.87 | 1.42 | No |
| Example 41 | Positive electrode precursor 3 | Negative electrode 22 | Non-aqueous electrolyte solution 27 | Yes | 963.9 | 1.80 | 891.3 | 2.14 | 0.92 | 1.19 | No |
| Example 42 | Positive electrode precursor 3 | Negative electrode 22 | Non-aqueous electrolyte solution 28 | Yes | 953.9 | 1.29 | 869.7 | 2.85 | 0.91 | 2.21 | No |
| Example 43 | Positive electrode precursor 3 | Negative electrode 22 | Non-aqueous electrolyte solution 29 | Yes | 970.3 | 1.58 | 882.7 | 2.4 | 0.91 | 1.52 | No |
| Example 44 | Positive electrode precursor 3 | Negative electrode 22 | Non-aqueous electrolyte solution 30 | Yes | 980.2 | 1.2 | 887.2 | 2.93 | 0.91 | 2.44 | No |
| Comp. Example 15 | Positive electrode precursor 3 | Negative electrode 22 | Non-aqueous electrolyte solution 31 | Yes | 945.9 | 1.29 | 734.5 | 6.33 | 0.78 | 4.91 | No |
| Comp. Example 16 | Positive electrode precursor 3 | Negative electrode 22 | Non-aqueous electrolyte solution 32 | Yes | 990.3 | 4.97 | 678.5 | 6.45 | 0.69 | 1.30 | No |
| Comp. Example 17 | Positive electrode precursor 3 | Negative electrode 22 | Non-aqueous electrolyte solution 33 | Yes | 942.1 | 1.12 | 847.5 | 4.58 | 0.90 | 4.09 | No |
| Comp. Example 18 | Positive electrode precursor 3 | Negative electrode 22 | Non-aqueous electrolyte solution 34 | Yes | 973.7 | 0.77 | 528.7 | 6.75 | 0.54 | 8.77 | No |

TABLE 9

| | | | | SEI XPS of negative | Discharge capacity and internal resistance | | | | | | |
|---|---|---|---|---|---|---|---|---|---|---|---|
| | | | | | After initial charge-discharge | | After high voltage, high-temperature storage test | | | | |
| | Positive electrode precursor type | Negative electrode type | Non-aqueous electrolyte solution type | Presence of peak at 289 to 290 eV electrode | Discharge capacity Qa (mAh) | Internal resistance Ra (mΩ) | Discharge capacity Qb (mAh) | Internal resistance Rb (mΩ) | Qb/Qa | Rb/Ra | Al corrosion |
| Example 45 | Positive electrode precursor 3 | Negative electrode 23 | Non-aqueous electrolyte solution 18 | No | 963.5 | 1.2 | 385.4 | 3.03 | 0.40 | 2.53 | No |
| Example 46 | Positive electrode precursor 3 | Negative electrode 23 | Non-aqueous electrolyte solution 23 | Yes | 926.8 | 0.84 | 851.6 | 0.98 | 0.92 | 1.17 | No |
| Example 47 | Positive electrode precursor 3 | Negative electrode 23 | Non-aqueous electrolyte solution 28 | Yes | 940.7 | 0.79 | 874.9 | 0.8 | 0.93 | 1.01 | No |

These Examples confirmed that the non-aqueous lithium power storage element of the invention is a non-aqueous lithium power storage element exhibiting high capacitance, and with an excellent initial output characteristic and excellent high temperature storage durability. In particular, since the discharge capacity residue rate Qb/Qa was 0.70 or greater and the internal resistance increase rate Rb/Ra was 5.0 or lower after high temperature storage in an environment of 85° C. and 4.0 V, the high temperature durability was demonstrated to be excellent.

It is thought that the non-aqueous lithium power storage element of this embodiment has excellent high temperature durability due to a synergistic effect of:

(1) lithium compounds other than the positive electrode active material in the positive electrode being converted to a protective film on the positive electrode by charge-discharge, (2) the iron element in the positive electrode active material layer functioning as a catalyst to increase formation of a protective coating film from the lithium compounds other than the positive electrode active material, and (3) the non-aqueous electrolyte solution comprising the three different specified lithium salts (A) to (C) in the specified proportions.

The non-aqueous lithium power storage elements of Examples 46 and 47 were shown to have particularly excellent high temperature durability.

This suggests a synergistic effect by:

the carbon nanotubes in the negative electrode helping to prevent swelling of the electrode and maintain the negative electrode structure, the non-aqueous electrolyte solution comprising the three different specified lithium salts (A) to (C) in the specified proportions, and the non-aqueous electrolyte solution comprising the specified trinitrile compound in the specified proportion.

With the non-aqueous lithium power storage element of Comparative Example 12, corrosion was confirmed in the Al positive electrode current collector after high temperature storage. This is thought to have occurred because of insufficient formation of aluminum fluoride, which inhibits Al corrosion.

Examples 48 to 67 and Comparative Examples 19 to 27

<Pulverization of Lithium Carbonate>

Lithium carbonate was pulverized by brittle fracture while preventing heat denaturation, at a temperature of −196° C. After loading 200 g of lithium carbonate with a mean particle size of 53 μm into a pulverizer (LNM liquid nitrogen bead mill) by Aimex Corp. and cooling to −196° C. with liquid nitrogen, it was pulverized for 9 minutes at a circumferential speed of 10.0 m/s, using dry ice beads. The mean particle size of the obtained lithium carbonate was 2.26 μm.

Preparation of Positive Electrode Active Material

Preparation of Active Carbon 4

Crushed coconut shell carbide was carbonized for 3 hours at 500° C. in a small carbonizing furnace in a nitrogen atmosphere, to obtain a carbide. The obtained carbide was placed in an activating furnace, water vapor in a heated state using a preheating furnace was introduced into the activating furnace at 1 kg/h, and the temperature was increased to 900° C. over 8 hours for activation. The activated carbide was removed and cooled in a nitrogen atmosphere. The obtained active carbon was flow-rinsed for 10 hours and then drained. The rinsed and drained active carbon was dried for 10 hours in an electrodesiccator held at 115° C., and then pulverized for 1 hour with a ball mill to obtain active carbon 4.

A laser diffraction particle size distribution analyzer (SALD-2000J) by Shimadzu Corp. was used to measure the mean particle size of the active carbon 4, which was found to be 4.2 μm. Also, as a result of measuring the pore distribution of active carbon 1 using a pore distribution measuring device by Yuasa-Ionics, Inc. (AUTOSORB-1 AS-1-MP), the BET specific surface area was 2,360 m$^2$/g, the mesopore volume ($V_1$) was 0.52 cc/g, the micropore volume ($V_2$) was 0.88 cc/g and $V_1/V_2$=0.59.

<Positive Electrode Precursor 4>

Preparation of Iron Element-Containing Lithium Compound

There were added 100 parts by mass of lithium carbonate as a lithium compound and 2.3 parts by mass of ferric chloride ($FeCl_3 \cdot 6H_2O$) to distilled water, to prepare an aqueous solution with a lithium carbonate concentration of 0.5 mass %. The obtained solution was stirred for 1 hour with a HomoDisperser while being heated at 60° C. in an oil bath. The liquid temperature was then raised to 100° C. to evaporate off the water, depositing an iron element-containing lithium carbonate powder. After placing the obtained iron element-containing lithium carbonate powder in an alumina vessel, and setting this in a muffle furnace, it was heated at 300° C. for 10 hours while flowing a nitrogen/hydrogen mixed gas for dechlorination treatment, after which it was pulverized with a jet mill to obtain iron element-containing lithium carbonate powder 5 having a predetermined particle size. The mean particle size of the iron element-containing lithium carbonate powder 5 was measured using a Laser diffraction particle size distribution analyzer by Shimadzu Corp., and found to be 0.8

[Production of Positive Electrode Precursor 4]

The active carbon 4 obtained in [Preparation of active carbon 4] above was used at 58.5 parts by mass as a positive electrode active material, and mixed with a lithium compound other than a positive electrode active material, of the type and amount listed in Table 1, and with a conductive filler. After mixing 1.5 parts by mass of PVP (polyvinylpyrrolidone), 8.0 parts by mass of PVDF (polyvinylidene fluoride) and NMP (N-methylpyrrolidone) with the obtained mixture, it was dispersed using a FILMIX® thin-film spinning high-speed mixer by Primix Corp., under conditions with a circumferential speed of 17 m/s, to obtain a coating solution. The coating solution was coated onto one or both sides of an aluminum foil with a thickness of 15 and lacking through-holes, as a positive electrode current collector, using a die coater by Toray Engineering Co., Ltd. under conditions with a coating speed of 1 m/s, and dried at a drying temperature of 100° C. to obtain a positive electrode precursor. The obtained positive electrode precursor was pressed using a roll press under conditions with a pressure of 4 kN/cm and a pressing section surface temperature of 25° C.

The positive electrode precursor obtained by coating only one side of the positive electrode current collector will hereunder be referred to as "single-sided positive electrode precursor", and the positive electrode precursor obtained by coating both sides of the positive electrode current collector will be referred to as "double-sided positive electrode precursor".

[Production of Positive Electrode Precursors 5 to 10]

Positive electrode precursors 5 to 10 were produced by the same method as positive electrode precursor 4, except that the types and amounts of lithium compounds other than the positive electrode active material and conductive fillers were as listed in Table 10.

TABLE 10

| Positive electrode precursor type | Positive electrode active material Carbon material | | Lithium compounds other than positive electrode active material | | Conductive filler | |
|---|---|---|---|---|---|---|
| | Type | Amount (parts by mass) | Type | Amount (parts by mass) | Type | Amount (parts by mass) |
| Positive electrode precursor 4 | Active carbon 4 | 58.5 | Fe—Li carbonate 5 | 28 | KB | 3 |
| Positive electrode precursor 5 | Active carbon 4 | 76.8 | Fe—Li carbonate 5 | 10.2 | KB | 3 |
| Positive electrode precursor 6 | Active carbon 4 | 57.5 | Fe—Li carbonate 5 | 32 | KB | 3 |
| Positive electrode precursor 7 | Active carbon 4 | 41.8 | Fe—Li carbonate 5 | 49.6 | KB | 3 |
| Positive electrode precursor 8 | Active carbon 4 | 58.5 | Li hydroxide | 28 | KB | 3 |
| Positive electrode precursor 9 | Active carbon 4 | 58.5 | Fe—Li carbonate 5 | 28 | KB | 3 |
| Positive electrode precursor 10 | Active carbon 4 | 76.8 | Fe—Li carbonate 5 | 9.7 | KB | 3 |

The abbreviations of the components in Table 10 stand for the following.

[Lithium Compounds Other than Positive Electrode Active Material]

Fe—Li carbonate 5: Iron element-containing lithium carbonate powder 5 with a mean particle size of 0.8 μm, obtained by <Preparation of iron element-containing lithium compound> above Li hydroxide: Lithium hydroxide with a mean particle size of 2.4 μm

[Conductive Filler]

KB: Ketchen black

<Production of Composite Carbon Material 1>

Artificial graphite having a mean particle size of 9.7 μm and a BET specific surface area of 1.2 m²/g, used as a base material in an amount of 200 g, was placed into a stainless steel mesh basket and set on a stainless steel vat containing 60 g of coal pitch (softening point: 65° C.) as a carbonaceous material precursor, and both were set in an electric furnace (furnace inner usable dimension: 300 mm×300 mm×300 mm). This was increased in temperature to 1,110° C. for 8 hours under a nitrogen atmosphere and kept at the same temperature for 4 hours for thermal reaction to obtain composite carbon material 1. The obtained composite carbon material 1 was cooled to 60° C. by natural cooling, and then removed out from the electric furnace.

The obtained composite carbon material 1 was subjected to Raman scattering analysis by microscopic Raman spectroscopy by the method described above, using laser light with a wavelength of 532 nm. As a result, the ratio Id/Ig, of the intensity Ig of the peak Pg near 1,580 cm⁻¹ and the intensity Id of the peak Pd near 1,360 cm⁻¹, was 0.59.

<Production of Composite Carbon Materials 2 to 8>

Composite carbon materials 2 to 8 were produced in the same manner as <Production of composite carbon material 1> above, except that the types and amounts of base materials and carbonaceous material precursors, and the heating temperatures, were changed as listed in Table 11.

The results of Raman scattering analysis in the same manner as above are also shown in Table 11.

TABLE 11

| Type | Base material Type | Amount used (g) | Carbonaceous material precursor Type | Amount used (g) | Heating temperature (° C.) | Raman scattering analysis Id/Ig | Amount used (mass %) |
|---|---|---|---|---|---|---|---|
| Composite carbon material 1 | Artificial graphite | 200 | Coal pitch | 60 | 1100 | 0.59 | 84 |
| Composite carbon material 2 | Artificial graphite | 200 | Coal pitch | 10 | 1100 | 0.41 | 84 |
| Composite carbon material 3 | Artificial graphite | 200 | Coal pitch | 7.5 | 1100 | 0.33 | 84 |
| Composite carbon material 4 | Natural graphite | 200 | Coal pitch | 60 | 1100 | 0.35 | 84 |
| Composite carbon material 5 | Natural graphite | 200 | Coal pitch | 7.5 | 1100 | 0.21 | 84 |
| Composite carbon material 6 | Carbon black | 200 | Coal pitch | 30 | 900 | 0.63 | 84 |
| Composite carbon material 7 | Coconut shell active carbon | 200 | Coal pitch | 200 | 660 | 1.23 | 84 |
| Composite carbon material 8 | Carbon black | 200 | Coal pitch | 200 | 900 | 1.01 | 84 |

<Production of Negative Electrode 24>

After mixing 84.0 mass % of the composite carbon material 1 obtained above as a negative electrode active material, 10.0 mass % of acetylene black, 3.0 mass % of carboxymethyl cellulose and 3.0 mass % of styrene-butadiene rubber, with distilled water to a solid mass ratio of 36.5%, the mixture was dispersed for 10 minutes at a rotational speed of 2,000 rpm using an "Awatori Rentaro®" rotating/revolving mixer by Thinky, Inc., to obtain a negative electrode coating solution.

The viscosity (ηb) and TI value of the obtained negative electrode coating solution were measured using a TVE-35H E-type viscometer by Toki Sangyo Co., Ltd. As a result, the viscosity (ηb) was 1,840 mPa·s and the TI value was 3.1.

The negative electrode coating solution was applied onto both sides of an electrolytic copper foil with a thickness of 8 as a negative electrode current collector, using a doctor blade, and dried for 10 minutes on a hot plate heated to 50° C. to obtain a negative electrode. A roll press was used for pressing under conditions with a pressure of 5 kN/cm and a pressing section surface temperature of 25° C., to produce a negative electrode 24. The total thickness of the obtained negative electrode 24 was measured at 10 randomly set locations on the negative electrode surface using a Linear Gauge Sensor GS-551 film thickness meter by Ono Sokki Co., Ltd., the thickness of the negative electrode current collector was subtracted from the average value, and the resulting value further divided by 2 was used as the film thickness per side of the negative electrode active material layer. As a result of the measurement, the film thickness of the negative electrode active material layer of the negative electrode 24 was found to be 30 μm per side.

(Production of Negative Electrodes 25 to 31)

Negative electrodes 25 to 31 were produced in the same manner as <Production of negative electrode 24>, except for using the composite carbon materials listed in Table 12 as the negative electrode active material.

TABLE 12

| Negative electrode type | Negative electrode active material Type | Amount used (mass %) | Negative conductive filler Type | Amount used (mass %) |
|---|---|---|---|---|
| Negative electrode 24 | Composite carbon material 1 | 84 | Acetylene black | 10 |
| Negative electrode 25 | Composite carbon material 2 | 84 | Acetylene black | 10 |
| Negative electrode 26 | Composite carbon material 3 | 84 | Acetylene black | 10 |
| Negative electrode 27 | Composite carbon material 4 | 84 | Acetylene black | 10 |
| Negative electrode 28 | Composite carbon material 5 | 84 | Acetylene black | 10 |
| Negative electrode 29 | Composite carbon material 6 | 84 | Acetylene black | 10 |
| Negative electrode 30 | Composite carbon material 7 | 84 | Acetylene black | 10 |
| Negative electrode 31 | Composite carbon material 8 | 84 | Acetylene black | 10 |

<Preparation of Non-Aqueous Electrolyte Solutions 35 to 50>

Non-aqueous electrolyte solutions 35 to 50 were obtained using a mixed solvent of ethylene carbonate (EC):ethylmethyl carbonate (EMC)=33:67 (volume ratio) as the organic solvent, and dissolving electrolyte salts of the types and concentrations listed in Table 13 in the organic solvent.

TABLE 13

| Non-aqueous electrolyte solution type | Lithium salt electrolyte | | | | | | (C)/{(A) + (B)} ratio (%) |
|---|---|---|---|---|---|---|---|
| | Component (A) | | Component (B) | | Component (C) | | |
| | Type | Concentration (mol/L) | Type | Concentration (mol/L) | Type | Concentration (mol/L) | |
| Non-aqueous electrolyte solution 35 | LiBF4 | 0.8 | LiN(SO$_2$F)$_2$ | 0.3 | LiBOB | 0.05 | 4.5 |
| Non-aqueous electrolyte solution 36 | LiBF4 | 0.8 | LiN(SO$_2$F)$_2$ | 0.3 | LiBOB | 0.1 | 9.1 |
| Non-aqueous electrolyte solution 37 | LiBF4 | 0.8 | LiN(SO$_2$F)$_2$ | 0.3 | LiBOB | 0.015 | 1.4 |
| Non-aqueous electrolyte solution 38 | LiBF4 | 0.8 | LiN(SO$_2$F)$_2$ | 0.5 | LiBOB | 0.05 | 3.8 |
| Non-aqueous electrolyte solution 39 | LiBF4 | 0.7 | LiN(SO$_2$F)$_2$ | 0.5 | LiBOB | 0.05 | 4.2 |
| Non-aqueous electrolyte solution 40 | LiPF6 | 0.8 | LiN(SO$_2$F)$_2$ | 0.6 | LiBOB | 0.05 | 3.6 |
| Non-aqueous electrolyte solution 41 | LiPF6 | 0.8 | LiN(SO$_2$F)$_2$ | 0.3 | LiBOB | 0.12 | 10.9 |
| Non-aqueous electrolyte solution 42 | LiBF4 | 0.8 | LiN(SO$_2$F)$_2$ | 0.3 | LiBOB | 0.01 | 0.9 |
| Non-aqueous electrolyte solution 43 | LiBF4 | 0.8 | LiN(SO$_2$F)$_2$ | 0.3 | LiBOB | 0.05 | 4.5 |
| Non-aqueous electrolyte solution 44 | LiPF6 | 0.8 | LiN(CF$_3$SO2)$_2$ | 0.3 | LiBOB | 0.05 | 4.5 |
| Non-aqueous electrolyte solution 45 | LiPF6 | 0.8 | LiN(CF$_3$CF$_2$SO2)$_2$ | 0.3 | LiBOB | 0.05 | 4.5 |
| Non-aqueous electrolyte solution 46 | LiBF4 | 0.8 | LiN(SO$_2$F)$_2$ | 0.3 | LiDFOB | 0.05 | 4.5 |
| Non-aqueous electrolyte solution 47 | LiBF4 | 0.8 | LiN(SO$_2$F)$_2$ | 0.3 | LiFOB | 0.05 | 4.5 |
| Non-aqueous electrolyte solution 48 | — | — | LiN(SO$_2$F)$_2$ | 1 | LiBOB | 0.05 | — |
| Non-aqueous electrolyte solution 49 | LiBF4 | 1 | — | — | LiBOB | 0.05 | — |
| Non-aqueous electrolyte solution 50 | LiBF4 | 0.8 | LiN(SO$_2$F)$_2$ | 0.3 | — | — | — |

The abbreviations of the components in Table 13 stand for the following.

[Component (A)] at Least One Lithium Salt from Among LiPF$_6$ and LiBF$_4$
  LiBF$_4$: Lithium tetrafluoroborate
  LiPF$_6$: Lithium hexafluorophosphate

[Component (B)] Lithium Salt with an Imide Structure
  LiN(SO$_2$F)$_2$: Lithium bis(fluorosulfonyl)imide
  LiN(CF$_3$SO$_2$)$_2$: Lithium bis(trifluoromethanesulfonyl)imide
  LiN(CF$_3$CF$_2$SO$_2$)$_2$: Lithium bis(pentafluoroethanesulfonyl)imide

[Component (C)] Lithium Salt with an Oxalate Complex as the Anion
  LiBOB: Lithium bisoxalatoborate
  LiFOB: Lithium fluorooxalatoborate
  LiDFOB: Lithium difluoro(oxalato)borate The "-" symbols in Table 13 indicate that the component in the column was not used.

Example 48

<Production of Non-Aqueous Lithium Power Storage Element>

[Assembly]

In Example 48, a two-layer structure separator was used, having a 5 μm-thick coating layer containing boehmite (AlOOH) microparticles formed on one side of a polyethylene (PE) microporous film with a thickness of 15 μm.

Twenty-one double-sided negative electrodes, 20 double-sided positive electrode precursors 1 and two single-sided positive electrode precursors 1 were each cut to 10 cm×10 cm (100 cm$^2$). Using a single-sided positive electrode precursor 1 on each of the uppermost side and lowermost side with the positive electrode active material layers facing inward, the twenty-one double-sided negative electrodes and 20 double-sided positive electrodes 1 precursors 1 were alternately placed, with microporous film separators inserted between adjacent negative electrodes and positive electrode precursors in the stacking direction. After further connecting the negative electrodes and positive electrode precursors by ultrasonic welding of negative electrode terminals and positive electrode terminals, the stack was vacuum dried under conditions with a temperature of 80° C., a pressure of 50 Pa and a drying time of 60 hr, to obtain an electrode laminate body.

The dried electrode laminate body was housed in an external body composed of an aluminum laminate package material in a dry environment with a dew point of −45° C., and three sides of the external body at the terminal sections of the positive and negative electrodes and the bottom section were heat sealed under conditions with a temperature of 180° C., a seal time of 20 sec and a seal pressure of 1.0 MPa.

[Filling, Impregnation and Sealing]

Approximately 80 g of the non-aqueous electrolyte solution 1 was injected into the electrode laminate body housed in the aluminum laminate package material under atmospheric pressure, in a dry air environment with a temperature of 25° C. and a dew point of no higher than −40° C., to form a non-aqueous lithium power storage element before lithium doping treatment. Next, the non-aqueous lithium power storage element was placed in a pressure reduction chamber and the pressure was reduced from ordinary pressure to −87 kPa, after which it was restored to ordinary pressure and allowed to stand for 5 minutes. The procedure of reducing the pressure from ordinary pressure to −87 kPa and then restoring to ordinary pressure was subsequently repeated 4 times, and the element was then allowed to stand at ordinary pressure for 15 minutes. The pressure was again reduced from ordinary pressure to −91 kPa, and then restored to ordinary pressure. The procedure of pressure reduction and restoration to ordinary pressure in the same manner was repeated a total of 7 times (pressure reduction from ordinary pressure to −95, −96, −97, −81, −97, −97 and −97 kPa, respectively). The non-aqueous electrolyte solution 35 was impregnated into the electrode laminate body of the non-aqueous lithium power storage element by this procedure.

Next, the external body housing the electrode laminate body impregnated with the non-aqueous electrolyte solution 35 was placed in a pressure-reducing sealing machine, and with pressure reduction to −95 kPa, it was sealed for 10 seconds at 180° C. at a pressure of 0.1 MPa to seal the aluminum laminate package material and obtain a non-aqueous lithium power storage element (lithium ion capacitor).

[Lithium Doping]

The obtained non-aqueous lithium power storage element was subjected to initial charging by constant-current charge using a charge-discharge apparatus (TOSCAT-3100U) by Toyo System Co., Ltd., in an environment of 25° C. with a current value of 50 mA until reaching a voltage of 4.5 V, followed by constant-voltage charge at 4.5 V continued for 72 hours, for lithium doping of the negative electrode.

[Aging]

The lithium-doped non-aqueous lithium power storage element was subjected to constant-current discharge in an environment of 25° C. at 1.0 A until reaching a voltage of 3.0 V, and then constant-voltage discharge at 3.0 V for 1 hour, to adjust the voltage to 3.0 V. The non-aqueous lithium power storage element was then stored for 60 hours in a thermostatic bath at 60° C. for aging.

[Degassing]

A portion of the aluminum laminate package material of the aged non-aqueous lithium power storage element was unsealed in a dry air environment with a temperature of 25° C. and a dew point of −40° C. Next, the non-aqueous lithium power storage element of which a portion of the aluminum laminate package material had been opened was placed in a pressure reduction chamber, and a procedure of using a diaphragm pump by KNF Co. (N816.3KT.45.18) for pressure reduction over a period of 3 minutes from ordinary pressure to −80 kPa, followed by restoration to ordinary pressure over a period of 3 minutes, was repeated a total of 3 times. The non-aqueous lithium power storage element was placed in a pressure-reducing sealing machine, and after pressure reduction to −90 kPa, it was sealed at a temperature of 200° C. for 10 seconds at a pressure of 0.1 MPa to seal (reseal) the aluminum laminate package material.

The non-aqueous lithium power storage element was evaluated by the methods described above.

[Measurement of Discharge Capacity Q at Vmax=3.8 V, Vmin=2.2 V]

The discharge capacity Q of the power storage element was measured with Vmax=3.8 V, Vmin=2.2 V. The obtained non-aqueous lithium power storage element was subjected to constant-current charge using a charge-discharge apparatus (5 V, 360 A) by Fujitsu Telecom Networks, Ltd. in a thermostatic bath set to 25° C., at a 20 C current value until reaching 3.8 V, and then constant-voltage charge was carried out with application of a constant voltage of 3.8 V for a total of 30 minutes. Next, constant-current discharge was carried out to 2.2 V at a current value of 2 C, to measure the discharge capacity Q.

The non-aqueous lithium power storage element of Example 1 had Vmax=3.8 V, and the discharge capacity Q at Vmin=2.2 V was 917 mAh.

[Calculation of Ordinary Temperature Discharge Internal Resistance Ra at Vmax=3.8 V, Vmin=2.2 V]

The initial ordinary temperature discharge internal resistance Ra of the power storage element was measured with Vmax=3.8 V, Vmin=2.2 V. The obtained non-aqueous lithium power storage element was subjected to initial charge-discharge by the following procedure using a charge-discharge apparatus (5 V, 360 A) by Fujitsu Telecom Networks, Ltd., in a thermostatic bath set to 25° C.

First, constant-current charge was carried out at a current value of 20 C to 3.8 V, and then constant-voltage charge was carried out for 30 minutes in total with application of a constant voltage of 3.8 V. Constant-current discharge was then carried out to 2.2 V at a current value of 20 C, completing the initial charge-discharge procedure. From the discharge curve (time-voltage) obtained during constant-current discharge, with a voltage of $E_0$ at discharge time=0 seconds, obtained by extrapolating an approximate straight line from the voltage values at discharge time points of 1 second and 2 seconds, the ordinary temperature discharge internal resistance Ra was calculated from voltage drop $\Delta E = \Delta E = 3.8 - E_0$, and $R = \Delta E/(20\ C\ (\text{current value A}))$.

The ordinary temperature discharge internal resistance Ra after initial charge-discharge of the non-aqueous lithium power storage element of Example 1 was 1.97 mΩ.

[Calculation of Rb, and Calculation of Rb/Ra, after High-Temperature Storage Test]

The obtained non-aqueous lithium power storage element was subjected to a high-temperature storage test.

The obtained non-aqueous lithium power storage element was subjected to constant-current charge using a charge-discharge apparatus (5 V, 360 A) by Fujitsu Telecom Networks, Ltd. in a thermostatic bath set to 25° C., at a current value of 100 C until reaching 4.0 V, and then constant-voltage charge was carried out with application of a constant voltage of 4.0 V for a total of 10 minutes. The power storage element was then stored in an 85° C. environment, and every week it was removed out from the 85° C. environment, the cell voltage was charged to 4.0 V by the same charging procedure, and the cell was returned back to the 85° C. environment for continued storage. This procedure was repeated for 500 hours, as a high-temperature storage test for the non-aqueous power storage element. The ordinary temperature discharge internal resistance Rb after the high-temperature storage test was calculated in the same manner as [Calculation of ordinary temperature discharge internal resistance Ra at Vmax=3.8 V, Vmin=2.2 V], for the power storage element after the high-temperature storage test. The Rb (Ω) was divided by the ordinary temperature discharge internal resistance Ra (Ω) at Vmax=3.8 V, Vmin=2.2 V before the high-temperature storage test, and when the Rb/Ra ratio was calculated, it was found to be 1.65.

[Calculation of Qb after High-Temperature Storage Test, and Calculation of Qb/Qa]

The obtained non-aqueous lithium power storage element was subjected to a high-temperature storage test.

The obtained non-aqueous lithium power storage element was subjected to constant-current charge using a charge-discharge apparatus (5 V, 360 A) by Fujitsu Telecom Networks, Ltd. in a thermostatic bath set to 25° C., at a current value of 100 C until reaching 4.0 V, and then constant-voltage charge was carried out with application of a constant voltage of 4.0 V for a total of 10 minutes. The power storage element was then stored in an 85° C. environment, and every week it was removed out from the 85° C. environment, the cell voltage was charged to 4.0 V by the same charging procedure, and the cell was returned back to the 85° C. environment for continued storage. This procedure was repeated for 500 hours, as a high-temperature storage test for the non-aqueous power storage element. The discharge capacity Qb after the high-temperature storage test was calculated in the same manner as [Calculation of discharge capacity Qa at Vmax=3.8 V, Vmin=2.2 V], for the power storage element after the high-temperature storage test. The Qb (mAh) was divided by the discharge capacity Qa (mAh)

at Vmax=3.8 V, Vmin=2.2 V before the high-temperature storage test, and when the Qb/Qa ratio was calculated, it was found to be 0.83.

[Confirmation of SEI (Lithium Oxalate) Formation]

The non-aqueous lithium power storage element was disassembled in an argon (Ar) box set in a room at 23° C. and controlled to a dew point of no higher than −90° C. and an oxygen concentration of no greater than 1 ppm, and the negative electrode was removed. The negative electrode was rinsed with a dimethyl carbonate (DMC) solution. The negative electrode active material layer surface of the negative electrode was subjected to surface analysis without atmospheric exposure, using an X-ray photoelectron spectroscopy (XPS) (Versa Probe II by Ulvac-Phi, Inc.), under the following conditions.

Excitation source: monochromatized AlKα
X-ray beam diameter: 100 μm φ (25 W, 15 kV)
Path energy: narrow scan, 46.95 eV
Charge neutralization: On
Number of sweeps: 10 narrow scans
Energy step: narrow scan, 0.25 eV
Lithium oxalate formation was confirmed by a peak P1 in the range of 289 eV to 290 eV (carbon peak).

[Confirmation of SEI (Lithium Oxalate) Formation Amount]

In XPS of the negative electrode active material layer, the ratio I1/I2, of the intensity I1 of the peak P1 observed in the range of 289 eV to 290 eV and the intensity I2 of the peak P2 observed in the range of 284 eV to 285 eV, was 0.17.

[Confirmation of Al Corrosion]

The obtained non-aqueous lithium power storage element was subjected to a high-temperature storage test.

The obtained non-aqueous lithium power storage element was subjected to constant-current charge using a charge-discharge apparatus (5 V, 360 A) by Fujitsu Telecom Networks, Ltd. in a thermostatic bath set to 25° C., at a current value of 100 C until reaching 4.0 V, and then constant-voltage charge was carried out with application of a constant voltage of 4.0 V for a total of 10 minutes. The power storage element was then stored in an 85° C. environment, and every week it was removed out from the 85° C. environment, the cell voltage was charged to 4.0 V by the same charging procedure, and the cell was returned back to the 85° C. environment for continued storage. This procedure was repeated for 500 hours, as a high-temperature storage test for the non-aqueous power storage element. The power storage element after the high-temperature storage test was disassembled in an Ar box set in a room at 23° C. and controlled to a dew point of no higher than −90° C. and an oxygen concentration of no greater than 1 ppm, and the surface of the positive electrode current collector was visually confirmed. As a result, the characteristic blackening of Al corrosion was not found on the positive electrode current collector surface, and it was judged to have no Al corrosion.

Examples 49 to 67 and Comparative Examples 19 to 27

Non-aqueous lithium power storage elements were produced and evaluated in the same manner as Example 48, except for using the positive electrode precursors, negative electrodes and non-aqueous electrolyte solutions listed in Tables 14 to 17.

The evaluation results for the obtained non-aqueous lithium power storage elements are shown in Tables 14 to 17.

TABLE 14

| | Positive electrode precursor type | Negative electrode type | Non-aqueous electrolyte solution type | XPS of negative electrode active material layer surface | | Discharge capacity and internal resistance | | | | | | |
|---|---|---|---|---|---|---|---|---|---|---|---|---|
| | | | | | | After initial charge-discharge | | After high voltage, high-temperature storage test | | | | |
| | | | | Presence of peak P1 | Intensity ratio of peak P1 and peak P2 (I1/I2) | Discharge capacity Qa (mAh) | Internal resistance Ra (mΩ) | Discharge capacity Qb (mAh) | Internal resistance Rb (mΩ) | Qb/Qa | Rb/Ra | Al corrosion |
| Example 48 | Positive electrode precursor 4 | Negative electrode 24 | Non-aqueous electrolyte solution 35 | Yes | 0.17 | 917.0 | 1.97 | 759.2 | 3.25 | 0.83 | 1.65 | No |
| Example 49 | Positive electrode precursor 5 | Negative electrode 24 | Non-aqueous electrolyte solution 35 | Yes | 0.26 | 815.8 | 1.99 | 650.8 | 3.70 | 0.80 | 1.86 | No |
| Example 50 | Positive electrode precursor 6 | Negative electrode 24 | Non-aqueous electrolyte solution 35 | Yes | 0.2 | 916.8 | 1.18 | 718.5 | 3.98 | 0.78 | 3.37 | No |
| Example 51 | Positive electrode precursor 7 | Negative electrode 24 | Non-aqueous electrolyte solution 35 | Yes | 0.16 | 809.4 | 1.19 | 635.4 | 3.35 | 0.79 | 2.82 | No |
| Example 52 | Positive electrode precursor 8 | Negative electrode 24 | Non-aqueous electrolyte solution 35 | Yes | 0.21 | 957.5 | 1.59 | 714.4 | 3.49 | 0.75 | 2.19 | No |
| Example 53 | Positive electrode precursor 9 | Negative electrode 24 | Non-aqueous electrolyte solution 35 | Yes | 0.13 | 931.7 | 1.8 | 712.3 | 3.73 | 0.76 | 2.07 | No |
| Comp. Example 19 | Positive electrode precursor 10 | Negative electrode 24 | Non-aqueous electrolyte solution 35 | Yes | 0.12 | 642.4 | 1.34 | 323.0 | 6.40 | 0.50 | 4.78 | No |

TABLE 15

| | Positive electrode precursor type | Negative electrode type | Non-aqueous electrolyte solution type | XPS of negative electrode active material layer surface | | Discharge capacity and internal resistance Al corrosion | | | | | | |
|---|---|---|---|---|---|---|---|---|---|---|---|---|
| | | | | Presence of peak P1 | Intensity ratio of peak P1 and peak P2 (I1/I2) | After initial charge-discharge | | After high voltage, high-temperature storage test | | | | Al corrosion |
| | | | | | | Discharge capacity Qa (mAh) | Internal resistance Ra (mΩ) | Discharge capacity Qb (mAh) | Internal resistance Rb (mΩ) | Qb/Qa | Rb/Ra | |
| Example 54 | Positive electrode precursor 4 | Negative electrode 25 | Non-aqueous electrolyte solution 35 | Yes | 0.15 | 927.3 | 1.62 | 747.1 | 3.37 | 0.81 | 2.08 | No |
| Example 55 | Positive electrode precursor 4 | Negative electrode 26 | Non-aqueous electrolyte solution 35 | Yes | 0.17 | 947.6 | 1.10 | 724.4 | 2.14 | 0.76 | 1.95 | No |
| Example 56 | Positive electrode precursor 4 | Negative electrode 27 | Non-aqueous electrolyte solution 35 | Yes | 0.29 | 949.2 | 1.74 | 745.9 | 2.72 | 0.79 | 1.56 | No |
| Example 57 | Positive electrode precursor 4 | Negative electrode 28 | Non-aqueous electrolyte solution 35 | Yes | 0.35 | 902.3 | 1.92 | 728.1 | 2.45 | 0.81 | 1.28 | No |
| Comp. Example 20 | Positive electrode precursor 4 | Negative electrode 29 | Non-aqueous electrolyte solution 35 | Yes | 0.09 | 906.1 | 1.38 | 552.3 | 8.46 | 0.61 | 6.13 | No |
| Comp. Example 21 | Positive electrode precursor 4 | Negative electrode 30 | Non-aqueous electrolyte solution 35 | Yes | 0.04 | 941.4 | 1.97 | 407.9 | 8.01 | 0.43 | 4.07 | No |
| Comp. Example 22 | Positive electrode precursor 4 | Negative electrode 31 | Non-aqueous electrolyte solution 35 | Yes | 0.08 | 940.2 | 1.84 | 450.0 | 8.08 | 0.48 | 4.39 | No |

TABLE 16

| | Positive electrode precursor type | Negative electrode type | Non-aqueous electrolyte solution type | XPS of negative electrode active material layer surface | | Discharge capacity and internal resistance | | | | | | |
|---|---|---|---|---|---|---|---|---|---|---|---|---|
| | | | | Presence of peak P1 | Intensity ratio of peak P1 and peak P2 (I1/I2) | After initial charge-discharge | | After high voltage, high-temperature storage test | | | | Al corrosion |
| | | | | | | Discharge capacity Qa (mAh) | Internal resistance Ra (mΩ) | Discharge capacity Qb (mAh) | Internal resistance Rb (mΩ) | Qb/Qa | Rb/Ra | |
| Example 58 | Positive electrode precursor 4 | Negative electrode 24 | Non-aqueous electrolyte solution 36 | Yes | 0.33 | 948.5 | 1.4 | 702.7 | 3.51 | 0.74 | 2.51 | No |
| Example 59 | Positive electrode precursor 4 | Negative electrode 24 | Non-aqueous electrolyte solution 37 | Yes | 0.11 | 907.9 | 1.02 | 719.4 | 3.02 | 0.79 | 2.96 | No |
| Example 60 | Positive electrode precursor 4 | Negative electrode 24 | Non-aqueous electrolyte solution 38 | Yes | 0.28 | 914.2 | 1.08 | 719.4 | 3.52 | 0.79 | 3.26 | No |
| Example 61 | Positive electrode precursor 4 | Negative electrode 24 | Non-aqueous electrolyte solution 39 | Yes | 0.24 | 948.4 | 1.77 | 719.3 | 3.55 | 0.76 | 2.01 | No |
| Example 62 | Positive electrode precursor 4 | Negative electrode 24 | Non-aqueous electrolyte solution 40 | Yes | 0.15 | 942.5 | 1.06 | 710.3 | 3.00 | 0.75 | 2.83 | No |
| Comp. Example 23 | Positive electrode precursor 4 | Negative electrode 24 | Non-aqueous electrolyte solution 41 | Yes | 0.34 | 928.9 | 3.39 | 712.8 | 5.55 | 0.77 | 1.64 | No |
| Comp. Example 24 | Positive electrode precursor 4 | Negative electrode 24 | Non-aqueous electrolyte solution 42 | No | 0.05 | 925.4 | 1.54 | 411.3 | 8.55 | 0.44 | 5.55 | No |

TABLE 17

| | Positive electrode precursor type | Negative electrode type | Non-aqueous electrolyte solution type | XPS of negative electrode active material layer surface — Presence of peak P1 | XPS of negative electrode active material layer surface — Intensity ratio of peak P1 and peak P2 (I1/I2) | After initial charge-discharge — Discharge capacity Qa (mAh) | After initial charge-discharge — Internal resistance Ra (mΩ) | After high voltage, high-temperature storage test — Discharge capacity Qb (mAh) | After high voltage, high-temperature storage test — Internal resistance Rb (mΩ) | Qb/Qa | Rb/Ra | Al corrosion |
|---|---|---|---|---|---|---|---|---|---|---|---|---|
| Example 63 | Positive electrode precursor 4 | Negative electrode 24 | Non-aqueous electrolyte solution 43 | Yes | 0.12 | 943.1 | 1.9 | 734.2 | 3.15 | 0.78 | 1.66 | No |
| Example 64 | Positive electrode precursor 4 | Negative electrode 24 | Non-aqueous electrolyte solution 44 | Yes | 0.19 | 901.4 | 1.01 | 744.3 | 3.03 | 0.83 | 3.00 | No |
| Example 65 | Positive electrode precursor 4 | Negative electrode 24 | Non-aqueous electrolyte solution 45 | Yes | 0.15 | 934.0 | 1.24 | 659.5 | 3.56 | 0.71 | 2.87 | No |
| Example 66 | Positive electrode precursor 4 | Negative electrode 24 | Non-aqueous electrolyte solution 46 | Yes | 0.15 | 959.1 | 1.20 | 740.0 | 3.53 | 0.77 | 2.94 | No |
| Example 67 | Positive electrode precursor 4 | Negative electrode 24 | Non-aqueous electrolyte solution 47 | Yes | 0.22 | 907.1 | 1.31 | 715.4 | 3.82 | 0.79 | 2.92 | No |
| Comp. Example 25 | Positive electrode precursor 4 | Negative electrode 24 | Non-aqueous electrolyte solution 48 | Yes | 0.15 | 950.3 | 5.23 | 756.7 | 11.71 | 0.80 | 2.24 | Yes |
| Comp. Example 26 | Positive electrode precursor 4 | Negative electrode 24 | Non-aqueous electrolyte solution 49 | Yes | 0.25 | 912.9 | 4.03 | 445.5 | 8.12 | 0.49 | 2.01 | No |
| Comp. Example 27 | Positive electrode precursor 4 | Negative electrode 24 | Non-aqueous electrolyte solution 50 | No | 0.06 | 936.5 | 1.04 | 327.2 | 9.99 | 0.35 | 9.61 | No |

These Examples confirmed that the non-aqueous lithium power storage element of the invention is a non-aqueous lithium power storage element exhibiting high capacitance, and with an excellent initial output characteristic and excellent high temperature storage durability. In particular, since the discharge capacity residue rate Qb/Qa was 0.70 or greater after high temperature storage in an environment of 85° C. and 4.0 V, the high temperature durability was demonstrated to be excellent.

Examples 68 to 84 and Comparative Examples 28 to 42

Preparation of Positive Electrode Active Material

Crushed coconut shell carbide was placed in a small carbonizing furnace and carbonized at 500° C. for 3 hours in a nitrogen atmosphere to obtain a carbide. The obtained carbide was placed in an activating furnace, water vapor in a heated state using a preheating furnace was introduced into the activating furnace at 1 kg/h, and the temperature was increased to 900° C. over 8 hours for activation. The activated carbide was removed and cooled in a nitrogen atmosphere to obtain activated carbon. The obtained activated carbon was flow-rinsed for 10 hours, drained, and dried for 10 hours in an electrodesiccator held at 115° C., and then it was pulverized for 1 hour with a ball mill to obtain active carbon 5.

A laser diffraction particle size distribution analyzer (SALD-2000J) by Shimadzu Corp. was used to measure the mean particle size of the active carbon 5, which was found to be 5.5 μm. Also, a pore distribution measuring device (AUTOSORB-1 AS-1-MP) by Yuasa-Ionics, Inc. was used to measure the pore distribution of the active carbon 1. As a result, the BET specific surface area was 2,360 m$^2$/g, the mesopore volume ($V_1$) was 0.52 cc/g, the micropore volume ($V_2$) was 0.88 cc/g, and $V_1/V_2$=0.59.

Preparation of Carbon Nanotube Dispersion

A planetary ball mill was used to mix and disperse 8.0 parts by mass of commercially available multilayer carbon nanotubes (CNT) (mean fiber diameter: 40 nm, mean fiber length: 50 μm), 1.0 parts by mass of carboxymethyl cellulose (CMC) as a dispersing agent 1, 91.0 parts by mass of distilled water, and 10 ppm iron atom equivalent of $Fe_2O_3$, with respect to the total mass of CNT and CMC, for 120 minutes at a speed of 100 rpm, to prepare a carbon nanotube dispersion (CNT dispersion).

Positive Electrode Precursor Production Example 10

After mixing 53.0 parts by mass of active carbon 5 as a positive electrode active material, 100 parts by mass of the aforementioned carbon nanotube dispersion (corresponding to 8.0 parts by mass of carbon nanotubes and 1.0 parts by mass of carboxymethyl cellulose), 30.0 parts by mass of lithium carbonate as an alkali metal compound, 3.0 parts by mass of acetylene black (AB) as a conductive filler, 1.5 parts by mass of PVP (polyvinylpyrrolidone) as dispersing agent 2, 3.5 parts by mass of acrylic latex (LTX) as a binder, and distilled water to a solid mass ratio of 26.5%, the mixture was dispersed for 10 minutes at a rotational speed of 2,000 rpm using an "Awatori Rentaro®" rotating/revolving mixer by Thinky, Inc., to obtain a positive electrode coating solution.

The viscosity (ηb) and TI value of the obtained positive electrode coating solution were measured using a TVE-35H E-type viscometer by Toki Sangyo Co., Ltd. As a result, the viscosity (ηb) was 1,650 mPa·s and the TI value was 4.5. The degree of dispersion of the obtained positive electrode coating solution was measured using a fineness gauge by Yoshimitsu Seiki Co. As a result, the granularity was 20 μm.

A doctor blade was used to coat the positive electrode coating solution onto one side of a 15 μm-thick aluminum foil which was then dried for 10 minutes on a hot plate heated to 50° C., after which a roll press was used for pressing under conditions with a pressure of 6 kN/cm and a pressing section surface temperature of 25° C., to obtain a positive electrode precursor 10.

When the overall thickness of the obtained positive electrode precursor 10 was measured at 10 arbitrary locations using a Linear Gauge Sensor GS-551 by Ono Sokki Co., Ltd., and the film thickness of the positive electrode active material layer was determined by subtracting the thickness of the aluminum foil from the average thickness, the film thickness of the positive electrode active material layer of the positive electrode precursor 10 was found to be 60 μm.

Positive Electrode Precursor Production Examples 11 to 30, 32, 34 and 36

Carbon nanotube dispersions (CNT dispersions) were prepared in the same manner as <Positive electrode precursor Production Example 10>, except that the types and amounts of the components were as shown in Table 18.

The CNT dispersions were each used to produce positive electrode precursors 11 to 30, 32, 34 and 36 in the same manner as <Positive electrode precursor Production Example 5>, except that the types and amounts of the components were as listed in Table 19.

Positive Electrode Precursor Production Example 31

After mixing 53.0 parts by mass of active carbon 5 as a positive electrode active material, 8.0 parts by mass of the aforementioned multilayer carbon nanotubes (mean fiber diameter: 40 nm, mean fiber length: 50 μm), 1.5 parts by mass of carboxymethyl cellulose (CMC) as dispersing agent 1, 30.0 parts by mass of lithium carbonate as an alkali metal compound, 3.0 parts by mass of acetylene black (AB) as a conductive filler, 4.5 parts by mass of acrylic latex (LTX) as a binder, and 20 ppm of $Fe_2O_3$ with respect to the total mass of the components, with distilled water added to a solid mass ratio of 26.5%, the mixture was dispersed for 10 minutes at a rotational speed of 2,000 rpm using an "Awatori Rentaro®" rotating/revolving mixer by Thinky, Inc., to obtain a positive electrode coating solution.

The viscosity (ηb) and TI value of the obtained positive electrode coating solution were measured using a TVE-35H E-type viscometer by Toki Sangyo Co., Ltd. As a result, the viscosity (ηb) was 780 mPa·s and the TI value was 7.5. The degree of dispersion of the obtained positive electrode coating solution was measured using a fineness gauge by Yoshimitsu Seiki Co. As a result, the granularity was 35 μm.

A doctor blade was used to coat the positive electrode coating solution onto one side of a 15 μm-thick aluminum foil which was then dried for 10 minutes on a hot plate heated to 50° C., after which a roll press was used for pressing under conditions with a pressure of 6 kN/cm and a pressing section surface temperature of 25° C., to obtain a positive electrode precursor 31.

When the overall thickness of the obtained positive electrode precursor 31 was measured at 10 arbitrary locations using a Linear Gauge Sensor GS-551 by Ono Sokki Co., Ltd., and the film thickness of the positive electrode active material layer was determined by subtracting the thickness of the aluminum foil from the average thickness, the film thickness of the positive electrode active material layer of the positive electrode precursor 31 was found to be 61 μm.

Positive Electrode Precursor Production Examples 33, 35 and 37

Positive electrode precursors 33, 35 and 37 were produced in the same manner as <Positive electrode precursor Production Example 31>, except that the types and amounts of the components were as listed in Table 19.

TABLE 18

| | CNT physical properties | | CNT dispersion | | | | | |
|---|---|---|---|---|---|---|---|---|
| | Mean | Mean | CNT | Dispersing agent 1 | | Metal compound | | Amount added |
| Positive electrode precursor type | fiber diameter (nm) | fiber length (μm) | Amount (parts by mass) | Type | Amount (parts by mass) | Type | Metal atom concentration (ppm) | to coating solution (parts by mass) |
| Positive electrode precursor 10 | 40 | 5 | 8 | CMC | 1 | $Fe_2O_3$ | 20 | 100 |
| Positive electrode precursor 11 | 10 | 4.5 | 5 | CMC | 1 | $Fe_2O_3$ | 10 | 200 |
| Positive electrode precursor 12 | 2 | 3 | 3 | CMC | 1 | $Fe_2O_3$ | 5 | 400 |
| Positive electrode precursor 13 | 95 | 6 | 11 | CMC | 1 | $Fe_2O_3$ | 20 | 100 |
| Positive electrode precursor 14 | 40 | 5 | 8 | CMC | 1 | $Fe_2O_3$ | 20 | 200 |
| Positive electrode precursor 15 | 40 | 5 | 8 | CMC | 1 | $Fe_2O_3$ | 13.3 | 300 |
| Positive electrode precursor 16 | 40 | 5 | 8 | CMC | 1 | $Fe_2O_3$ | 20 | 100 |
| Positive electrode precursor 17 | 40 | 5 | 8 | CMC | 1 | $Fe_2O_3$ | 2 | 100 |
| Positive electrode precursor 18 | 40 | 5 | 8 | CMC | 1 | $Fe_2O_3$ | 475 | 100 |
| Positive electrode precursor 19 | 40 | 5 | 8 | CMC | 1 | NiO | 10 | 100 |
| Positive electrode precursor 20 | 40 | 5 | 8 | CMC | 1 | $Fe_2O_3$ | 20 | 100 |
| Positive electrode precursor 21 | 40 | 5 | 8 | CMC | 1 | $Fe_2O_3$ | 24.6 | 81.3 |
| Positive electrode precursor 22 | 40 | 5 | 8 | CMC | 1 | $Fe_2O_3$ | 5 | 400 |
| Positive electrode precursor 23 | 40 | 5 | 8 | CMC | 1 | $Fe_2O_3$ | 5 | 400 |
| Positive electrode precursor 24 | 40 | 5 | 8 | CMC | 1 | $Fe_2O_3$ | 5 | 400 |
| Positive electrode precursor 25 | 40 | 5 | 8 | CMC | 1 | — | — | 400 |

TABLE 18-continued

| | CNT physical properties | | CNT dispersion | | | | | |
|---|---|---|---|---|---|---|---|---|
| | Mean | Mean | CNT | Dispersing agent 1 | | Metal compound | | Amount added |
| Positive electrode precursor type | fiber diameter (nm) | fiber length (μm) | Amount (parts by mass) | Type | Amount (parts by mass) | Type | Metal atom concentration (ppm) | to coating solution (parts by mass) |
| Positive electrode precursor 26 | 40 | 5 | 8 | CMC | 1 | $Fe_2O_3$ | 132.5 | 400 |
| Positive electrode precursor 27 | 40 | 5 | 8 | CMC | 1 | — | — | 400 |
| Positive electrode precursor 28 | 40 | 5 | 8 | CMC | 1 | $Fe_2O_3$ | 132.5 | 400 |
| Positive electrode precursor 29 | 1 | 3 | 8 | CMC | 1 | $Fe_2O_3$ | 20 | 100 |
| Positive electrode precursor 30 | 120 | 6.5 | 8 | CMC | 1 | $Fe_2O_3$ | 20 | 100 |
| Positive electrode precursor 31 | 40 | 5 | — | — | — | — | — | — |
| Positive electrode precursor 32 | 40 | 5 | 8 | CMC | 1 | $Fe_2O_3$ | 20 | 100 |
| Positive electrode precursor 33 | 40 | 5 | — | — | — | — | — | — |
| Positive electrode precursor 34 | 40 | 5 | 8 | CMC | 1 | $Fe_2O_3$ | 20 | 100 |
| Positive electrode precursor 35 | 40 | 5 | — | — | — | — | — | — |
| Positive electrode precursor 36 | 40 | 5 | 8 | CMC | 1 | $Fe_2O_3$ | 18 | 111 |
| Positive electrode precursor 37 | — | — | — | — | — | — | — | — |

TABLE 19

Composition of positive electrode active material layer of positive electrode precursor

| | Positive electrode active material | | | Alkali metal compound | | Con-ductive filler AB | Dis-persing agent 1 CMC | Dispersing agent 2 PVP | Binder | Metal oxide | |
|---|---|---|---|---|---|---|---|---|---|---|---|
| Positive electrode precursor type | Active carbon 5 (parts by mass) | $LiFePO_4$ (parts by mass) | CNT (parts by mass) | Type | Amount (parts by mass) | (parts by mass) | (parts by mass) | (parts by mass) | LTX (parts by mass) | Type | Metal atom concentration (ppm) |
| Positive electrode precursor 10 | 53 | — | 8 | $Li_2CO_3$ | 30 | 3 | 1 | 1.5 | 3.5 | $Fe_2O_3$ | 20 |
| Positive electrode precursor 11 | 51 | — | 10 | $Li_2CO_3$ | 29 | 3 | 2 | 1.5 | 3.5 | $Fe_2O_3$ | 20 |
| Positive electrode precursor 12 | 49 | — | 12 | $Li_2CO_3$ | 28 | 1.5 | 4 | 2.5 | 3 | $Fe_2O_3$ | 20 |
| Positive electrode precursor 13 | 53 | — | 11 | $Li_2CO_3$ | 29 | 1.5 | 1 | 1.5 | 3 | $Fe_2O_3$ | 20 |
| Positive electrode precursor 14 | 49 | — | 16 | $Li_2CO_3$ | 25 | 3 | 2 | 1.5 | 3.5 | $Fe_2O_3$ | 40 |
| Positive electrode precursor 15 | 49 | — | 24 | $Li_2CO_3$ | 16 | 3 | 3 | 1.5 | 3.5 | $Fe_2O_3$ | 40 |
| Positive electrode precursor 16 | 42.5 | — | 8 | $Li_2CO_3$ | 44 | 1.5 | 1 | 1 | 2 | $Fe_2O_3$ | 20 |
| Positive electrode precursor 17 | 53 | — | 8 | $Li_2CO_3$ | 30 | 3 | 1 | 1.5 | 3.5 | $Fe_2O_3$ | 2 |
| Positive electrode precursor 18 | 53 | — | 8 | $Li_2CO_3$ | 30 | 3 | 1 | 1.5 | 3.5 | $Fe_2O_3$ | 475 |
| Positive electrode precursor 19 | 53 | — | 8 | $Li_2CO_3$ | 30 | 3 | 1 | 1.5 | 3.5 | NiO | 10 |
| Positive electrode precursor 20 | 54.5 | — | 8 | $Li_2CO_3$ | 32 | 3 | 1 | 1.5 | — | $Fe_2O_3$ | 20 |
| Positive electrode precursor 21 | 53 | — | 6.5 | $Li_2CO_3$ | 31.2 | 3 | 0.8 | 1.5 | 4 | $Fe_2O_3$ | 20 |
| Positive electrode precursor 22 | 26 | — | 32 | $Li_2CO_3$ | 30 | 3 | 4 | 1.5 | 3.5 | $Fe_2O_3$ | 20 |
| Positive electrode precursor 23 | 42 | — | 32 | $Li_2CO_3$ | 14 | 3 | 4 | 1.5 | 3.5 | $Fe_2O_3$ | 20 |
| Positive electrode precursor 24 | 10 | — | 32 | $Li_2CO_3$ | 46 | 3 | 4 | 1.5 | 3.5 | $Fe_2O_3$ | 20 |
| Positive electrode precursor 25 | 42 | — | 32 | $Li_2CO_3$ | 14 | 3 | 4 | 1.5 | 3.5 | — | — |
| Positive electrode precursor 26 | 42 | — | 32 | $Li_2CO_3$ | 14 | 3 | 4 | 1.5 | 3.5 | $Fe_2O_3$ | 530 |
| Positive electrode precursor 27 | 10 | — | 32 | $Li_2CO_3$ | 46 | 3 | 4 | 1.5 | 3.5 | — | — |
| Positive electrode precursor 28 | 10 | — | 32 | $Li_2CO_3$ | 46 | 3 | 4 | 1.5 | 3.5 | $Fe_2O_3$ | 530 |
| Positive electrode precursor 29 | 53 | — | 8 | $Li_2CO_3$ | 30 | 3 | 1 | 1.5 | 3.5 | $Fe_2O_3$ | 20 |
| Positive electrode precursor 30 | 53 | — | 8 | $Li_2CO_3$ | 30 | 3 | 1 | 1.5 | 3.5 | $Fe_2O_3$ | 20 |

TABLE 19-continued

Composition of positive electrode active material layer of positive electrode precursor

| Positive electrode precursor type | Positive electrode active material | | CNT (parts by mass) | Alkali metal compound | | Con-ductive filler AB (parts by mass) | Dis-persing agent 1 CMC (parts by mass) | Dispersing agent 2 PVP (parts by mass) | Binder LTX (parts by mass) | Metal oxide | |
|---|---|---|---|---|---|---|---|---|---|---|---|
| | Active carbon 5 (parts by mass) | LiFePO$_4$ (parts by mass) | | Type | Amount (parts by mass) | | | | | Metal Type | atom concen-tration (ppm) |
| Positive electrode precursor 31 | 53 | — | 8 | Li$_2$CO$_3$ | 30 | 3 | 1.5 | — | 4.5 | Fe$_2$O$_3$ | 20 |
| Positive electrode precursor 32 | 35 | 18 | 8 | Li$_2$CO$_3$ | 30 | 3 | 1 | 1.5 | 3.5 | Fe$_2$O$_3$ | 20 |
| Positive electrode precursor 33 | 35 | 18 | 8 | Li$_2$CO$_3$ | 30 | 3 | 1.5 | — | 4.5 | Fe$_2$O$_3$ | 20 |
| Positive electrode precursor 34 | 53 | | 8 | Na$_2$CO$_3$ | 30 | 3 | 1 | 1.5 | 3.5 | Fe$_2$O$_3$ | 20 |
| Positive electrode precursor 35 | 53 | | 8 | Na$_2$CO$_3$ | 30 | 3 | 1.5 | 0 | 4.5 | Fe$_2$O$_3$ | 20 |
| Positive electrode precursor 36 | 58.1 | | 8.9 | Li$_2$CO$_3$ | 28.5 | 1.7 | 1.1 | 1.7 | — | Fe$_2$O$_3$ | 20 |
| Positive electrode precursor 37 | 63 | | — | Li$_2$CO$_3$ | 28.5 | 1.7 | 1.1 | 1.7 | 4 | Fe$_2$O$_3$ | 20 |

Negative Electrode Production Example 32

There were mixed 84.0 parts by mass of artificial graphite with a mean particle size of 4.5 μm, 10.0 parts by mass of acetylene black (AB), 3.0 parts by mass of carboxymethyl cellulose (CMC) and 3.0 parts by mass of styrene-butadiene rubber (SBR), with distilled water, to obtain a mixture with a solid mass ratio of 36.5 mass %.

The mixture was dispersed for 10 minutes at a rotational speed of 2,000 rpm using an "Awatori Rentaro®" rotating/revolving mixer by Thinky, Inc., to obtain a negative electrode coating solution.

The viscosity (ηb) and TI value of the obtained negative electrode coating solution were measured using a TVE-35H E-type viscometer by Toki Sangyo Co., Ltd. As a result, the viscosity (ηb) was 1,840 mPa·s and the TI value was 3.1.

The negative electrode coating solution was applied onto one side of an electrolytic copper foil with a thickness of 8 μm using a doctor blade, and dried for 10 minutes on a hot plate heated to 50° C. A roll press was then used for pressing under conditions with a pressure of 5 kN/cm and a pressing section surface temperature of 25° C., to produce a negative electrode 32.

A "Linear Gauge Sensor GS-551" film thickness meter by Ono Sokki Co., Ltd. was used to measure the total thickness of the negative electrode 1 at 10 arbitrary locations, and upon calculating the film thickness of the negative electrode active material layer from the average value minus the thickness of the electrolytic copper foil, the film thickness of the negative electrode active material layer of negative electrode 32 was found to be 30 μm.

Negative Electrode Production Example 33

There were mixed 96.0 parts by mass of artificial graphite with a mean particle size of 4.5 μm, 100 parts by mass of the aforementioned carbon nanotube dispersion (corresponding to 8.0 parts by mass of carbon nanotubes and 1.0 parts by mass of carboxymethyl cellulose), 3.0 parts by mass of acetylene black (AB) and 2.0 parts by mass of carboxymethyl cellulose, with distilled water, to obtain a mixture with a solid mass ratio of 36.5 mass %.

The mixture was dispersed for 10 minutes at a rotational speed of 2,000 rpm using an "Awatori Rentaro®" rotating/revolving mixer by Thinky, Inc., to obtain a negative electrode coating solution.

Negative electrode 33 was produced in the same manner as Negative electrode Production Example 32, except that this negative electrode coating solution was used.

Electrolyte Solution Preparation Example 51

A non-aqueous electrolyte solution 51 was obtained using a mixed solvent of ethylene carbonate (EC):ethylmethyl carbonate (EMC)=33:67 (volume ratio) as the organic solvent, and dissolving an electrolyte salt so that the concentration ratio of LiPF$_6$ and LiFSI was 1:1 and the total concentration was 1.2 mol/L.

Electrolyte Solution Preparation Example 52

A non-aqueous electrolyte solution 52 was obtained using a mixed solvent of ethylene carbonate (EC):ethylmethyl carbonate (EMC)=33:67 (volume ratio) as the organic solvent, and dissolving an electrolyte salt so that the concentration ratio of LiPF$_6$, LiFSI and LiBOB was 5:6:1 and the total concentration was 1.2 mol/L.

Example 68

<Production of Non-Aqueous Lithium Power Storage Element>

One obtained positive electrode precursor 10 was cut out, with the positive electrode active material layer at a size of 4.4 cm×9.4 cm. One negative electrode 32 was then cut out, with the negative electrode active material layer at a size of 4.5 cm×9.5 cm. One 4.7 cm×9.8 cm polyethylene separator (by Asahi Kasei Corp., thickness: 15 μm) was also prepared. These were laminated in the order: positive electrode precursor 10, separator, negative electrode 32, with the positive electrode active material layer and negative electrode active material layer facing each other across the separator, to obtain an electrode laminate body. A positive electrode terminal and negative electrode terminal were ultrasonically welded to the obtained electrode body and the stack was placed in an external body formed of an aluminum laminate package material, after which 3 sides including the electrode terminal section were sealed by heat sealing.

Approximately 2.5 g of the non-aqueous electrolyte solution 51 was injected into the external body housing the electrode laminate body, in a dry air environment at atmospheric pressure, a temperature of 25° C. and a dew point of no higher than −40° C. Next, the external body housing the electrode laminate body and non-aqueous electrolyte solution was placed in a pressure reduction chamber and the pressure was reduced from atmospheric pressure to −87 kPa, after which it was restored to atmospheric pressure and allowed to stand for 5 minutes. The step of reducing the pressure of the external body in the chamber from atmospheric pressure to −87 kPa and then restoring to atmospheric pressure was subsequently repeated 4 times, and then it was allowed to stand for 15 minutes at atmospheric pressure. The electrode laminate body was impregnated with the non-aqueous electrolyte solution 51 by this procedure.

Next, the electrode laminate body impregnated with the non-aqueous electrolyte solution 51 was placed in a pressure-reducing sealing machine, and with the pressure reduced to −95 kPa, the external body was sealed for 10 seconds at 180° C. at a pressure of 0.1 MPa to seal the aluminum laminate package material.

[Alkali Metal Doping Step]

The sealed electrode laminate body was subjected to initial charging by constant-current charge at a temperature of 40° C. and with a current value of 50 mA until reaching a voltage of 4.5 V, followed by constant-voltage charge at 4.5 V continued for 2 hours, for alkali metal doping of the negative electrode.

[Aging Step]

The alkali metal-doped electrode laminate body was removed from the dry box and subjected to constant-current discharge in an environment of 25° C. at 50 mA until reaching a voltage of 4.0 V, and then to constant-current discharge at 4.0 V for 1 hour, to adjust the voltage to 4.0 V. The electrode body was then stored for 12 hours in a thermostatic bath at 60° C.

[Degassing Step]

After aging, a portion of the external body was unsealed in a dry air environment with a temperature of 25° C. and a dew point of −40° C., and the electrode laminate body was removed. The removed electrode laminate body was then placed in a pressure reduction chamber, and a step of using a diaphragm pump for pressure reduction over a period of 3 minutes from atmospheric pressure to −80 kPa, followed by restoration to atmospheric pressure over a period of 3 minutes, was repeated a total of 3 times. Next, the electrode laminate body was returned to the external body, and after pressure reduction to −90 kPa using a pressure-reducing sealing machine, it was sealed at 200° C. for 10 seconds at a pressure of 0.1 MPa to seal the external body, to produce a non-aqueous lithium power storage element.

Several non-aqueous lithium power storage elements with the same construction were produced by this method.

<Evaluation of Non-Aqueous Lithium Power Storage Elements>

[Measurement of Electrostatic Capacitance Qa and Internal Resistance Ra]

When one of the obtained non-aqueous lithium power storage elements was used to measure the electrostatic capacitance Qa and internal resistance Ra as described above using a charge-discharge apparatus (5 V, 10 A) by Aska Electronic Co., Ltd. in a thermostatic bath set to 25° C., Qa was found to be 8.75 mAh and Ra was found to be 86.5 mΩ. These values are listed in Table 20 as the initial electrostatic capacitance Qa and initial internal resistance Ra.

[High Voltage, High-Temperature Storage Test]

Another of the obtained non-aqueous lithium power storage elements was subjected to a high voltage, high-temperature storage test by the method described above. The electrostatic capacitance Qb and internal resistance Rb were measured after the test, giving values of Qb=8.04 mAh, Rb=98.2 mΩ. These values are listed in Table 20, as electrostatic capacitance Qb after high voltage, high temperature storage and internal resistance Rb after high voltage, high temperature storage.

The changes in the electrostatic capacitance and internal resistance before and after the high voltage, high-temperature storage test were also calculated, and when used as an index of high voltage, high temperature storage resistance, both were shown to be satisfactory, with a change in electrostatic capacitance Qb/Qa of 0.92 and a change in resistance Rb/Ra of 1.14.

<Analysis of Positive Electrode Precursors and Positive Electrodes>

The positive electrode active material layers of each of the positive electrode precursors and positive electrodes were subjected to SEM analysis and XRD measurement, and the positive electrode active material layers of the positive electrodes were further analyzed by ICP-MS.

The positive electrode precursor used was a positive electrode precursor removed from the non-aqueous lithium power storage element immediately after assembly. The positive electrode used was a positive electrode removed from the power storage element after the voltage of the assembled non-aqueous lithium power storage element was adjusted to 3.5 V.

[SEM Image]

After opening a portion of the external body in the argon box, for the non-aqueous lithium power storage element with a positive electrode precursor or positive electrode, the electrode laminate body was removed, and the positive electrode precursor or positive electrode was used as a sample. The positive electrode precursor or positive electrode was cut to a size of 1 cm-square. The cut strip was rinsed twice with ethylmethyl carbonate and air-dried, and then carried out from the argon box. The cut strip was subsequently immersed for 24 hours in distilled water at 25° C., after which it was dried under reduced pressure for 12 hours under conditions of 80° C., −97 kPa.

The positive electrode active material layer of the dried cut strip was subjected to gold sputtering in a vacuum of 10 Pa, to coat a gold film with a thickness of several nm onto the surface. An SEM image was then taken of the positive electrode active material layer surface with atmospheric exposure, under the following conditions.

(SEM measuring conditions)

Measuring apparatus: S-4700 Field Emission Scanning Electron Microscope by Hitachi High-Technologies Corp.

Acceleration voltage: 1 kV

Emission current: 10 μA

Measurement magnification: 10,000×

Detector: Secondary electron detector

Electron beam incident angle: 90°

During the measurement, the luminance and contrast were adjusted so that no pixel in the SEM image reached the maximum luminance value in the mapping image and the average value of brightness was in the range of 40% to 60% of the maximum luminance value.

When the area ratio Z'1 of maximum inscribed circles with diameters of less than 100 nm in the bright field regions of the SEM image of the positive electrode active material layer of the positive electrode precursor was determined by the method described above, Z'1 was found to be 5.9%.

When the area ratio Z'2 in the bright field regions of the SEM image of the positive electrode active material layer of the positive electrode was determined by the method described above, Z'2 was found to be 7.7%.

[XRD (X-Ray Diffraction) Measurement]

The positive electrode precursor or positive electrode removed from the non-aqueous lithium power storage element as described above was cut to a size of 1 cm$^2$ (1 cm×1 cm) to prepare a sample for XRD.

The XRD sample was measured by XRD under the following conditions.

Device: Rigaku Ultima IV
Detector: D/teX Ultra
Tube: CuKα
Tube voltage: 40 kV
Tube current: 40 mA
Sampling interval: 0.01°/point
Scanning rate: 5°/min
Measuring angle range: 5 to 90°
Divergence slit (DS): 1°
Divergence length: 10 mm
Scattering slit (SS): Open
Receiving slit (RS): Open When the half-width of peak X1 having a peak top with 2θ in the range of 25.7° to 27.0° was examined in the XRD spectrum obtained for the positive electrode active material layer of the positive electrode precursor, the half-width was found to be 0.15°.

When the half-width of peak X2 having a peak top with 2θ in the range of 25.7° to 27.0° was examined in the XRD spectrum obtained for the positive electrode active material layer of the positive electrode, the half-width was found to be 0.14°.

[ICP-MS Analysis]

The positive electrode active material layer of the positive electrode removed from the non-aqueous lithium power storage element as described above was subjected to ICP-MS analysis to quantify the alkali metal compound content. A portion of the positive electrode active material layer was scraped off using a spatula, weighed, and acid-decomposed with aqua regalis, and then diluted with purified water to an acid concentration of about 2 mass %. An internal standard substance solution (10 µg/mL) containing yttrium element as an internal standard element was added to the diluted solution and used as a measuring sample.

The measuring sample was subjected to ICP-MS analysis, and the amount of alkali metal compound in the sample was quantified from a calibration curve drawn using a standard solution, and this was divided by the original sample mass to calculate the alkali metal compound concentration with respect to the total mass of the positive electrode active material layer, giving an alkali metal compound concentration of 3.5 mass %.

Examples 69 to 84 and Comparative Examples 28 to 42

Non-aqueous lithium power storage elements were produced and evaluated in the same manner as Example 68, except for using the negative electrodes, positive electrode precursors and non-aqueous electrolyte solutions listed in Table 20.

The evaluation results are shown in Table 20.

FIG. 7 to FIG. 12 show the SEM analysis results for the positive electrode active material layers of the positive electrode precursor 36 of Example 84 and the positive electrode precursor 37 of Comparative Example 42.

Figure 7:
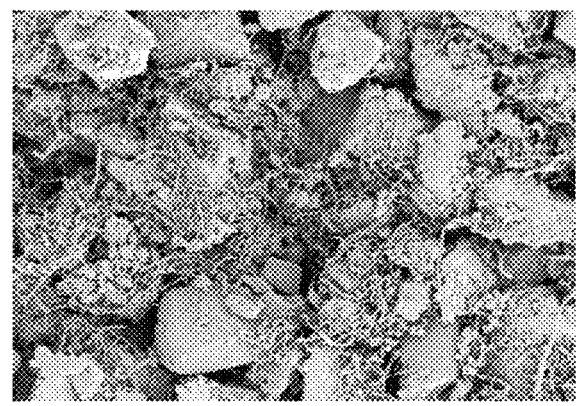
FIG. 7 is an SEM image of the positive electrode active material layer of the positive electrode precursor 36 obtained in Example 84.
Figure 8:
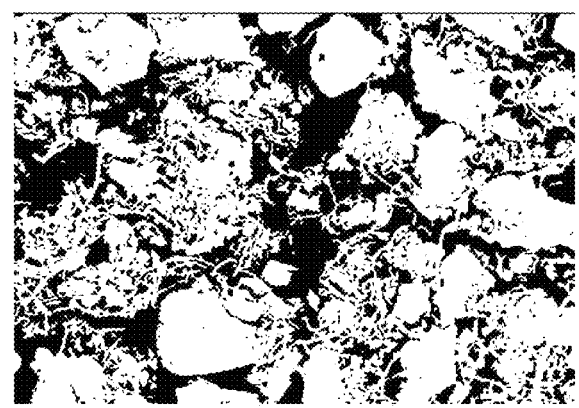
FIG. 8 is a binarized SEM image of FIG. 7.

FIG. 7 is an SEM image of the positive electrode active material layer of the positive electrode precursor 36 obtained in Example 84;

FIG. 8 is a binarized SEM image of FIG. 7; and

Figure 9:
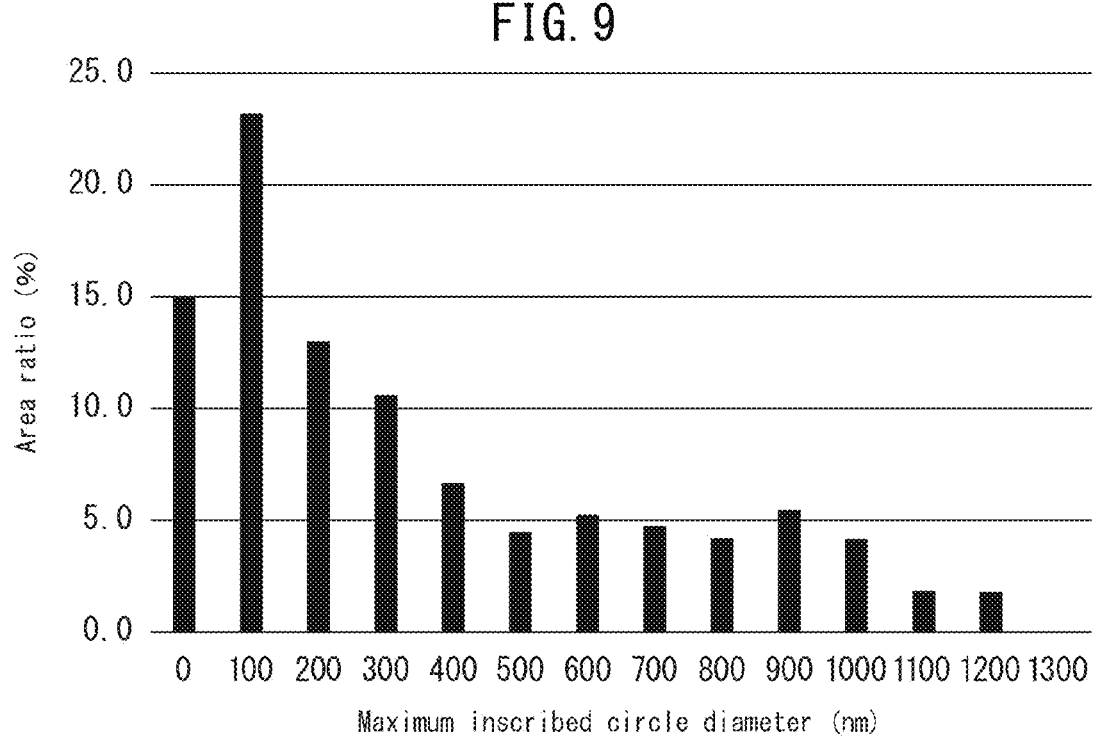
FIG. 9 is a frequency distribution graph for different diameters of maximum inscribed circles obtained from the binarized image of FIG. 8.

FIG. 9 is a frequency distribution graph for the maximum inscribed circle diameters obtained from the binarized image of FIG. 2.

Figure 10:
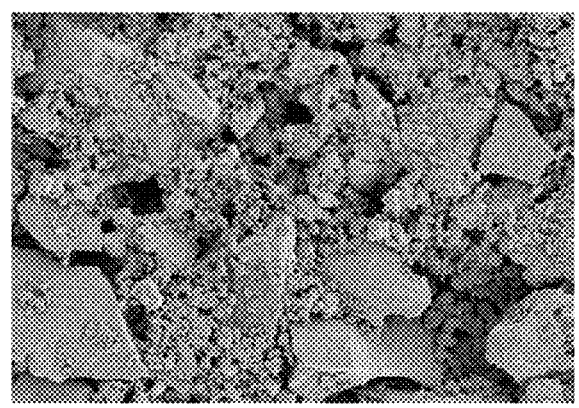
FIG. 10 is an SEM image of the positive electrode active material layer of the positive electrode precursor 37 obtained in Comparative Example 42.
Figure 11:
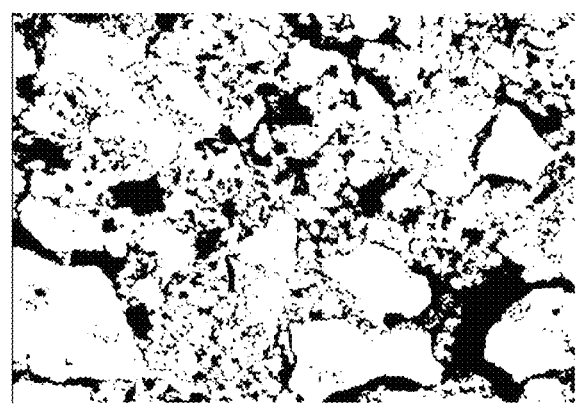
FIG. 11 is a binarized SEM image of FIG. 10.

FIG. 10 is an SEM image of the positive electrode active material layer of the positive electrode precursor 37 obtained in Comparative Example 42;

FIG. 11 is a binarized SEM image of FIG. 10; and

Figure 12:
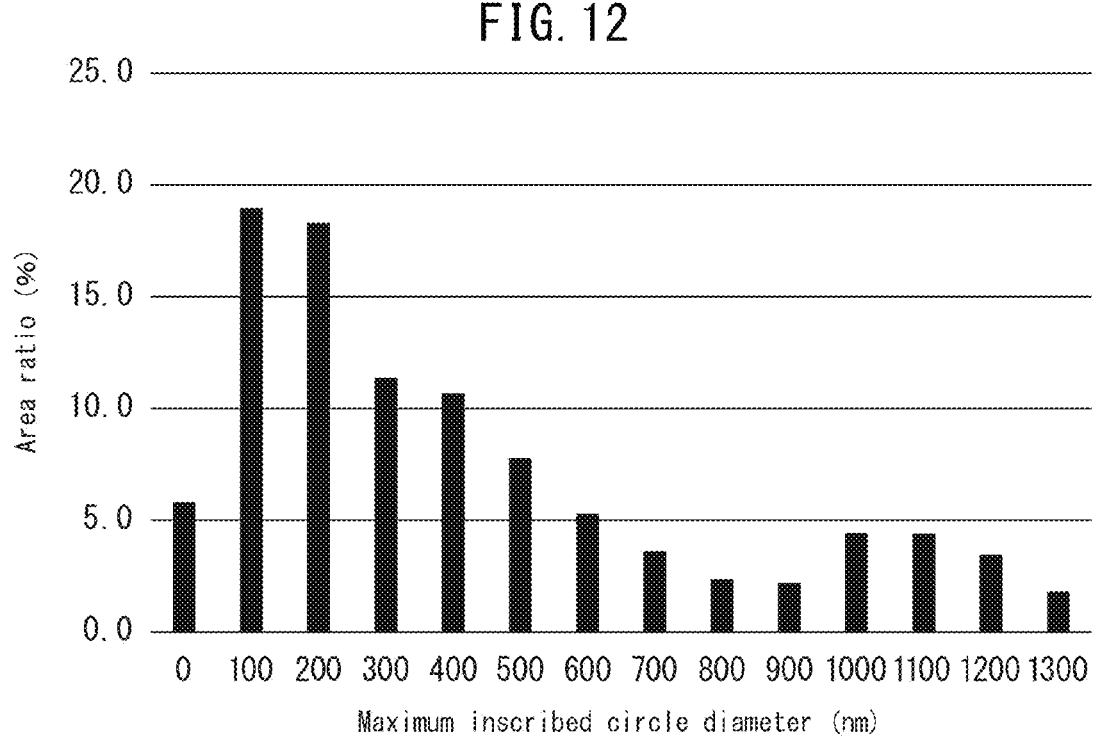
FIG. 12 is a frequency distribution graph for different diameters of maximum inscribed circles obtained from the binarized image of FIG. 11.

FIG. 12 is a frequency distribution graph for the maximum inscribed circle diameters obtained from the binarized image of FIG. 11.

TABLE 20

| | Construction of non-aqueous lithium power storage element | | | Evaluation of non-aqueous lithium power storage elements | | | | | |
|---|---|---|---|---|---|---|---|---|---|
| | | | | After initial charge-discharge | | After high voltage, high-temperature storage test | | Change in capacity Qb/Qa | Change in resistance Rb/Ra |
| | Positive electrode precursor type | Negative electrode type | Non-aqueous electrolyte solution type | Discharge capacity Qa (mAh) | Internal resistance Ra (mΩ) | Discharge capacity Qb (mAh) | Internal resistance Rb (mΩ) | | |
| Example 68 | Positive electrode precursor 10 | Negative electrode 32 | Non-aqueous electrolyte solution 51 | 8.75 | 86.5 | 8.04 | 98.2 | 0.92 | 1.14 |
| Example 69 | Positive electrode precursor 11 | Negative electrode 32 | Non-aqueous electrolyte solution 51 | 8.79 | 85.6 | 8.11 | 99 | 0.92 | 1.16 |
| Example 70 | Positive electrode precursor 12 | Negative electrode 32 | Non-aqueous electrolyte solution 51 | 8.65 | 84.6 | 7.95 | 98.5 | 0.92 | 1.16 |
| Example 71 | Positive electrode precursor 13 | Negative electrode 32 | Non-aqueous electrolyte solution 51 | 8.94 | 87 | 8.05 | 103 | 0.90 | 1.18 |
| Example 72 | Positive electrode precursor 14 | Negative electrode 32 | Non-aqueous electrolyte solution 51 | 8.51 | 83.5 | 7.8 | 97.7 | 0.92 | 1.17 |
| Example 73 | Positive electrode precursor 15 | Negative electrode 32 | Non-aqueous electrolyte solution 51 | 8.48 | 85 | 7.71 | 99.5 | 0.91 | 1.17 |
| Example 74 | Positive electrode precursor 16 | Negative electrode 32 | Non-aqueous electrolyte solution 51 | 8.69 | 85.9 | 7.72 | 99.7 | 0.89 | 1.16 |
| Example 75 | Positive electrode precursor 17 | Negative electrode 32 | Non-aqueous electrolyte solution 51 | 8.75 | 85.2 | 8.1 | 96.9 | 0.93 | 1.14 |
| Example 76 | Positive electrode precursor 18 | Negative electrode 32 | Non-aqueous electrolyte solution 51 | 8.96 | 85.8 | 7.74 | 102 | 0.86 | 1.19 |
| Example 77 | Positive electrode precursor 19 | Negative electrode 32 | Non-aqueous electrolyte solution 51 | 8.77 | 84.3 | 8 | 97.1 | 0.91 | 1.15 |
| Example 78 | Positive electrode precursor 20 | Negative electrode 32 | Non-aqueous electrolyte solution 51 | 9.06 | 77.8 | 8.2 | 90 | 0.91 | 1.16 |
| Comp. Example 28 | Positive electrode precursor 21 | Negative electrode 32 | Non-aqueous electrolyte solution 51 | 7.65 | 92.6 | 5.97 | 136.8 | 0.78 | 1.48 |
| Comp. Example 29 | Positive electrode precursor 22 | Negative electrode 32 | Non-aqueous electrolyte solution 51 | 6.34 | 88.4 | 5.02 | 119.8 | 0.79 | 1.36 |
| Comp. Example 30 | Positive electrode precursor 23 | Negative electrode 32 | Non-aqueous electrolyte solution 51 | 5.48 | 89 | 4.25 | 116 | 0.78 | 1.30 |
| Comp. Example 31 | Positive electrode precursor 24 | Negative electrode 32 | Non-aqueous electrolyte solution 51 | 3.48 | 88.3 | 2.87 | 118.8 | 0.82 | 1.35 |
| Comp. Example 32 | Positive electrode precursor 25 | Negative electrode 32 | Non-aqueous electrolyte solution 51 | 4.85 | 89.5 | 3.02 | 122 | 0.62 | 1.36 |
| Comp. Example 33 | Positive electrode precursor 26 | Negative electrode 32 | Non-aqueous electrolyte solution 51 | 5.58 | 88 | 2.55 | 128.8 | 0.46 | 1.46 |
| Comp. Example 34 | Positive electrode precursor 27 | Negative electrode 32 | Non-aqueous electrolyte solution 51 | 3.05 | 92.2 | 2.03 | 130.7 | 0.67 | 1.42 |
| Comp. Example 35 | Positive electrode precursor 28 | Negative electrode 32 | Non-aqueous electrolyte solution 51 | 3.54 | 91.5 | 1.44 | 139.7 | 0.41 | 1.53 |
| Comp. Example 36 | Positive electrode precursor 29 | Negative electrode 32 | Non-aqueous electrolyte solution 51 | 7.6 | 97.5 | 4.35 | 130.5 | 0.57 | 1.34 |
| Comp. Example 37 | Positive electrode precursor 30 | Negative electrode 32 | Non-aqueous electrolyte solution 51 | 7.76 | 98.8 | 4.62 | 138.6 | 0.60 | 1.40 |
| Comp. Example 38 | Positive electrode precursor 31 | Negative electrode 32 | Non-aqueous electrolyte solution 51 | 7.8 | 105.7 | 3.2 | 168.8 | 0.41 | 1.60 |
| Example 79 | Positive electrode precursor 32 | Negative electrode 32 | Non-aqueous electrolyte solution 51 | 11.5 | 85.5 | 10.12 | 97.8 | 0.88 | 1.14 |
| Comp. Example 39 | Positive electrode precursor 33 | Negative electrode 32 | Non-aqueous electrolyte solution 51 | 10.98 | 112 | 5.56 | 179.9 | 0.51 | 1.61 |
| Example 80 | Positive electrode precursor 10 | Negative electrode 33 | Non-aqueous electrolyte solution 51 | 8.86 | 68.8 | 8.47 | 74.5 | 0.96 | 1.08 |
| Example 81 | Positive electrode precursor 34 | Negative electrode 32 | Non-aqueous electrolyte solution 51 | 8.33 | 84.5 | 7.48 | 97.1 | 0.90 | 1.15 |
| Comp. Example 40 | Positive electrode precursor 35 | Negative electrode 32 | Non-aqueous electrolyte solution 51 | 7.63 | 107.8 | 3.5 | 175 | 0.46 | 1.62 |
| Example 82 | Positive electrode precursor 34 | Negative electrode 32 | Non-aqueous electrolyte solution 51 | 8.22 | 83.4 | 7.65 | 95.6 | 0.93 | 1.15 |
| Comp. Example 41 | Positive electrode precursor 35 | Negative electrode 32 | Non-aqueous electrolyte solution 51 | 7.54 | 107 | 3.42 | 182.2 | 0.45 | 1.70 |
| Example 83 | Positive electrode precursor 10 | Negative electrode 32 | Non-aqueous electrolyte solution 52 | 8.62 | 72.3 | 8.39 | 75.6 | 0.97 | 1.05 |
| Example 84 | Positive electrode precursor 36 | Negative electrode 32 | Non-aqueous electrolyte solution 51 | 8.85 | 76.7 | 8.17 | 88 | 0.92 | 1.15 |
| Comp. Example 42 | Positive electrode precursor 37 | Negative electrode 32 | Non-aqueous electrolyte solution 51 | 7.43 | 114.7 | 3.05 | 176.3 | 0.41 | 1.54 |

| Analysis results of positive electrode active material layer | |
|---|---|
| Positive electrode precursor | Positive electrode |
| Area ratio of | Area ratio of |

TABLE 20-continued

| | Construction of non-aqueous lithium power storage element | | | maximum inscribed circles with diameters of less than 100 nm Z1 (%) | Half-width of peak (X1) (°) | Alkali metal compound content (mass %) | maximum inscribed circles with diameters of less than 100 nm Z2 (%) | Half-width of peak X2 (°) |
|---|---|---|---|---|---|---|---|---|
| | Positive electrode precursor type | Negative electrode type | Non-aqueous electrolyte solution type | | | | | |
| Example 68 | Positive electrode precursor 10 | Negative electrode 32 | Non-aqueous electrolyte solution 51 | 5.9 | 0.15 | 3.5 | 7.7 | 0.14 |
| Example 69 | Positive electrode precursor 11 | Negative electrode 32 | Non-aqueous electrolyte solution 51 | 8.5 | 0.21 | 3.1 | 11.4 | 0.23 |
| Example 70 | Positive electrode precursor 12 | Negative electrode 32 | Non-aqueous electrolyte solution 51 | 13.4 | 0.25 | 2.9 | 17.6 | 0.27 |
| Example 71 | Positive electrode precursor 13 | Negative electrode 32 | Non-aqueous electrolyte solution 51 | 10.1 | 0.13 | 2.8 | 13.6 | 0.14 |
| Example 72 | Positive electrode precursor 14 | Negative electrode 32 | Non-aqueous electrolyte solution 51 | 19.1 | 0.32 | 2.6 | 26 | 0.3 |
| Example 73 | Positive electrode precursor 15 | Negative electrode 32 | Non-aqueous electrolyte solution 51 | 25.7 | 0.47 | 0.16 | 34 | 0.46 |
| Example 74 | Positive electrode precursor 16 | Negative electrode 32 | Non-aqueous electrolyte solution 51 | 6.1 | 0.16 | 6.8 | 8.2 | 0.15 |
| Example 75 | Positive electrode precursor 17 | Negative electrode 32 | Non-aqueous electrolyte solution 51 | 5.9 | 0.14 | 3.4 | 7.7 | 0.14 |
| Example 76 | Positive electrode precursor 18 | Negative electrode 32 | Non-aqueous electrolyte solution 51 | 5.9 | 0.15 | 3.3 | 7.9 | 0.16 |
| Example 77 | Positive electrode precursor 19 | Negative electrode 32 | Non-aqueous electrolyte solution 51 | 6 | 0.17 | 3.4 | 7.7 | 0.15 |
| Example 78 | Positive electrode precursor 20 | Negative electrode 32 | Non-aqueous electrolyte solution 51 | 6.7 | 0.13 | 3.3 | 7.7 | 0.13 |
| Comp. Example 28 | Positive electrode precursor 21 | Negative electrode 32 | Non-aqueous electrolyte solution 51 | 4 | 0.07 | 3.8 | 5.3 | 0.06 |
| Comp. Example 29 | Positive electrode precursor 22 | Negative electrode 32 | Non-aqueous electrolyte solution 51 | 30.2 | 0.56 | 3.5 | 40.6 | 0.57 |
| Comp. Example 30 | Positive electrode precursor 23 | Negative electrode 32 | Non-aqueous electrolyte solution 51 | 29.6 | 0.55 | 0.05 | 40.2 | 0.55 |
| Comp. Example 31 | Positive electrode precursor 24 | Negative electrode 32 | Non-aqueous electrolyte solution 51 | 30 | 0.58 | 7.8 | 39.6 | 0.57 |
| Example 32 | Positive electrode precursor 25 | Negative electrode 32 | Non-aqueous electrolyte solution 51 | 29.3 | 0.56 | 0.07 | 39.3 | 0.54 |
| Comp. Example 33 | Positive electrode precursor 26 | Negative electrode 32 | Non-aqueous electrolyte solution 51 | 29.6 | 0.56 | 0.06 | 38.4 | 0.57 |
| Comp. Example 34 | Positive electrode precursor 27 | Negative electrode 32 | Non-aqueous electrolyte solution 51 | 28.9 | 0.53 | 7.5 | 38.7 | 0.55 |
| Comp. Example 35 | Positive electrode precursor 28 | Negative electrode 32 | Non-aqueous electrolyte solution 51 | 28.4 | 0.59 | 7.8 | 37.7 | 0.58 |
| Comp. Example 36 | Positive electrode precursor 29 | Negative electrode 32 | Non-aqueous electrolyte solution 51 | 4.2 | 0.05 | 3.5 | 5.5 | 0.05 |
| Comp. Example 37 | Positive electrode precursor 30 | Negative electrode 32 | Non-aqueous electrolyte solution 51 | 4 | 0.07 | 3.4 | 5.4 | 0.06 |
| Comp. Example 38 | Positive electrode precursor 31 | Negative electrode 32 | Non-aqueous electrolyte solution 51 | 2.4 | — | 3.2 | 3.5 | — |
| Example 79 | Positive electrode precursor 32 | Negative electrode 32 | Non-aqueous electrolyte solution 51 | 6.4 | 0.16 | 3.9 | 8.6 | 0.15 |
| Comp. Example 39 | Positive electrode precursor 33 | Negative electrode 32 | Non-aqueous electrolyte solution 51 | 2.4 | — | 3.3 | 3.4 | — |
| Example 80 | Positive electrode precursor 10 | Negative electrode 33 | Non-aqueous electrolyte solution 51 | 5.9 | 0.15 | 3.5 | 7.7 | 0.14 |
| Example 81 | Positive electrode precursor 34 | Negative electrode 32 | Non-aqueous electrolyte solution 51 | 5.9 | 0.15 | 2.7 | 7.8 | 0.17 |
| Comp. Example 40 | Positive electrode precursor 35 | Negative electrode 32 | Non-aqueous electrolyte solution 51 | 2.4 | — | 2.6 | 3.3 | — |
| Example 82 | Positive electrode precursor 34 | Negative electrode 32 | Non-aqueous electrolyte solution 51 | 5.9 | 0.17 | 2.4 | 7.8 | 0.16 |
| Comp. Example 41 | Positive electrode precursor 35 | Negative electrode 32 | Non-aqueous electrolyte solution 51 | 2.5 | — | 2.2 | 3.4 | — |
| Example 83 | Positive electrode precursor 10 | Negative electrode 32 | Non-aqueous electrolyte solution 52 | 5.9 | 0.15 | 3.1 | 7.8 | 0.15 |
| Example 84 | Positive electrode precursor 36 | Negative electrode 32 | Non-aqueous electrolyte solution 51 | 14.9 | 0.17 | 3.1 | 17.1 | 0.17 |
| Comp. Example 42 | Positive electrode precursor 37 | Negative electrode 32 | Non-aqueous electrolyte solution 51 | 5.8 | — | 3.8 | 7 | — |

As shown in Table 20, high capacitance was obtained when the mass ratio C2 of the alkali metal compound was 0.1≤C2≤7.0. Examples in which the area ratio Z'2 was 7.5% to 35.0% were confirmed to have excellent durability.

It is expected that even more excellent input/output characteristics and high temperature durability would be exhibited by combining a negative electrode comprising carbon nanotubes with a non-aqueous electrolyte solution comprising an additive selected from among nitrile compounds.

Examples 85 and 86 and Comparative Examples 43 to 57

Preparation of Positive Electrode Active Materials

The following materials were used as active carbon. A laser diffraction particle size distribution analyzer by Shimadzu Corp. (SALD-2000J) was used to measure the mean particle size.

(1) Active carbon 6 with a particle size of 4.8 µm, steam-activated for 3 hours to 500° C., using coconut shell as the starting material (Example 85)

(2) Active carbon 7 with a particle size of 6.1 µm, steam-activated for 3 hours to 500° C., using charcoal as the starting material (Example 86)

(3) Active carbon 8 with a particle size of 8.2 µm, alkali-activated for 3 hours to 500° C., using coconut shell as the starting material (Comparative Example 43)

(4) Active carbon 9, steam-activated for 9 hours to 800° C., using coconut shell as the starting material (Comparative Example 44)

(5) Active carbon 10 with a particle size of 4.9 µm, steam-activated for 3 hours to 500° C., using sawdust as the starting material (Comparative Example 45)

(6) Active carbon 11 with a particle size of 3.5 µm, alkali-activated for 7 hours to 900° C., using phenol resin as the starting material (Comparative Example 46)

(7) Active carbon 12 with a particle size of 2.8 µm, alkali-activated for 8 hours to 900° C., using coal as the starting material (Comparative Example 47)

(8) Active carbon 13 with a particle size of 5.0 µm, alkali-activated for 7 hours to 800° C., using husk as the starting material (Comparative Example 48)

(9) Active carbon 14 with a particle size of 5.0 µm, alkali-activated for 9 hours to 800° C., using husk as the starting material (Comparative Example 49)

(10) Active carbon 15 with a particle size of 5.0 µm, alkali-activated for 5 hours to 800° C., using husk as the starting material (Comparative Example 50)

(11) Active carbon 16 with a particle size of 3.8 µm, alkali-activated for 6 hours to 1000° C., using sawdust as the starting material (Comparative Example 51)

(12) Active carbon 17 with a particle size of 3.8 µm, alkali-activated for 4 hours to 1000° C., using sawdust as the starting material (Comparative Example 52)

(13) Active carbon 18 with a particle size of 3.8 µm, alkali-activated for 8 hours to 1000° C., using sawdust as the starting material (Comparative Example 53)

(14) Active carbon 19 with a particle size of 4.2 µm, steam-activated for 8 hours to 900° C., using coconut shell as the starting material (Comparative Example 54)

(15) Active carbon 20 with a particle size of 7.0 µm, alkali-activated for 1 hour to 800° C., using phenol resin as the starting material (Comparative Example 55)

(16) Active carbon 21 with a particle size of 5.3 µm, alkali-activated for 8 hours to 900° C., using phenol resin as the starting material (Comparative Example 56)

(17) Active carbon 22 with a particle size of 5.3 µm, alkali-activated for 4 hours to 900° C., using phenol resin as the starting material (Comparative Example 57)

<Fabrication of Positive Electrode Precursors>

Active carbon 6 was used as the positive electrode active material to produce a positive electrode precursor. After mixing 56.8 mass % of active carbon 6, 31.8 mass % of lithium carbonate, 4.2 mass % of acetylene black, 1.5 mass % of CMC (carboxymethyl cellulose), 1.8 mass % of PVP (polyvinylpyrrolidone) and 4.0 mass % of acrylic latex, with distilled water to a solid mass ratio of 34.1%, the mixture was dispersed for 4 minutes using a rotating/revolving mixer (by Thinky, Inc.) at a circumferential speed of 2,000 rpm, to obtain a positive electrode coating solution.

A control coater (product of Imoto Machinery Co., Ltd.) was used to apply the positive electrode coating solution onto one side of a 15 µm-thick aluminum foil, and this was dried on a hot plate at 50° C. to obtain a positive electrode precursor. The obtained positive electrode precursor was pressed with a 2-ton mechanical roll press (product of Thank Metal Co., Ltd.) with a surface temperature of 25° C. at the pressing section.

<Production of Negative Electrodes>

After mixing 82.8 mass % of artificial graphite, 4.3 mass % of porous carbon, 8.7 mass % of acetylene black, 2.0 mass % of CMC (carboxymethyl cellulose) and 2.2 mass % of SBR (styrene-butadiene rubber) latex, with distilled water to a solid mass ratio of 34.0%, the mixture was dispersed for 4 minutes using a rotating/revolving mixer (by Thinky, Inc.) at a circumferential speed of 2000 rpm, to obtain a negative electrode coating solution.

A control coater (product of Imoto Machinery Co., Ltd.) was used to apply the negative electrode coating solution onto one side of an 8 µm-thick copper foil, and this was dried on a hot plate at 50° C. to obtain a negative electrode. The obtained negative electrode was pressed with a 2-ton mechanical roll press (product of Thank Metal Co., Ltd.) with a surface temperature of 25° C. at the pressing section.

<Fabrication of Metal Lithium Counter Electrode>

The copper foil was cut out to a size of 4.6 cm×9.6 cm (44 cm$^2$), and a metal lithium foil cut to a rectangular shape was layered over it. The lithium foil was then contact bonded to the copper foil using a hand roller, to obtain a metal lithium counter electrode.

<Preparation of Electrolyte Solution>

A non-aqueous electrolyte solution was prepared using a mixed solvent of ethylene carbonate (EC):ethylmethyl carbonate (EMC):dimethylmethyl carbonate (DMC)=34:22:44 (volume ratio) as the organic solvent, and dissolving an electrolyte salt so that the concentration ratio of $LiPF_6$ and LiFSI was 3:1 and the total concentration was 1.2 mol/L.

<Fabrication of Non-Aqueous Lithium Power Storage Element>

The obtained positive electrode precursor was cut out to a positive electrode active material layer size of 4.3 cm×9.5 cm (41 cm$^2$), and the negative electrode was cut out to a negative electrode active material layer size of 4.6 cm×9.6 cm (44 cm$^2$). A 4.8 cm×9.8 cm (47 cm$^2$) polyolefin separator (thickness: 15 µm, product of Asahi Kasei Corp.) was prepared, and the positive electrode precursor, separator and negative electrode were stacked in that order to obtain an electrode laminate body. A positive electrode terminal and negative electrode terminal were ultrasonically welded to the obtained electrode laminate body and the stack was placed in a vessel formed of an aluminum laminate package material, after which 3 sides including the electrode terminal section were sealed by heat sealing.

Approximately 3 g of the non-aqueous electrolyte solution was injected into the electrode laminate body housed in the aluminum laminate package material, in an argon environment at atmospheric pressure, with a temperature of 25° C. and a dew point of −60° C. Next, the aluminum laminate package material housing the electrode laminate body and non-aqueous electrolyte solution was placed in a pressure reduction chamber and the pressure was reduced from atmospheric pressure to −87 kPa, after which it was restored to atmospheric pressure and allowed to stand for 5 minutes. The step of reducing the pressure of the package material in the chamber from atmospheric pressure to −87 kPa and then restoring to atmospheric pressure was subsequently repeated 4 times, and then it was allowed to stand for 15 minutes. The electrode laminate body was impregnated with the non-aqueous electrolyte solution by this procedure.

Next, the aluminum laminate package material containing the electrode laminate body impregnated with the non-aqueous electrolyte solution was placed in a pressure-reducing sealing machine, and with pressure reduction to −95 kPa, it was sealed for 10 seconds at 180° C. at a pressure of 0.1 MPa to seal the aluminum laminate package material and fabricate a non-aqueous lithium power storage element.

[Alkali Metal Doping Step]

The non-aqueous lithium power storage element was then placed in a thermostatic bath set to a temperature of 45° C. A charge-discharge apparatus by Aska Electronic Co., Ltd. was used for initial charging by a method of constant-current charge at a current value of 1.2 mA/cm$^2$ per electrode area of the positive electrode until reaching a voltage of 4.5 V, followed by subsequent constant-voltage charge at 4.5 V for 3 hours, for alkali metal doping.

Next, a procedure of charge-discharge cycling was repeated 5 times, with each cycle comprising a discharge step of constant-current discharge from 4.0 V to 2.0 V at a current value of 1.2 mA/cm$^2$ per electrode area of the positive electrode, with subsequent constant-voltage discharge at 2.0 V for 10 minutes, and a charging step of constant-current charge from 2.0 V to 4.0 V at a current value of 1.2 mA/cm$^2$ per electrode area of the positive electrode, with subsequent constant-voltage charge at 2.0 V for 10 minutes.

[Aging Step]

The non-aqueous lithium power storage element obtained after the alkali metal doping step was placed in a thermostatic bath set to a temperature of 60° C., and subjected to constant-current charge to 4.0 V at a current value of 1.2 mA/cm$^2$ per electrode area of the positive electrode, followed by constant-voltage charge at 4.0 V for 16 hours.

Next, a procedure of charge-discharge cycling was repeated 5 times, with each cycle comprising a discharge step of constant-current discharge from 4.0 V to 2.0 V at a current value of 1.2 mA/cm$^2$ per electrode area of the positive electrode, with subsequent constant-voltage discharge at 2.0 V for 10 minutes, and a charging step of constant-current charge from 2.0 V to 4.0 V at a current value of 1.2 mA/cm$^2$ per electrode area of the positive electrode, with subsequent constant-voltage charge at 2.0 V for 10 minutes.

[Degassing Step]

A portion of the aluminum laminate package material of the non-aqueous lithium power storage element after the aging step was unsealed in an argon environment with a temperature of 25° C. and a dew point of −60° C. A step in which the aluminum laminate package material that had been partially opened, including the electrode laminate body, was placed in a pressure reduction chamber and a diaphragm pump was used for pressure reduction from atmospheric pressure to −80 kPa over a period of 3 minutes, followed by restoration to atmospheric pressure over a period of 3 minutes, was repeated a total of 10 times. Next, the aluminum laminate package material that had been partially opened, including the electrode laminate body, was placed in a pressure-reducing sealing machine, and after pressure reduction to −90 kPa, it was sealed at 200° C. for 10 seconds at a pressure of 0.1 MPa to seal the aluminum laminate package material and fabricate a non-aqueous lithium power storage element.

[Calculation of Initial Cell Capacity and Cell Life]

When the fabricated non-aqueous lithium power storage element was subjected to constant-current discharge from 3.8 V to 2.2 V at a current value of 10 mA/cm$^2$ per electrode area of the positive electrode in an environment with a temperature of 25° C., the initial cell capacity was calculated to be 6.9 mAh.

The non-aqueous lithium power storage element was then stored in an environment with a temperature of 65° C. The time until the cell capacity measured under these conditions reached 3.0 mAh was 2.2×10$^3$ hours.

<Fabrication of Positive Electrode Monopolar Cell>

The positive electrode precursor was cut out to a positive electrode active material layer size of 4.3 cm×9.5 cm (41 cm$^2$). A 4.8 cm×9.8 cm (47 cm$^2$) polyolefin separator (thickness: 15 μm, product of Asahi Kasei Corp.) and a 4.8 cm×9.8 cm (47 cm$^2$) glass filter were prepared. The positive electrode precursor, separator, glass filter and metal lithium counter electrode were then stacked in that order to obtain an electrode laminate body. A positive electrode terminal and negative electrode terminal were ultrasonically welded to the obtained electrode laminate body and the stack was placed in a vessel formed of an aluminum laminate package material, after which 3 sides including the electrode terminal section were sealed by heat sealing.

Approximately 6 g of the non-aqueous electrolyte solution was injected into the electrode laminate body housed in the aluminum laminate package material, in an argon environment at atmospheric pressure, with a temperature of 25° C. and a dew point of −60° C. Next, the aluminum laminate package material housing the electrode laminate body and non-aqueous electrolyte solution was placed in a pressure reduction chamber and the pressure was reduced from atmospheric pressure to −87 kPa, after which it was restored to atmospheric pressure and allowed to stand for 5 minutes. The step of reducing the pressure of the package material in the chamber from atmospheric pressure to −87 kPa and then restoring to atmospheric pressure was subsequently repeated 4 times, and then it was allowed to stand for 15 minutes. The electrode laminate body was impregnated with the non-aqueous electrolyte solution by this procedure.

Next, the aluminum laminate package material containing the electrode laminate body impregnated with the non-aqueous electrolyte solution was placed in a pressure-reducing sealing machine, and after pressure reduction to −95 kPa, it was sealed for 10 seconds at 180° C. at a pressure of 0.1 MPa to seal the aluminum laminate package material and obtain a positive electrode monopolar cell.

<Evaluation of Positive Electrode Monopolar Cell>

[Calculation of Alkali Metal Doping Reaction Efficiency]

The positive electrode monopolar cell obtained after sealing was placed in a thermostatic bath set to a temperature of 45° C. Next, a charge-discharge apparatus by Toyo System Co., Ltd. was used for initial charging by a method of constant-current charge at a current value of 0.49 mA/cm$^2$ per electrode area of the positive electrode until reaching a voltage of 4.5 V, followed by subsequent constant-voltage charge at 4.5 V for 3 hours, for alkali metal doping. The alkali metal doping reaction efficiency η was calculated to be 81%.

[Measurement of Raman Spectrum of Active Carbon]

The Raman spectrum of the active carbon was measured under the following conditions.

Device: inVia Reflex by Renishaw
Excitation wavelength: 532 nm
Excitation light intensity: 5%
Objective lens: 50×
Measuring system: confocal
Diffraction grating: 1800 gr/mm
Exposure time: 30 seconds
Number of scans: 8

$Y_1$ was calculated to be 2.9.

$Y_1$ is the ratio I1/I2 of the maximum peak intensity I1 appearing near a Raman shift of 1,590 $cm^{-1}$ the minimum peak intensity I2 appearing near a Raman shift of 1,470 $cm^{-1}$ ($Y_1$=I1/I2).

[Measurement of Functional Group Content of Active Carbon]

The functional group content of the active carbon was measured by thermal decomposition GC/MS under the following conditions.

Thermal decomposition apparatus: FRONTIER LAB Py3030D
Heating temperature: Holding for 20 minutes at 50° C. followed by temperature increase at 20° C./min and holding at 1000° C. for 30 minutes
IF temperature: 250° C.
Heating atmosphere: He gas
GC/MS apparatus: Agilent MSD5975
Column: Agilent FS Deactivated
Column temperature: 250° C.
Inlet temperature: 250° C.
Ion source: Electron bombardment ionization, 230° C. temperature, 250° C. I/F
Sample amount: —3 mg The functional group content of the active carbon 6 used in Example 85 was calculated to be 2.1 mmol/g.

Example 86 and Comparative Examples 43 to 57

Power storage elements were fabricated having the constructions and fabrication conditions for non-aqueous lithium power storage elements shown in Table 21, and were evaluated. The results are shown in Table 21.

The capacity (F/g) for each active carbon was calculated from evaluation of the positive electrode monopolar cell, and the basis weight (g/cm²) of the positive electrode active material layer was adjusted so that the positive electrode capacities of the cells were the same for all of the active carbons.

TABLE 21

| | Active carbon | | | | | |
|---|---|---|---|---|---|---|
| | Active carbon type | Starting material | Activation method | Activation temperature (° C.) | Activation time (h) | Mean particle size X1 (μm) |
| Example 85 | Active carbon 6 | Coconut shell | Steam | 500 | 3 | 4.8 |
| Example 86 | Active carbon 7 | Charcoal | Steam | 500 | 3 | 6.1 |
| Comp. Example 43 | Active carbon 8 | Coconut shell | Alkali | 500 | 3 | 8.2 |
| Comp. Example 44 | Active carbon 9 | Coconut shell | Steam | 800 | 9 | 4.8 |
| Comp. Example 45 | Active carbon 10 | Sawdust | Steam | 500 | 3 | 4.9 |
| Comp. Example 46 | Active carbon 11 | Phenol resin | Alkali | 900 | 7 | 3.5 |
| Comp. Example 47 | Active carbon 12 | Coal | Alkali | 900 | 8 | 2.8 |
| Comp. Example 48 | Active carbon 13 | Husk | Alkali | 800 | 7 | 5.0 |
| Comp. Example 49 | Active carbon 14 | Husk | Alkali | 800 | 9 | 5.0 |
| Comp. Example 50 | Active carbon 15 | Husk | Alkali | 800 | 5 | 5.0 |
| Comp. Example 51 | Active carbon 16 | Sawdust | Alkali | 1000 | 6 | 3.8 |
| Comp. Example 52 | Active carbon 17 | Sawdust | Alkali | 1000 | 4 | 3.8 |
| Comp. Example 53 | Active carbon 18 | Sawdust | Alkali | 1000 | 8 | 3.8 |
| Comp. Example 54 | Active carbon 19 | Coconut shell | Steam | 900 | 8 | 4.2 |
| Comp. Example 55 | Active carbon 20 | Phenol resin | Alkali | 800 | 1 | 7.0 |
| Comp. Example 56 | Active carbon 21 | Phenol resin | Alkali | 900 | 8 | 5.3 |
| Comp. Example 57 | Active carbon 22 | Phenol resin | Alkali | 900 | 4 | 5.3 |

| | Evaluation of positive electrode monopolar cell | | | | Evaluation of non-aqueous lithium power storage elements | | | |
|---|---|---|---|---|---|---|---|---|
| | Y1 | X1 × Y1 | Functional group content (mmol/g) | Doping reaction efficiency (%) | Negative electrode potential at 2.2 V (V) | Negative electrode potential at 3.8 V (V) | Initial cell capacity (mAh) | Time to cell capacity of 3.0 mAh (h) |
| Example 85 | 2.9 | 14 | 2.1 | 81 | 0.23 | 0.11 | 6.9 | $2.2 \times 10^3$ |
| Example 86 | 4.3 | 26 | 1.0 | 89 | 0.20 | 0.12 | 6.9 | $2.2 \times 10^3$ |
| Comp. Example 43 | 2.0 | 16 | 0.81 | 71 | 0.34 | 0.13 | 6.2 | $1.8 \times 10^3$ |
| Comp. Example 44 | 1.7 | 8.2 | 0.25 | 68 | 0.45 | 0.17 | 6.0 | $1.7 \times 10^3$ |
| Comp. Example 45 | 6.1 | 30 | 0.78 | 68 | 0.38 | 0.14 | 6.1 | $1.7 \times 10^3$ |
| Comp. | 1.1 | 3.9 | 0.79 | 61 | 0.82 | 0.20 | 4.5 | $8.3 \times 10^2$ |

TABLE 21-continued

| | | | | | | | | |
|---|---|---|---|---|---|---|---|---|
| Example 46 Comp. Example 47 | 1.2 | 3.4 | 0.21 | 55 | 0.59 | 0.20 | 5.5 | $1.4 \times 10^3$ |
| Comp. Example 48 | 1.8 | 9.0 | 0.43 | 72 | 0.35 | 0.14 | 6.2 | $1.8 \times 10^3$ |
| Comp. Example 49 | 1.7 | 8.5 | 0.39 | 69 | 0.38 | 0.13 | 6.1 | $1.7 \times 10^3$ |
| Comp. Example 50 | 1.4 | 7.0 | 0.56 | 67 | 0.37 | 0.14 | 6.1 | $1.7 \times 10^3$ |
| Comp. Example 51 | 1.2 | 4.6 | 0.25 | 63 | 0.41 | 0.18 | 6.2 | $1.8 \times 10^3$ |
| Comp. Example 52 | 1.2 | 4.6 | 0.33 | 65 | 0.43 | 0.16 | 6.0 | $1.7 \times 10^3$ |
| Comp. Example 53 | 1.3 | 4.9 | 0.19 | 61 | 0.48 | 0.19 | 5.9 | $1.6 \times 10^3$ |
| Comp. Example 54 | 1.5 | 6.3 | 0.47 | 72 | 0.33 | 0.14 | 6.3 | $1.8 \times 10^3$ |
| Comp. Example 55 | 1.2 | 8.4 | 0.69 | 74 | 0.33 | 0.14 | 6.3 | $1.8 \times 10^3$ |
| Comp. Example 56 | 1.1 | 5.8 | 0.071 | 72 | 0.35 | 0.15 | 6.3 | $1.8 \times 10^3$ |
| Comp. Example 57 | 1.1 | 5.8 | 0.16 | 73 | 0.34 | 0.13 | 6.2 | $1.8 \times 10^3$ |

As shown in Table 21, steam-activation for 3 hours at 500° C. produced highly crystalline active carbon. With the Examples where the mean particle size $X_1$ was between 3.0 µm and 7.0 µm and the $Y_1$ was 2.5 or greater, high doping reaction efficiency was obtained and long cell life was confirmed.

The invention claimed is:

1. A non-aqueous lithium power storage element comprising a positive electrode, a negative electrode, a separator and a lithium ion-containing non-aqueous electrolyte, wherein:
 the positive electrode has a positive electrode current collector and a positive electrode active material layer containing a positive electrode active material, formed on one or both sides of the positive electrode current collector,
 the positive electrode active material layer further comprises carbon nanotubes and an alkali metal compound other than the positive electrode active material,
 the positive electrode active material contains active carbon, and
 the element is provided with at least one of the following constructions (1) and (2):
 (1) the negative electrode includes a negative electrode current collector and a negative electrode active material layer on one or both sides of the negative electrode current collector,
 the negative electrode active material layer includes a negative electrode active material, carbon nanotubes and a dispersing agent,
 the negative electrode active material includes a carbon material, and
 for all of the pixels in the bright field regions in a binarized SEM image taken of the negative electrode active material layer surface, where a set of the maximum inscribed circles encompassing each of the pixels is represented as a frequency distribution for each diameter, the area ratio Z1 which is the ratio of the total area of maximum inscribed circles with diameters of less than 100 nm occupying the total area of the maximum inscribed circles is 3.5% to 25.5%;
 (2) the non-aqueous electrolyte solution comprises:
 (A) at least one lithium salt from among $LiPF_6$ and $LiBF_4$,
 (B) a lithium salt with an imide structure, and
 (C) a lithium salt with an oxalate complex as the anion, and
 the ratio of the mass of component (C) with respect to the sum of the mass of component (A) and the mass of component (B) in the non-aqueous electrolyte solution is 1.0 mass % to 10.0 mass %.

2. The non-aqueous lithium power storage element according to claim 1, wherein the non-aqueous electrolyte solution comprises (B) a lithium salt with an imide structure, and component (B) is a lithium salt with an imide structure represented by the following formula (a):

[Chemical Formula 1]

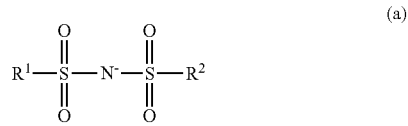

{where $R^1$ and $R^2$ are each independently a hydrogen atom, halogen atom, alkyl group or alkyl halide group and at least one of $R^1$ and $R^2$ is a halogen atom or alkyl halide group}.

3. The non-aqueous lithium power storage element according to claim 1, wherein the (B) lithium salt with an imide structure is a lithium salt selected from the group consisting of lithium bis(fluorosulfonyl)imide and lithium bis(trifluoromethane) sulfonimide.

4. The non-aqueous lithium power storage element according to claim 1, wherein the non-aqueous electrolyte solution comprises (C) a lithium salt with an oxalate complex as the anion, and component (C) is at least one type of lithium salt selected from the group consisting of lithium bisoxalatoborate, lithium fluorooxalatoborate and lithium difluorooxalatoborate.

5. The non-aqueous lithium power storage element according to claim 1, wherein the non-aqueous electrolyte solution comprises at least one type of nitrile compound in a range of 0.1 mol/L to 5 mol/L of the non-aqueous electrolyte solution.

6. The non-aqueous lithium power storage element according to claim 1, wherein the non-aqueous electrolyte solution comprises at least one type of trinitrile compound selected from the group consisting of 2-amino-1,1,3-tricyano-1-propene, 1-butyl-3-methylimidazolium tricyanomethanide and lithium tricyanomethanide, in a range of 0.1 mol/L to 5 mol/L of the non-aqueous electrolyte solution.

7. The non-aqueous lithium power storage element according to claim 1, wherein:
the negative electrode active material layer has a solid electrolyte interface (SEI) substance on the surface, and
the solid electrolyte interface (SEI) substance contains lithium oxalate represented by the following formula (b):

[Chemical Formula 2]

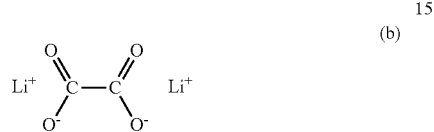

(b)

8. The non-aqueous lithium power storage element according to claim 1, wherein in X-ray photoelectron spectroscopy (XPS) of the negative electrode active material layer, the ratio I1/I2, of the intensity I1 of peak P1 observed in the range of 289 eV to 290 eV and the intensity I2 of peak P2 observed in the range of 284 eV to 285 eV, is 0.1 or greater.

9. The non-aqueous lithium power storage element according to claim 1, wherein the non-aqueous electrolyte solution comprises at least one type of ether compound selected from the group consisting of 1,2-dimethoxyethane, 1,2-diethoxyethane, tetrahydrofuran, 1,3-dioxane, 1,4-dioxane and 2-methyltetrahydrofuran, in the range of 1 mol/L to 10 mol/L in the non-aqueous electrolyte solution.

10. The non-aqueous lithium power storage element according to claim 1, wherein in a binarized SEM image of the surface of the negative electrode active material layer, the area ratio Z2 of the total area of regions of 1,000 nm$^2$ to 5,000 nm$^2$ of the dark field regions among the total area of regions of 1,000 nm$^2$ to 20,000 nm$^2$, is 63.0% to 92.0%.

11. The non-aqueous lithium power storage element according to claim 1, wherein:
the mass ratio of the alkali metal compound with respect to the total mass of the positive electrode active material layer in the positive electrode, represented as C2 (mass %), is 0.1≤C2≤7.0, and
in a binarized SEM image of 1,280×890 pixels (1 pixel=9.96 nm) taken of the surface of the positive electrode active material layer of the positive electrode at a magnification of 10,000x, the area ratio Z'2 of the total area of maximum inscribed circles with diameters of less than 100 nm occupying the total area of the maximum inscribed circles is 7.5% to 35.0%, where a set of the maximum inscribed circles encompassing each of the pixels, for all of the pixels in the bright field regions, is represented as a frequency distribution for each diameter.

12. The non-aqueous lithium power storage element according to claim 11, wherein in the XRD (X-ray diffraction) spectrum measured for the positive electrode active material layer, there is a peak X2 with 2θ in the range of 25.7° to 27.0°, and the half-width of the peak X2 is 0.1° to 0.5°, and
in the XRD (X-ray diffraction) spectrum measured for the negative electrode active material layer, there is a peak Y1 having a peak top with 2θ in the range of 26.2° to 26.5°, and the half-width of the peak Y1 is 0.1° to 0.5°.

13. The non-aqueous lithium power storage element according to claim 11, wherein
the total concentration of Fe atoms and Ni atoms in the negative electrode active material layer is 1 ppm to 500 ppm, and
the total concentration of Fe atoms and Ni atoms in the positive electrode active material layer is 1 ppm to 500 ppm.

14. The non-aqueous lithium power storage element according to claim 11, wherein the alkali metal compound is at least one type selected from the group consisting of lithium carbonate, sodium carbonate and potassium carbonate.

15. The non-aqueous lithium power storage element according to claim 11, wherein the mean fiber diameter of the carbon nanotubes is 2 nm or greater and less than 100 nm.

16. The non-aqueous lithium power storage element according to claim 15, wherein:
the positive electrode active material further comprises a lithium transition metal oxide, and
the lithium transition metal oxide is at least one selected from the group consisting of $Li_xNi_aCo_bAl_{(1-a-b)}O_2$ (where a, b and x satisfy 0.02<a<0.97, 0.02<b<0.97 and 0≤x≤1, respectively), $Li_xNi_cCo_dMn_{(1-c-d)}O_2$ (where c, d and x satisfy 0.02<c<0.97, 0.02<d<0.97 and 0≤x≤1, respectively), $Li_xCoO_2$ (where x satisfies 0≤x≤1), $Li_xMn_2O_4$ (where x satisfies 0≤x≤1), $Li_xFePO_4$ (where x satisfies 0≤x≤1), $Li_xMnPO_4$ (where x satisfies 0≤x≤1) and $Li_2V_2(PO_4)_3$ (where z satisfies 0≤z≤3).

17. The non-aqueous lithium power storage element according to claim 15, wherein:
with $X_1$ as the mean particle size of the active carbon in the positive electrode active material layer, 3.0 μm≤$X_1$≤7.0 μm, with $Y_1$ as the ratio I1/I2 of the maximum peak intensity I1 appearing near a Raman shift of 1,590 cm$^{-1}$ and the minimum peak intensity I2 appearing near a Raman shift of 1,470 cm$^{-1}$ in the Raman spectrum for the active carbon, 2.0≤$Y_1$≤5.5, the product $X_1Y_1$ of $X_1$ and $Y_1$ is 10≤$X_1Y_1$≤28, and
the functional group content $Z_1$ of the active carbon is 0.80 mmol/g≤$Z_1$≤2.5 mmol/g.

18. A power storage module containing a non-aqueous lithium power storage element according to claim 1.

19. A power storage system comprising power storage elements according to claim 1, lead batteries, nickel-hydrogen batteries, lithium ion secondary batteries or fuel cells, connected in series or in parallel.

* * * * *